US010827230B2

(12) United States Patent
Shimura et al.

(10) Patent No.: US 10,827,230 B2
(45) Date of Patent: Nov. 3, 2020

(54) INFORMATION PROCESSING APPARATUS AND INFORMATION PROCESSING METHOD

(71) Applicant: SONY CORPORATION, Tokyo (JP)

(72) Inventors: Masaru Shimura, Kanagawa (JP); Kenta Kawamoto, Tokyo (JP); Asako Kaneko, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/320,596

(22) PCT Filed: Jun. 9, 2015

(86) PCT No.: PCT/JP2015/066630
§ 371 (c)(1),
(2) Date: Dec. 20, 2016

(87) PCT Pub. No.: WO2016/002445
PCT Pub. Date: Jan. 7, 2016

(65) Prior Publication Data
US 2017/0150230 A1    May 25, 2017

(30) Foreign Application Priority Data
Jul. 3, 2014  (JP) .................................. 2014-137612

(51) Int. Cl.
*H04N 21/6587*  (2011.01)
*H04N 21/422*  (2011.01)
(Continued)

(52) U.S. Cl.
CPC ......... *H04N 21/6587* (2013.01); *G06F 3/011* (2013.01); *G06F 3/013* (2013.01);
(Continued)

(58) Field of Classification Search
CPC ......... H04N 21/42203; H04N 21/4223; H04N 21/44008; H04N 21/6125; H04N 21/6156;
(Continued)

(56) References Cited

U.S. PATENT DOCUMENTS 8,161,398 B2 *  4/2012  Cragun ................. G09B 21/00
715/706
2009/0132931 A1   5/2009  Tatsubori
(Continued)

FOREIGN PATENT DOCUMENTS

AR         D84345 A1    5/2013
CN       101437024 A    5/2009
(Continued)

OTHER PUBLICATIONS

Extended European Search Report of EP Patent Application No. 15814519.3, dated Jan. 10, 2018, 09 pages.
(Continued)

*Primary Examiner* — Rong Le
(74) *Attorney, Agent, or Firm* — Chip Law Group

(57) ABSTRACT

To propose an information processing apparatus and information processing method and program capable of allowing users to share their viewpoints or lines of sight in a situation where a plurality of users share content for which the users can move their viewpoints or line-of-sight directions. Provided is an information processing apparatus including: an acquisition unit configured to acquire line-of-sight information indicating a first user's line of sight detected in response to presentation of a content; and a management unit configured to associate the acquired line-of-sight information with the content as control information for controlling the presentation of the content to a second user different from the first user.

18 Claims, 26 Drawing Sheets

(51) Int. Cl.
  *H04N 21/44* (2011.01)
  *H04N 21/61* (2011.01)
  *H04N 21/4223* (2011.01)
  *G06T 7/70* (2017.01)
  *G06T 19/00* (2011.01)
  *G06F 3/01* (2006.01)
  *G06F 3/0481* (2013.01)
  *G06F 3/0484* (2013.01)

(52) U.S. Cl.
  CPC ........ *G06F 3/0484* (2013.01); *G06F 3/04815* (2013.01); *G06T 7/70* (2017.01); *G06T 19/00* (2013.01); *H04N 21/4223* (2013.01); *H04N 21/42203* (2013.01); *H04N 21/44008* (2013.01); *H04N 21/6125* (2013.01); *H04N 21/6156* (2013.01); *G06T 2207/30244* (2013.01); *G06T 2219/024* (2013.01)

(58) Field of Classification Search
  CPC .................. H04N 21/6587; H04N 7/15; G06T 2207/30244; G06T 7/70; G06Q 10/10; G06Q 10/107; H04L 12/1813; H04L 12/1822
  See application file for complete search history.

(56) References Cited

U.S. PATENT DOCUMENTS

2012/0154557 A1    6/2012    Perez et al.
  2012/0299962 A1    11/2012   White et al.
  2013/0141419 A1*   6/2013    Mount ................... G06F 3/011
                                                    345/419
  2014/0253671 A1*   9/2014    Bentley .................. H04N 7/15
                                                    348/14.08
  2015/0067709 A1*   3/2015    Meredith ............. H04N 21/454
                                                    725/12

FOREIGN PATENT DOCUMENTS

CN         102566756 A      7/2012
  EP           2652940 A1    10/2013
  HK           1171103 A1     1/2016
  JP        2007-296861  *    6/2009
  JP        2009-123001 A     6/2009
  JP        2011-182109 A     9/2011
  JP           5294612 B2     9/2013
  JP        2014-504413 A     2/2014
  JP        2014-127987 A     7/2014
  KR      10-2013-0130740 A  12/2013
  TW         201228380 A      7/2012
  WO        2012/082444 A1    6/2012
  WO        2012/164155 A1   12/2012

OTHER PUBLICATIONS

Office Action for JP Patent Application No. 2016-531217, dated Dec. 18, 2018, 04 pages of Office Action and 03 pages of English Translation.

Office Action for JP Patent Application No. 2016-531217, dated Apr. 16, 2019, 03 pages of Office Action and 03 pages of English Translation.

* cited by examiner

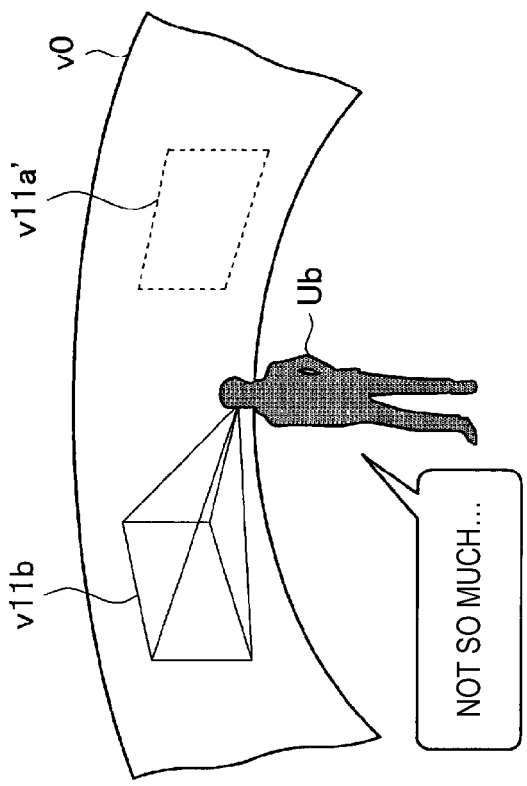
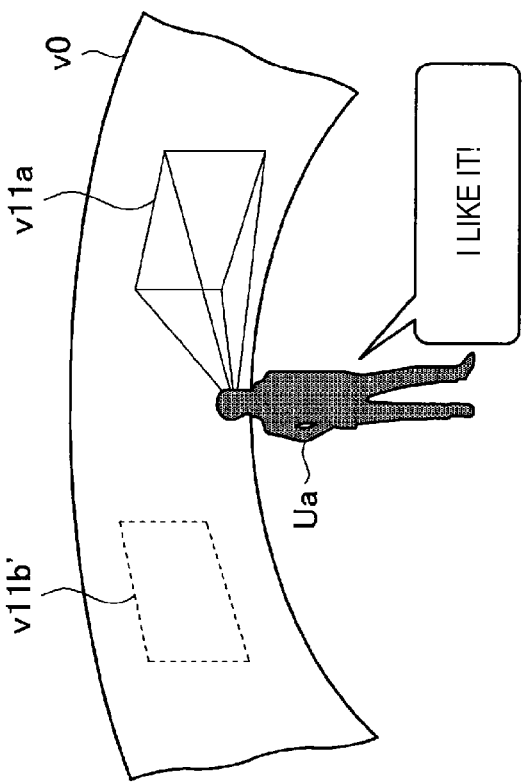
FIG. 3

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/066630 filed on Jun. 9, 2015, which claims priority benefit of Japanese Patent Application No. JP 2014-137612 filed in the Japan Patent Office on Jul. 3, 2014. Each of the above-referenced applications is hereby incorporated herein by reference in its entirety.

TECHNICAL FIELD

The present disclosure relates to information processing apparatuses, information processing methods, and programs.

BACKGROUND ART

In recent years, as advances have been made in networks and communication tools, video contents, such as moving images, still images, and the like, have been utilized by users in various forms in addition to individual viewing. For example, video contents have been allowed to be shared by a plurality of users while they are communicating with each other.

Meanwhile, a technique has been developed which allows the user to flexibly move their viewpoint or line-of-sight direction in a virtual space which is provided as a video content, and presents, to the user, an image depending on the movement of the viewpoint or line-of-sight direction (typically called first-person-perspective image).

SUMMARY OF INVENTION

Technical Problem

Also, services have been studied which allow a plurality of users to share video contents for which the users can move their viewpoints or line-of-sight directions. In such services which allow a plurality of users to share the video contents, it may be assumed in some cases that it is difficult for one user to recognize another user's line of sight or an object being viewed by another user. In other words, in such a situation, for example, one user and another user cannot recognize that they are viewing different objects, which, as a result, inhibits the establishment of communication between the users.

With the above in mind, the present disclosure proposes an information processing apparatus, information processing method, and program capable of allowing users to share their viewpoints or lines of sight in a situation where a plurality of users share a content for which the users can move their viewpoints or line-of-sight directions.

Solution to Problem

According to the present disclosure, there is provided an information processing apparatus including: an acquisition unit configured to acquire line-of-sight information indicating a first user's line of sight detected in response to presentation of a content; and a management unit configured to associate the acquired line-of-sight information with the content as control information for controlling the presentation of the content to a second user different from the first user.

According to the present disclosure, there is provided an information processing apparatus including: an acquisition unit configured to acquire line-of-sight information indicating a first user's line of sight associated with a content; and a control unit configured to control presentation of the content to a second user different from the first user, on the basis of the line-of-sight information.

According to the present disclosure, there is provided an information processing method including: acquiring line-of-sight information indicating a first user's line of sight detected in response to presentation of a content; and causing a processor to associate the acquired line-of-sight information with the content as control information for controlling the presentation of the content to a second user different from the first user.

According to the present disclosure, there is provided an information processing method including: acquiring a content associated with line-of-sight information indicating a first user's line of sight; and causing a processor to control presentation of the content to a second user different from the first user, on the basis of the line-of-sight information associated with the content.

According to the present disclosure, there is provided a program for causing a computer to execute: acquiring line-of-sight information indicating a first user's line of sight detected in response to presentation of a content; and associating the acquired line-of-sight information with the content as control information for controlling the presentation of the content to a second user different from the first user.

According to the present disclosure, there is provided a program for causing a computer to execute: acquiring a content associated with line-of-sight information indicating a first user's line of sight; and controlling presentation of the content to a second user different from the first user, on the basis of the line-of-sight information associated with the content.

Advantageous Effects of Invention

As described above, according to the present disclosure, provided are an information processing apparatus, information processing method, and program capable of allowing users to share their viewpoints or lines of sight in a situation where a plurality of users share a content for which the users can move their viewpoints or line-of-sight directions.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an illustrative diagram for describing an overview of an information processing system according to the embodiment.

DESCRIPTION OF EMBODIMENT(S)

Figure 1:
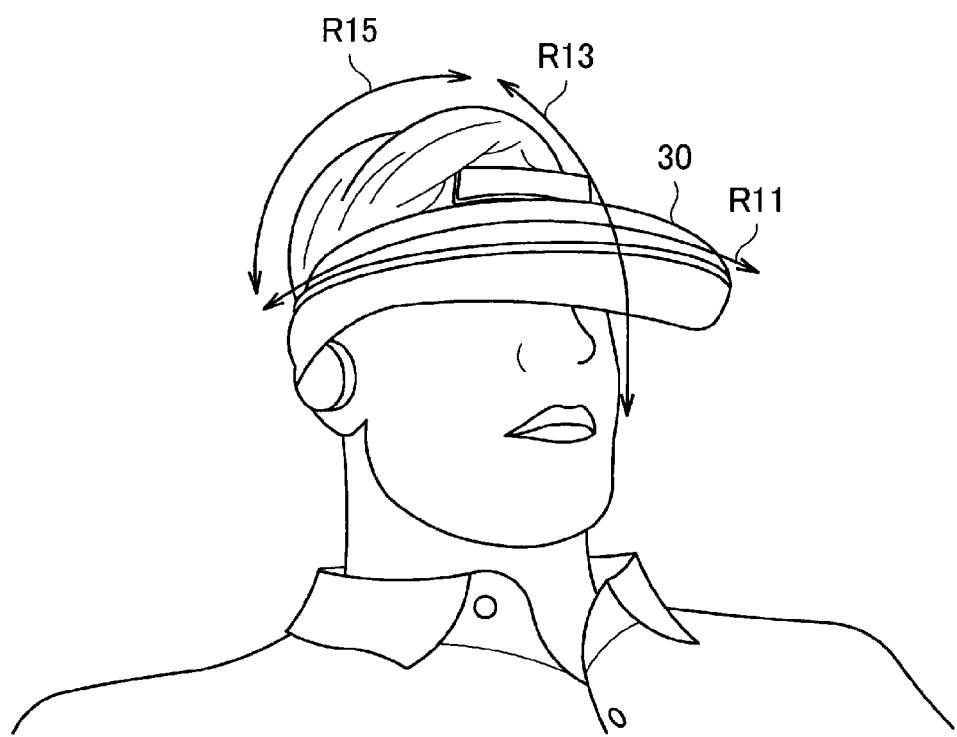
FIG. 1 is an illustrative diagram for describing an example of a content display apparatus according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First embodiment
1.1. Overview
1.2. General configuration
1.3. System configuration
1.4. Functional configuration
1.5. Variations
1.6. Conclusion
2. Second embodiment
3. Third embodiment
3.1. Overview
3.2. Functional configuration
3.3. Conclusion
4. Fourth embodiment
4.1. Overview
4.2. Functional configuration
4.3. Conclusion
5. Hardware configuration
6. Conclusion 1. First Embodiment 1.1. Overview Firstly, an overview of an information processing system according to a first embodiment of the present disclosure will be described with reference to FIG. 1 to FIG. 4. For example, FIG. 1 shows a head-mounted display (HMD) apparatus which is an example of a content display apparatus 30 which is used by the user to consume video contents, such as moving images, still images, and the like, in the information processing system according to this embodiment. Specifically, the content display apparatus 30 shown in FIG. 1 is configured so that when the apparatus 30 is worn on the user's head, a display unit (e.g., a display panel) for displaying an image is held in front of the user's eyes.

Note that head-mounted display apparatuses (HMD) applicable as the content display apparatus 30 include a typically called immersive HMD, see-through HMD, and video see-through HMD.

When the immersive HMD is worn on the user's head or face, the HMD covers the user's eyes, and the display unit such as a display or the like is held in front of the user's eyes. Therefore, it is difficult for the user wearing the immersive HMD to directly see an external scene (i.e., a scene in the real world) in their visual field, and the user sees only video displayed on the display unit in their field of view. Such a configuration of the immersive HMD can provide a sense of immersion to the user who is viewing an image.

The see-through HMD holds a virtual image optical system including a transparent light guide unit using, for example, a half mirror or transparent light guide plate, in front of the user's eyes, and displays an image inside the virtual image optical system. Therefore, the user wearing the see-through HMD can see an external scene even while viewing an image displayed inside the virtual image optical system.

The video see-through HMD is worn to cover the user's eyes, and holds the display unit such as a display or the like in front of the user's eyes, like the immersive HMD. Meanwhile, the video see-through HMD has an imaging unit for imaging a surrounding scene, and displays, on the display unit, an image of a scene in the user's line-of-sight direction which is imaged by the imaging unit. Such a configuration allows the user wearing the video see-through HMD to check an external scene through the image displayed on the display unit, although it is difficult for the user to directly see the external scene in their visual field.

Also, the content display apparatus 30 according to this embodiment is provided with, for example, an acceleration sensor or an angular velocity sensor (gyroscopic sensor). The content display apparatus 30 is configured to be capable of detecting a motion of the head (an orientation of the head) of the user wearing the content display apparatus 30. For example, in the example shown in FIG. 1, the content display apparatus 30 detects, as the motion of the user's head, components in a yaw direction $\psi$ indicated by a reference sign R11, a pitch direction $\varphi$ indicated by a reference sign R13, and a roll direction $\theta$ indicated by a reference sign R15.

Thereafter, the content display apparatus 30 recognizes a change in a direction indicated by the user's line of sight (hereinafter also referred to as a "line-of-sight direction") on the basis of the detected motion of the user's head, and presents, to the user, an image corresponding to the recognized change in the line-of-sight direction.

Figure 2:
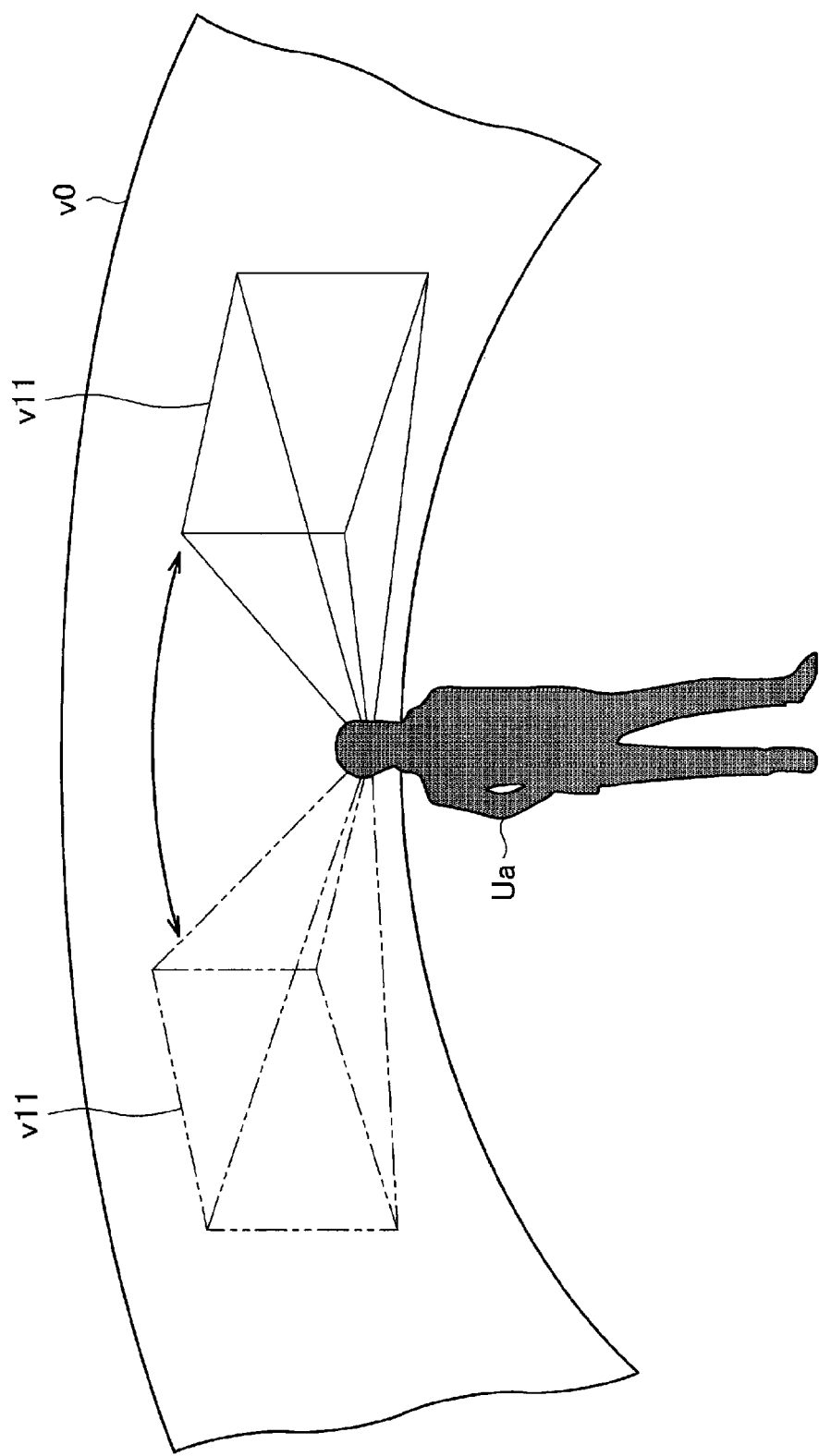
FIG. 2 is an illustrative diagram for describing an overview of an information processing system according to the embodiment.

For example, FIG. 2 shows an embodiment example in which video contents are provided to the user by the content display apparatus 30 according to this embodiment. In the example shown in FIG. 2, a case example is shown in which an embodiment is simulated where an image v0 which is obtained by widening or extending the user Ua's visual field is referred to by the user Ua through the content display apparatus 30 (not shown) while moving their line-of-sight direction to look around, like a typically called omnidirectional video. Note that the image v0 may be either a moving image or a still image.

Specifically, the content display apparatus 30 recognizes a change in the user Ua's line-of-sight direction by detecting a motion of the user's head. Thereafter, the content display apparatus 30 extracts a partial image v11 which is a portion of the image v0 obtained by widening or extending the user Ua's visual field, the portion being indicated by the recognized line-of-sight direction, on the basis of a preset visual field angle, and presents the extracted partial image v11 to the user Ua. In other words, the partial image v11 shown in FIG. 2 schematically shows an image which is presented on the display unit of the content display apparatus 30. Specifically, the content display apparatus 30 can move a display area in a manner which cancels a motion of the head detected by the angular velocity sensor (gyroscopic sensor), to present an image which follows the motion of the user's head. In other words, the use of the content display apparatus 30 allows the user to observe an image which follows a motion of the user's head, and thereby look around in space provided as a video content.

Note that the visual field angle for extracting the partial image v11 may be invariable, or may be changed according to the user's operation or the like. For example, when a portion of the partial image v11 is further magnified and presented to the user Ua, the content display apparatus 30 may perform control to narrow the visual field angle so that the size of the partial image v11 is relatively reduced with respect to the image v0.

Also, the method of recognizing the user's line-of-sight direction is not limited to those based on the result of detection of a motion of the user's head. As a specific example, the content display apparatus 30 may detect a motion of the user's eye using a technique typically called "eye tracking," and recognize the user's line-of-sight direction on the basis of the eye motion.

Specifically, for example, the content display apparatus 30 may capture an image of the user's eyeball using an imaging apparatus for capturing an image, detect a position of the user's pupil from the captured image, and recognize the user's line-of-sight direction on the basis of the detected position of the pupil.

The content display apparatus 30 may, of course, recognize the user's line-of-sight direction using a combination of the result of detection of a motion of the user's head and the result of detection of a motion of the user's eye.

Also, the method of detecting a motion of the user's head is not limited to those based on the result of detection performed using various sensors provided in the content display apparatus 30. For example, a configuration for detecting a motion of the user's head may be provided external to the content display apparatus 30. As a specific example, an imaging apparatus provided external to the content display apparatus 30 may be used to capture an image of the user, and the captured image may be analyzed to detect a motion of the user's head. Also, as another example, various sensors such as a typically called optical sensor may be provided external to the content display apparatus 30, and the user may be sensed using the sensor to detect a motion of the user's head.

With such a configuration, the user Ua can refer to the image v0 while moving their line-of-sight direction to look around, and thereby experience the image with a high sense of presence as if the user were present at the site.

Also, the information processing system according to this embodiment is configured so that video contents as shown in FIG. 3 can be shared by a plurality of users. For example, FIG. 3 is an illustrative example for describing an overview of the information processing system according to this embodiment, and showing one embodiment where a plurality of users share a content.

In the example shown in FIG. 3, a case example is shown in which the same video content v0 is presented on the respective content display apparatuses 30 of the users Ua and Ub so that the video content v0 can be shared by the users Ua and Ub.

For example, a reference sign v11a indicates a partial image which is presented to the user Ua on the basis of the user Ua's line-of-sight direction. Similarly, a reference sign v11b indicates a partial image which is presented to the user Ub on the basis of the user Ub's line-of-sight direction. Note that a reference sign v11a' schematically indicates a position of the partial image v11a, and a reference sign v11b' schematically indicates a position of the partial image v11b. Also, when the partial images v11a and v11b are not particularly distinguished from each other, the partial images v11a and v11b may each be simply referred to as the "partial image v11."

In this case, the content display apparatuses 30 of the users may be configured so that voices uttered by the users are collected by respective sound collecting units (e.g., a microphone), and collected voice information is exchanged between the users, whereby the users Ua and Ub can communicate with each other.

Meanwhile, when a video content for which the line-of-sight direction can be moved is shared by a plurality of users, it may be difficult for one user to recognize what is referred to by another user. As a specific example, as shown in FIG. 2 and FIG. 3, when a typically called omnidirectional video v0 is referred to, the starting point of the line-of-sight direction is invariable, and a partial image v11 (e.g., the partial images v11a and v11b) to be referred to is displayed as a first-person perspective image with respect to the user.

A plurality of users typically have the same position of the starting point of the line-of-sight direction. In this case, the user Ub is not displayed in the image v11a referred to by the user Ua. Therefore, it is difficult for the user Ua to recognize what part of the video content v0 the user Ub is referring to. In particular, the users Ua and Ub may refer to the same video content v0 at different places through a network. In such a case, the user Ua and the user Ub are spatially kept apart from each other, and therefore, it is difficult for each of the user Ua and the user Ub to recognize the other's state, i.e., what part of the video content v0 the other is referring to.

Therefore, for example, as shown in FIG. 3, it is assumed that the user Ub reacts to "I like it!" uttered by the user Ua reacting on the basis of the reference of the video content v0, by uttering "Not so much . . . " At this time, as shown in FIG. 3, the user Ua and the user Ub may not always refer to the same position in the video content v0. Therefore, speeches uttered by the users Ua and Ub, respectively, may be reactions to different objects. However, the users Ua and Ub do not recognize that they are referring to different objects, so that communication may not be established therebetween.

With the above circumstances in mind, the information processing system according to this embodiment has been made. It is an object of the present invention is to allow a plurality of users to share their viewpoints or lines of sight in a situation where the users share a content for which they can move their viewpoints or line-of-sight directions.

Specifically, in the information processing system according to this embodiment, the content display apparatuses 30 of a plurality of users share their line-of-sight information indicating the line of sight of each user. In addition, the content display apparatus 30 controls presentation of the partial image v11 with respect to its own user Ua on the basis of the video content v0 according to the shared line-of-sight information of each user.

Figure 4:
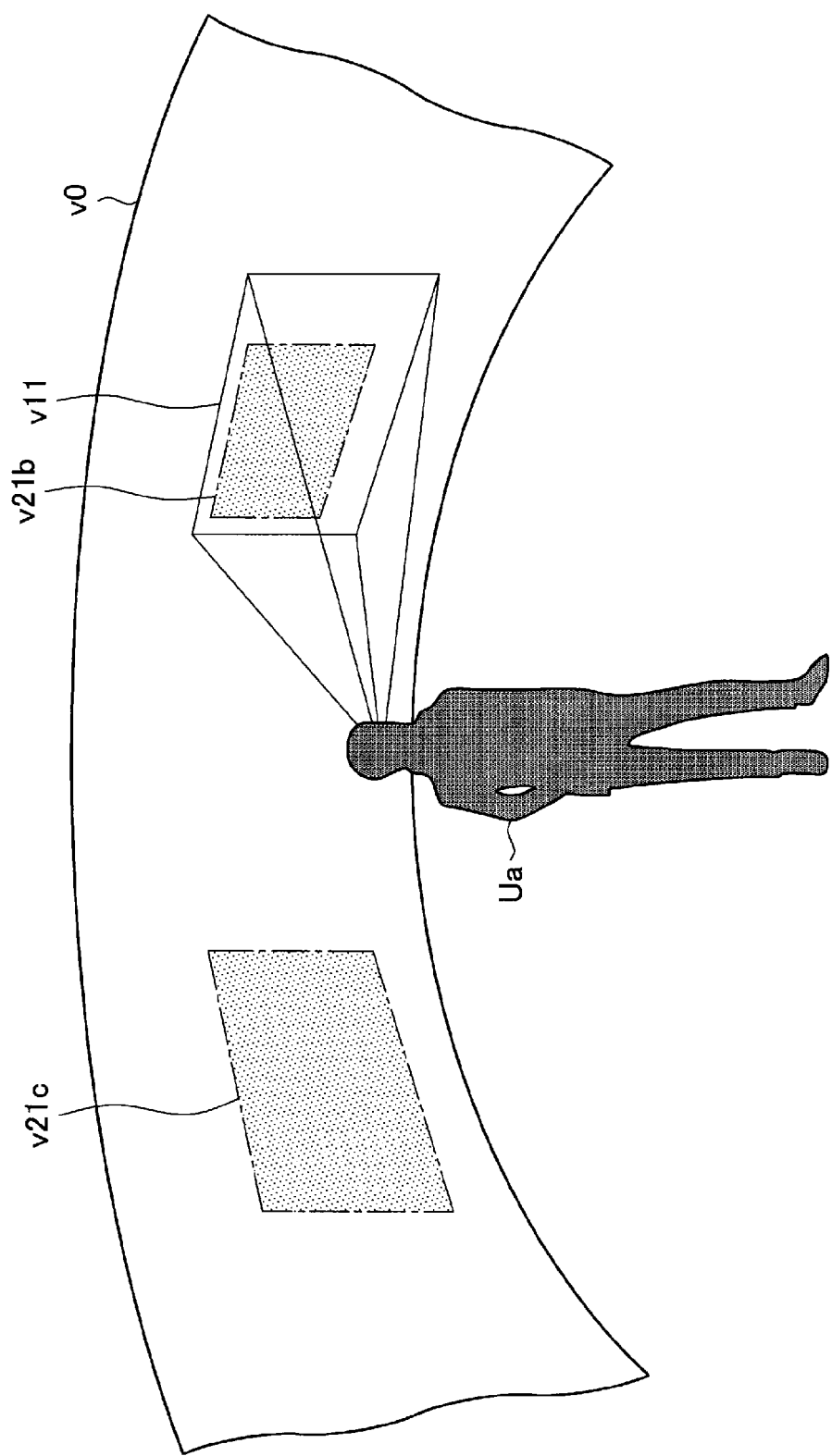
FIG. 4 is an illustrative diagram for describing an overview of an information processing system according to the embodiment.

For example, FIG. 4 is an illustrative diagram for describing an overview of the information processing system according to this embodiment in a case where a plurality of users shares their viewpoints or lines of sight. In FIG. 4, reference signs v21b and v21c indicate identification information examples which are presented in a manner which allows the user Ua to identify a range in the video content v0 which is being referred to by another user different from the user Ua, on the basis of the different user's line-of-sight direction.

As shown in FIG. 4, the content display apparatus 30 may present, to the user Ua, the partial image v11 which is presented in a manner which allows the user Ua to identify a range which is being referred to by another user different from the user Ua, on the basis of the different user's line-of-sight direction.

Also, as another example, the content display apparatus 30 may present, to the user Ua, the partial image v11b which is being referred to by another user (Ub) different from the user Ua, on the basis of the user Ub's line-of-sight direction.

Although an example has been described above in which a head-mounted display apparatus is applied as the content display apparatus 30, the content display apparatus 30 is not necessarily limited to a head-mounted display apparatus, if the partial image v11 can be presented on the basis of a user's line-of-sight information. As a specific example, the content display apparatus 30 may be a user terminal which can be carried by a user, such as a smartphone. Note that when a user terminal such as a smartphone is applied as the content display apparatus 30, a motion (orientation) of the user terminal is detected using, for example, an acceleration sensor or angular velocity sensor (gyroscopic sensor) provided in the user terminal. Thereafter, the content display apparatus 30 may recognize the orientation of the user terminal as the user's line-of-sight direction, on the basis of the result of the detection, and present, to the user, a partial image corresponding to the orientation of the user terminal.

With such a configuration, in the information processing system according to this embodiment, a plurality of users are allowed to share their viewpoints, lines of sight, or visual fields (fields of view) in a situation where the users share a content for which the users can move their viewpoints or line-of-sight directions. In the description that follows, the information processing system according to this embodiment will be described in greater detail.

1.2. General Configuration

Figure 5:
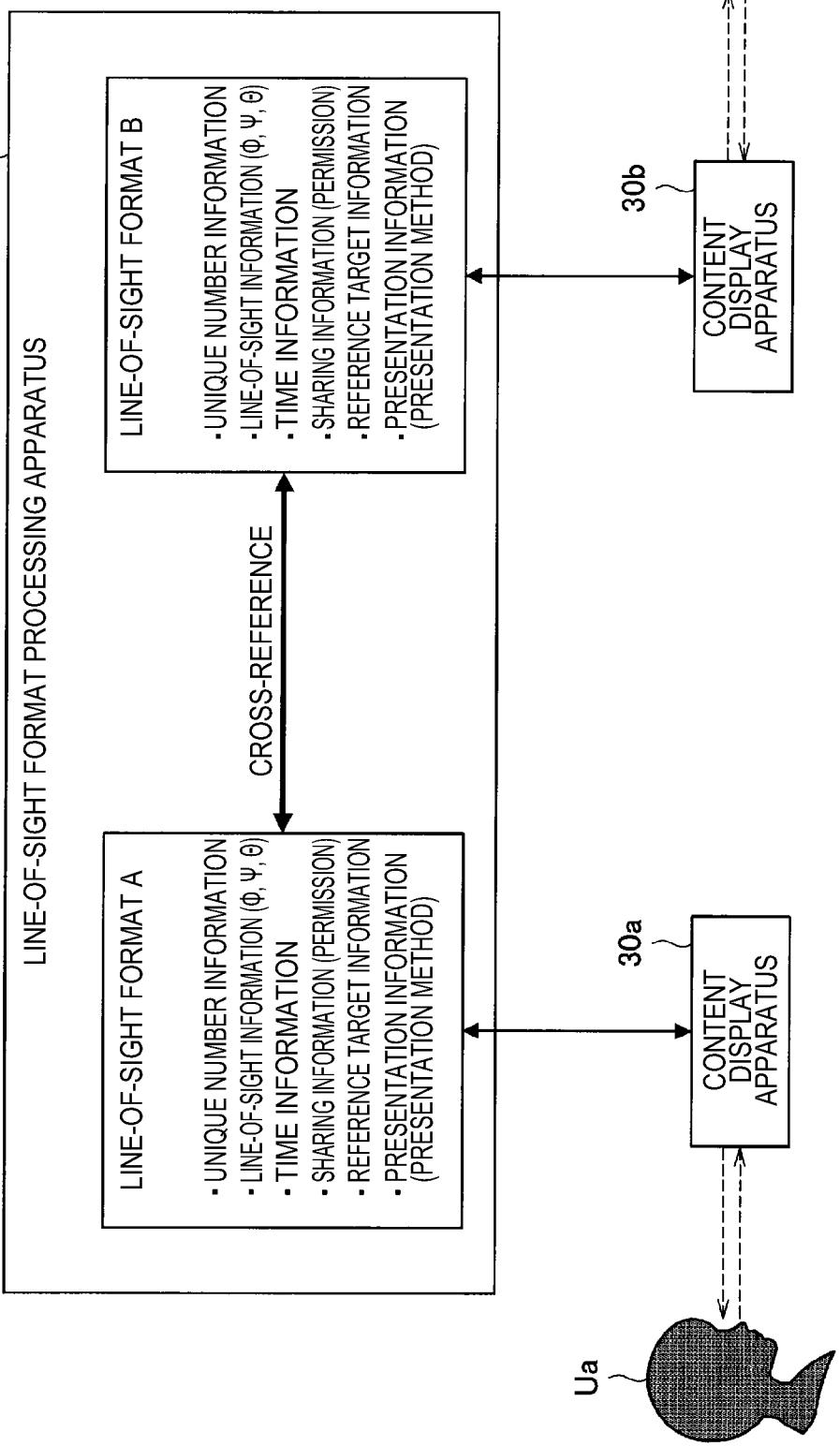
FIG. 5 is an illustrative diagram for describing a general functional configuration of an information processing system according to the embodiment.

Firstly, a general functional configuration of the information processing system according to this embodiment will be described with reference to FIG. 5. FIG. 5 is an illustrative diagram for describing the general functional configuration of the information processing system according to this embodiment.

As shown in FIG. 5, the information processing system according to this embodiment is provided with a line-of-sight format processing apparatus 10. The line-of-sight format processing apparatus 10 acquires, from the content display apparatus 30 operated by each user, line-of-sight information indicating the user's line of sight. Thereafter, the line-of-sight format processing apparatus 10 manages the acquired line-of-sight information as data so that the data can be cross-referenced by the plurality of users. Note that data for managing the acquired line-of-sight information may be hereinafter referred to as a "line-of-sight format." Note that the line-of-sight format is equivalent to an example of "control information."

As shown in FIG. 5, the line-of-sight format processing apparatus 10 acquires each user's line-of-sight information detected by the corresponding content display apparatuses 30, from the content display apparatuses 30, and generates or updates the line-of-sight format for each user on the basis of the acquired line-of-sight information.

As a specific example, the line-of-sight format processing apparatus 10 generates or updates a line-of-sight format A corresponding to the user Ua on the basis of the line-of-sight information acquired from the content display apparatus 30a used by the user Ua. Similarly, the line-of-sight format processing apparatus 10 generates or updates a line-of-sight format B corresponding to the user Ub on the basis of the line-of-sight information acquired from the content display apparatus 30b used by the user Ub.

Thereafter, the line-of-sight format processing apparatus 10 manages the line-of-sight format generated or updated for each user so that a plurality of users can cross-reference the line-of-sight formats, and thereby performs control so that the users can share their viewpoints or lines of sight as shown in FIG. 4. Note that the cross-reference of the line-of-sight formats between the users is controlled on the basis of information specified in the line-of-sight formats.

Therefore, a general data structure example of the line-of-sight format will now be described with reference to FIG. 5.

As shown in FIG. 5, the line-of-sight format includes, for example, "unique number information," "line-of-sight information," "time information," "sharing information," "reference target information," and "presentation information."

The unique number information is identification information for uniquely identifying a user Ua or a content display apparatus 30*a* used by the user Ua. A line-of-sight format is uniquely identified for each user on the basis of the unique number information. Note that the unique number information may be used as identification information for identifying each line-of-sight format.

The line-of-sight information is information indicating a user's line-of-sight direction detected by the content display apparatus 30. In an example shown in FIG. 6, the line-of-sight information includes a pitch direction component $\varphi$, a yaw direction component $\psi$, and a roll direction component $\theta$. Note that it may be considered that the visual field angle of the content display apparatus 30 may vary depending on the manufacture or model. Therefore, the line-of-sight information may include information about the visual field angle (angle of view of display) of the content display apparatus 30 in addition to the pitch direction component $\varphi$, the yaw direction component $\psi$, and the roll direction component $\theta$. As a result, the content display apparatus 30 can record, as information, an image region which has been actually observed by the user (i.e., displayed on the content display apparatus 30). Note that the above examples are merely for illustrative purposes, and the information about the visual field angle (angle of view of display) of the content display apparatus 30 is not necessarily included as information included in the line-of-sight information. Also, the information about the visual field angle (angle of view of display) of the content display apparatus 30 may be managed in association with, for example, the unique number information, separately from the line-of-sight information.

The time information is information indicating a time in a content. Specifically, the time information indicates a position in a time sequence in a content presented to a user (i.e., a time in the content), at which the user's line-of-sight direction indicated by the line-of-sight information ($\varphi$, $\psi$, $\theta$) has been detected in response to the presentation of the content.

For example, the management of the line-of-sight information and the time information in association with each other allows another apparatus (e.g., the content display apparatus 30*b*) to recognize to what object in a content played back and at what timing the user Ua is directing their line of sight. Therefore, for example, even when the users Ua and Ub refer to the same content asynchronously (i.e., the content is not shared in real time), the users Ua and Ub are allowed to share the line-of-sight information along a time sequence in the content in a pseudo-manner.

Note that at least the line-of-sight information included in the line-of-sight format may be managed for each piece of time information (i.e., each time in a content). Even in a situation where a plurality of users are asynchronously referring to the same content, such a configuration allows the users to synchronously share their lines of sight within time width along a time sequence in the content. As a more specific example, even when the users Ua and Ub perform viewing at different timings (e.g., immediately after the user Ua has finished viewing a content, the user Ub starts viewing the same content), the users Ua and Ub can synchronously share their lines of sight along a time sequence in the content.

Also, when the time information is managed in association with the line-of-sight information, the line-of-sight format processing apparatus 10 may acquire the line-of-sight information together with the time information from the content display apparatus 30.

The sharing information is information which is equivalent to typically called permission, and is for designating a range of other users for which a user's line of sight corresponding to a line-of-sight format is published, or a range (type) of information which is published for those other users. Note that the method of designating a range of other users for which a line of sight is published is not particularly limited. For example, a line of sight may be published for all other users. Also, when an explicit setting is not provided (i.e., as a default setting), users for which publication is made may not be limited in the specification.

As a more specific example, in the line-of-sight format A of the user Ua, when the sharing information is updated so that publication is permitted only for the user Ub, control can be performed so that the user Ua's line-of-sight information is published only for the user Ub, and the other users are not allowed to refer to the user Ua's line-of-sight information.

Also, as another example, a configuration may be provided so that a range of information which is included in the line-of-sight format can be designated for the sharing information, whereby the level of publication of information can be set for each of the other users separately. Also, a configuration may be provided so that a range of other users for which the line of sight is published, or the level of publication of information, can be set for, for example, each content.

The reference target information is information for designating another user's line-of-sight format which is referred to by a user corresponding to a line-of-sight format. As a specific example, when the user Ua refers to the user Ub's line of sight, information indicating the line-of-sight format B of the user Ub is specified in the reference target information of the line-of-sight format A corresponding to the user Ua. Note that specific examples of information indicating a line-of-sight format which is designated in the reference target information include identification information for identifying the line-of-sight format, an address for referring to the line-of-sight format, and the like.

Thus, for example, the line-of-sight format B corresponding to another user (Ub) is referred to from the line-of-sight format A corresponding to the user Ua through the reference target information. In other words, the line-of-sight format A and the line-of-sight format B are associated with each other through the reference target information.

Note that, in the above example, information included in the line-of-sight format B which the user Ub publishes for the user Ua is controlled on the basis of the settings of the sharing information included in the line-of-sight format B. As a specific example, when the user Ub limits the publication of information for the user Ua, then even if information included in the line-of-sight format B is designated in the reference target information of the line-of-sight format A, the user Ua is not allowed to refer to the user Ub's viewpoint or line of sight.

Similarly, when information indicating the line-of-sight format A corresponding to the user Ua is designated in the reference target information of the line-of-sight format B corresponding to the user Ub, the line-of-sight format A is referred to from the line-of-sight format B. Note that, in this case, information included in the line-of-sight format A which the user Ua publishes for the user Ub is controlled on the basis of the settings of the sharing information included in the line-of-sight format A.

Note that, in the reference target information, not only a single user's line-of-sight format can be designated, but also the line-of-sight formats of a plurality of users can be designated. Thus, line-of-sight formats generated or updated for a plurality of users, respectively, can be managed to be cross-referenced between each user, on the basis of the settings of the reference target information.

Also, the presentation information is information for designating a presentation method for presenting, for example, to the user Ua of the line-of-sight format A for which the presentation information is defined, another user's line of sight or viewpoint.

An example of the presentation method for presenting another user's line of sight is a method of presenting, in the partial image v11 presented to the user Ua, the identification information v21b and v21c indicating that another user's reference range on the basis of that other user's line-of-sight information, as shown in FIG. 4. Also, another example is a method of presenting, to the user Ua of the line-of-sight format A, the partial image v11b which is being referred to by another user (Ub) (i.e., the user Ub's viewpoint).

Note that the line-of-sight information and the time information are sequentially supplemented or updated on the basis of information detected by the content display apparatus 30, i.e., the line-of-sight information and time information transmitted from the content display apparatus 30.

Meanwhile, the settings for presenting the line of sight to another user such as the sharing information, the reference target information, the presentation information, and the like may be previously set or may be updated according to the user's instruction. As a specific example, the line-of-sight format processing apparatus 10 may update the sharing information, reference target information, and presentation information included in the line-of-sight format A, on the basis of the user Ua's user input through a user terminal, such as, for example, a smartphone or the like, or the content display apparatus 30.

As described above, the line-of-sight format processing apparatus 10 according to this embodiment collects the line-of-sight information detected by the content display apparatuses 30, and generates or updates the line-of-sight format for each user on the basis of the collected line-of-sight information. Thereafter, the line-of-sight format processing apparatus 10 manages the line-of-sight format generated or updated for each user so that the line-of-sight formats can be cross-referenced between the users (i.e., between the respective content display apparatuses 30 of the users). As a result, as shown in, for example, FIG. 4, the users are allowed to share their viewpoints or lines of sight.

1.3. System Configuration

Figure 6:
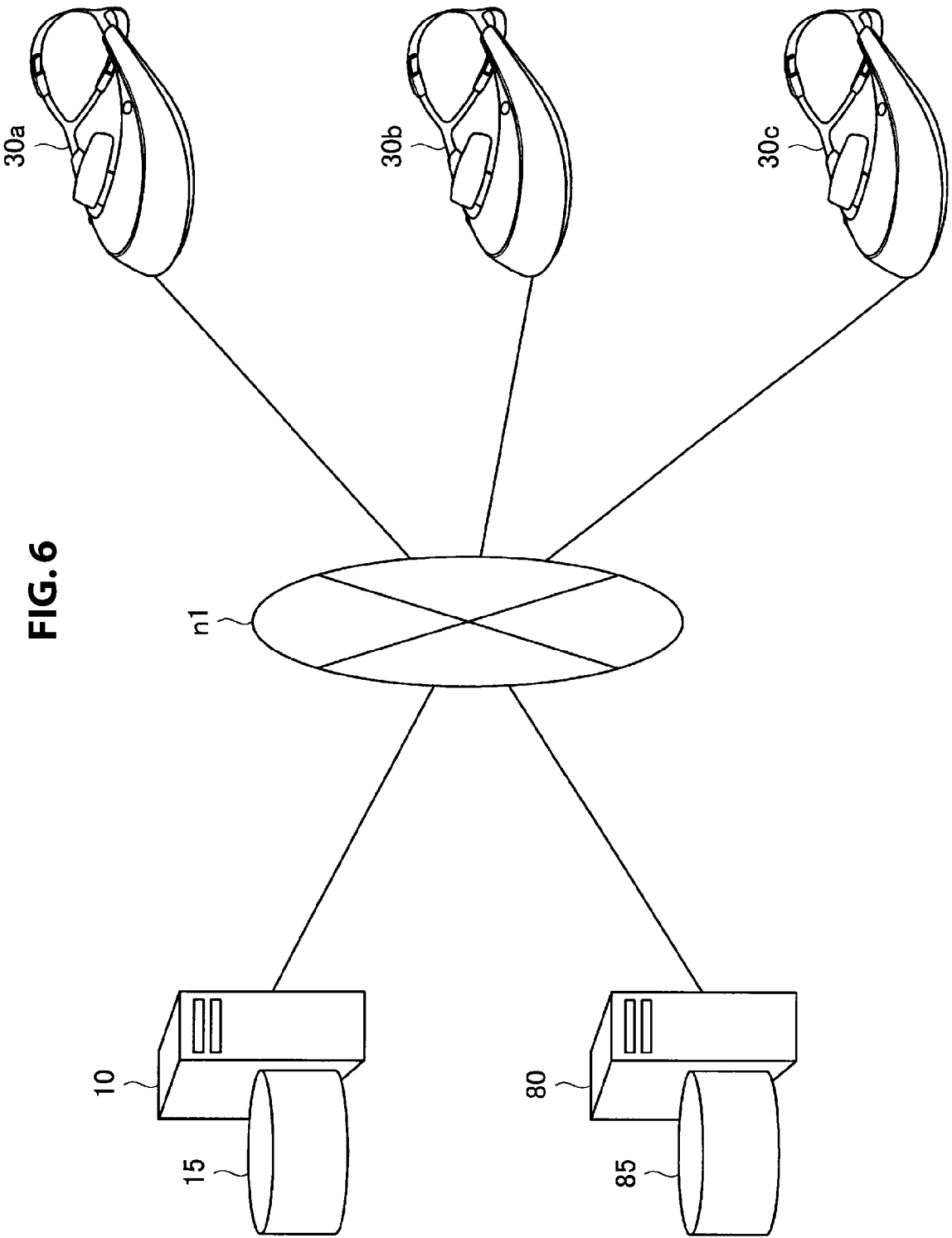
FIG. 6 is an illustrative diagram for describing a system configuration example of an information processing system according to the embodiment.

Next, as a system configuration example of the information processing system according to this embodiment, an example of the system for allowing users to share their viewpoints or lines of sight, which has been described with reference to FIG. 4 and FIG. 5, will be described with reference to FIG. 6. FIG. 6 is an illustrative diagram for describing the system configuration example of the information processing system according to this embodiment.

As shown in FIG. 6, the information processing system according to this embodiment includes a line-of-sight format processing apparatus 10, a line-of-sight format storage unit 15, a plurality of content display apparatuses 30, a content server 80, and a content storage unit 85. Note that, in the example shown in FIG. 5, as the plurality of content display apparatuses 30, content display apparatuses 30a to 30c are provided. Also, in the description that follows, when the content display apparatuses 30a to 30c are not particularly distinguished from each other, the content display apparatuses 30a to 30c may each be simply referred to as the "content display apparatus 30."

The line-of-sight format processing apparatus 10, the content display apparatus 30a to 30c, and the content server 80 are connected together so that they can communicate with each other through a network n1. The network n1 may be configured by, for example, the Internet, a dedicated line, a local area network (LAN), a wide area network (WAN), or the like. Note that the form of the network n1 is not limited, if the network n1 is any network that connects different apparatuses together.

Also, the position where the line-of-sight format storage unit 15 is provided is not particularly limited, if the line-of-sight format processing apparatus 10 is allowed to refer to the line-of-sight format storage unit 15. For example, the line-of-sight format storage unit 15 may be provided in the line-of-sight format processing apparatus 10 or may be provided as an external apparatus different from the line-of-sight format processing apparatus 10.

Similarly, the position where the content storage unit 85 is provided is not particularly limited, if the content server 80 is allowed to refer to the content storage unit 85. For example, the content storage unit 85 may be provided in the content server 80 or may be provided as an external apparatus different from the content server 80.

The content display apparatuses 30a to 30c are equivalent to the content display apparatus 30 described with reference to FIG. 1. The content display apparatus 30 presents contents distributed from the content server 80 described below to the user.

Also, the content display apparatus 30 detects the user's line-of-sight direction, and transmits line-of-sight information indicating the detected line-of-sight direction to the line-of-sight format processing apparatus 10 described below.

The line-of-sight format processing apparatus 10 acquires line-of-sight information indicating each user's line-of-sight direction detected by the corresponding content display apparatus 30, from the content display apparatus 30. Thereafter, the line-of-sight format processing apparatus 10 generates or updates the line-of-sight format on the basis of the acquired line-of-sight information. Thus, the line-of-sight format processing apparatus 10 generates or updates the line-of-sight format for each user, and manages the respective line-of-sight formats of the users so that the line-of-sight formats can be cross-referenced between the plurality of users (i.e., between the respective content display apparatuses 30 of the plurality of users).

Note that the method for managing, i.e., generating or updating, the line-of-sight format for each user is as described above with reference to FIG. 5.

Also, the line-of-sight format processing apparatus 10 manages the line-of-sight format for each user by storing the line-of-sight format in the line-of-sight format storage unit 15 in association with a content. Note that the line-of-sight format processing apparatus 10 may manage each user's line-of-sight format for each of a plurality of contents.

Thereafter, the line-of-sight format processing apparatus 10 outputs each line-of-sight format which has been generated or updated for the corresponding user and is associated with a content, to the content server 80.

The content server 80 reads a content which is to be distributed to each content display apparatus 30, from the content storage unit 85. The content storage unit 85 is a storage unit for storing contents. Note that an example of the contents is the video content v0 described with reference to FIG. 4.

Also, the content server 80 acquires, from the line-of-sight format processing apparatus 10, each user's line-of-sight format associated with a content to be distributed.

Thereafter, on the basis of settings designated in each user's line-of-sight format, the content server 80 controls presentation of a content to be distributed to the user corresponding to the line-of-sight format.

For example, on the basis of each user's line-of-sight format thus acquired, the content server 80 extracts a region in the content indicated by the line-of-sight information included in the line-of-sight format, for each user, and presents a partial image of the extracted region to the user.

As a specific example, in the example shown in FIG. 4, the content server 80 extracts, on the basis of the line-of-sight format A of the user Ua, the partial image v11 indicated by the user Ua's line-of-sight direction from the video content v0. Thereafter, the content server 80 may present the partial image v11 to the user Ua by distributing the extracted partial image v11 to the user Ua's content display apparatus 30.

Also, at this time, the content server 80 may present the reference range of another user (Ub) on the partial image v11 indicated by the user Ua's line-of-sight direction, in a manner which allows the reference range to be identified, on the basis of the user Ub's line-of-sight format B.

In this case, the content server 80 refers to the line-of-sight format B designated in the reference target information included in the line-of-sight format A, and identifies the user Ub's reference range in a content to be distributed, on the basis of the line-of-sight information included in the line-of-sight format B. Thereafter, if the identified reference range is included in the partial image v11 indicated by the user Ua's line-of-sight direction, the content server 80 presents the reference range in a corresponding region in the partial image v11, in a manner which allows the reference range to be identified.

Note that the presentation method is not particularly limited, if the user Ub's reference range can be presented in a manner which allows the reference range to be identified. As a specific example, the content server 80 may present the user Ub's reference range to the user Ua by highlighting and emphasizing a region corresponding to the user Ub's reference range in the partial image v11 indicated by the user Ua's line-of-sight direction.

Also, the content server 80 may present, to the user Ua, the partial image v11b indicated by the user Ub's line-of-sight direction.

In this case, the content server 80 refers to the line-of-sight format B designated in the reference target information included in the line-of-sight format A, and extracts the partial image v11b indicated by the user Ub's line-of-sight direction, from a content to be distributed, on the basis of the line-of-sight information included in the line-of-sight format B. Thereafter, the content server 80 presents the partial image v11b indicated by the user Ub's line-of-sight direction to the user Ua by distributing the extracted partial image v11b to the user Ua's content display apparatus 30. Thus, by temporarily changing the user Ua's field of view to the user Ub's field of view, the user Ua can visually recognize to what part of a content the user Ub is referring at that time.

Note that when the user Ub's field of view is presented in the user Ua's field of view, the content server 80 may switch an image to be presented to the user Ua back to the partial image v11a, which was originally observed by the user Ua, for example, after a predetermined period of time has elapsed or in response to the user Ua's request.

Also, the user Ub's field of view may be presented to the user Ua according to an instruction from the user Ub.

Specifically, when the user Ub desires to share their own (the user Ub's) line of sight or field of view with the user Ua, the user Ub can transmit a request for sharing of the line of sight with the user Ua to the line-of-sight format processing apparatus 10 by operating their own content display apparatus 30. In response to the received request for sharing of the line of sight, the line-of-sight format processing apparatus 10 performs control so that the user Ua's field of view is replaced with the user Ub's field of view. As a result, the user Ub is allowed to communicate with the user Ua while presenting, to the user Ua, a video which the user Ub is viewing.

Note that, in this case, for example, for another user set in the sharing information, information for deciding whether or not the user is authorized to control the field of view, may be included in the line-of-sight format.

Also, the user Ua and the user Ub may be viewing a content at the same time (in real time). Meanwhile, the user Ua and the user Ub may be viewing a content asynchronously (in different time zones). Thus, assuming that a plurality of users are asynchronously viewing a content, each user may set a tag for sharing the line of sight (also hereinafter referred to as a "line-of-sight sharing tag") for a portion (video) which the user desires to share with another user.

As a specific example, for a desired video in a viewed content, the user Ub may be allowed to add the line-of-sight sharing tag for sharing the video with another user to the video, according to an operation through the content display apparatus 30.

In this case, for example, the user Ub can transmit a request for setting of a line-of-sight sharing tag for a video (field of view) which the user Ub desires to share with another user, to the line-of-sight format processing apparatus 10, by operating their own content display apparatus 30. In response to the received request for setting of a line-of-sight sharing tag, the line-of-sight format processing apparatus 10 generates a line-of-sight sharing tag which is information in which a content, the time information of the content, and the user Ub's line-of-sight direction are associated with each other. Thereafter, the line-of-sight format processing apparatus 10 may notify the content server 80 of the generated line-of-sight sharing tag. As a result, the content server 80 can recognize the value of the line-of-sight sharing tag, and present, to a desired user, a video corresponding to a value set in the line-of-sight sharing tag.

Note that the line-of-sight sharing tag may contain information about a user with which sharing is desired (e.g., information indicating the user Ua). Such a configuration allows only arbitrary users to share a video (field of view).

Note that when the user Ua's field of view is changed according to the user Ub's instruction (e.g., the user Ua's field of view is changed to the user Ub's field of view), the user Ua may decide whether or not to change the field of view. In this case, for example, the line-of-sight format processing apparatus 10 (or the content server 80) may notify the user Ua that a request relating to changing of the user Ua's field of view has been received, through the content display apparatus 30a operated by the user Ua, and accept, from the user Ua, an instruction indicating whether or not to permit changing of the field of view. Thereafter, only when the user Ua permits changing of the field of view, the line-of-sight format processing apparatus 10 (or the content server 80) may perform control that the user Ub's field of view is presented to the user Ua.

Also, the form of the content server 80 is not particularly limited, if the content server 80 can present, to the user Ua, information based on the user Ub's line-of-sight direction. As a specific example, the content server 80 may simply present, to the user Ua, a position in the content v0 indicated by the user Ub's line of sight.

Note that, as described above with reference to FIG. 5, the content server 80 controls the above method of controlling presentation of a content to each user, i.e., the method of presenting another user's line of sight or viewpoint to each user, on the basis of the setting value of the presentation information included in each user's line-of-sight format. Similarly, the content server 80 controls a reference relationship between the line-of-sight formats of users, on the basis of the setting values of the sharing information and reference target information included in each line-of-sight format.

In the foregoing, a system configuration example of the information processing system according to this embodiment has been described with reference to FIG. 6.

1.4. Functional Configuration

Figure 7:
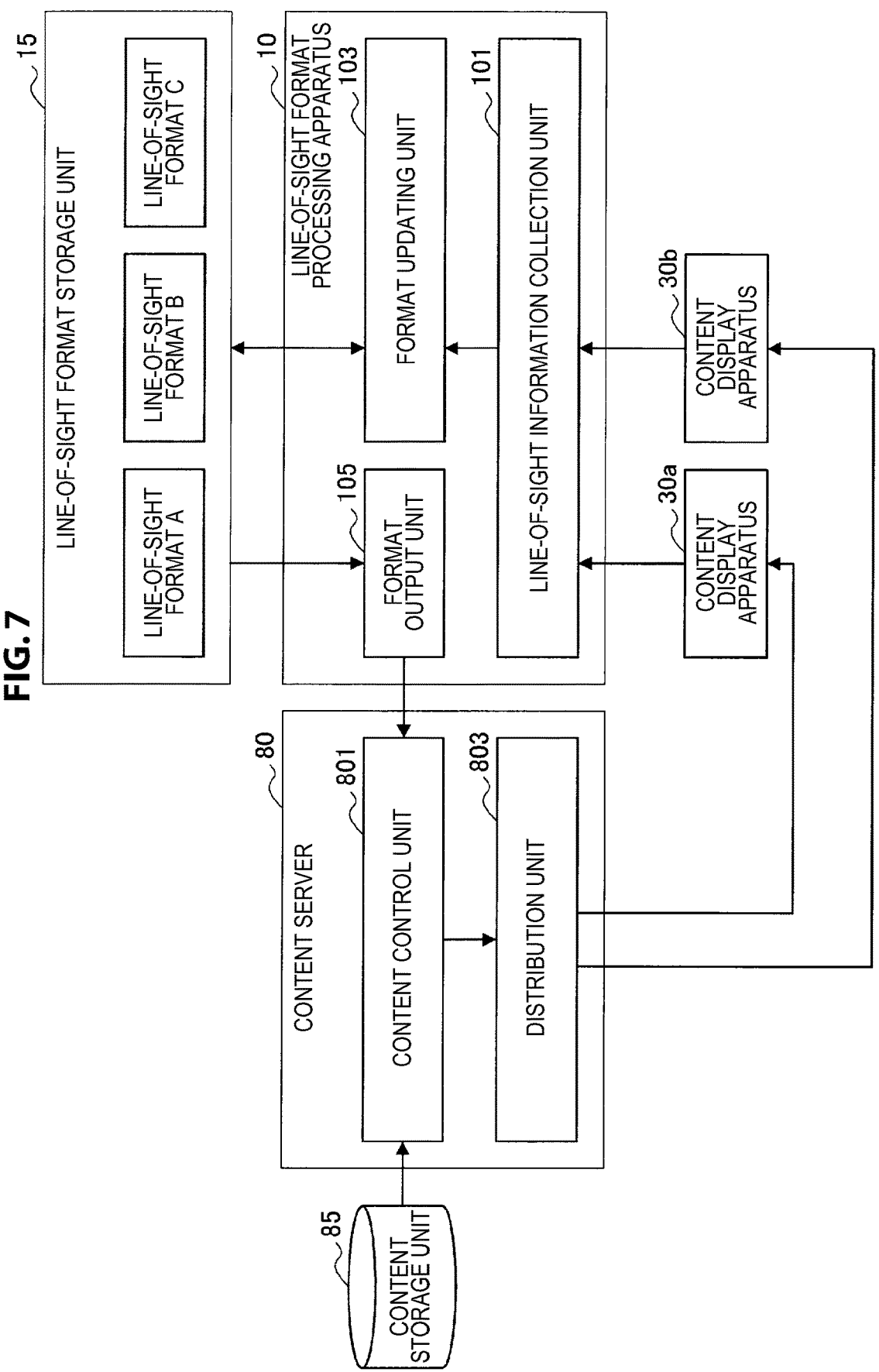
FIG. 7 is a block diagram showing a functional configuration example of an information processing system according to the embodiment.

Next, a functional configuration example of the information processing system according to this embodiment will be described with reference to FIG. 7. In particular, much attention is paid to the functional configurations of the line-of-sight format processing apparatus 10 and the content server 80. FIG. 7 is a block diagram showing the functional configuration example of the information processing system according to this embodiment. Note that, in the example shown in FIG. 7, a case example is shown in which, as the content display apparatuses 30, a content display apparatus 30a which is operated by a user Ua, and a content display apparatus 30b which is operated by a user Ub, are provided.

Firstly, a functional configuration example of the line-of-sight format processing apparatus 10 will be described. As shown in FIG. 7, the line-of-sight format processing apparatus 10 includes a line-of-sight information collection unit 101, a format updating unit 103, and a format output unit 105.

The line-of-sight information collection unit 101 acquires, from each content display apparatus 30, line-of-sight information indicating the user's line-of-sight direction detected by the content display apparatus 30 in response to presentation of a content to the user. At this time, the line-of-sight information collection unit 101 may acquire, in addition to the line-of-sight information, time information indicating a time in the content corresponding to a timing at which the line-of-sight information was detected, from the content display apparatus 30. Note that, in the description that follows, it is assumed that the line-of-sight information collection unit 101 acquires the time information together with the line-of-sight information from the content display apparatus 30.

The line-of-sight information collection unit 101 outputs the line-of-sight information and time information acquired from the content display apparatuses 30, to the format updating unit 103, for each user (i.e., for each content display apparatus 30).

Note that the method of identifying a user corresponding to the acquired line-of-sight information and time information is not particularly limited, if the line-of-sight information collection unit 101 can identify a user corresponding to the acquired line-of-sight information and the time information. As a specific example, the line-of-sight information collection unit 101 may previously manage the content display apparatuses 30 and the users in association with each other, and identify a user corresponding to a content display apparatus 30 which is a transmission source of the line-of-sight information and the time information. Also, as another example, the line-of-sight information collection unit 101 may acquire identification information for identifying a user together with the line-of-sight information and the time information from a content display apparatus 30, and identify the user on the basis of the identification information.

The format updating unit 103 acquires the line-of-sight information and the time information from the line-of-sight information collection unit 101 for each user. The format updating unit 103 extracts the line-of-sight format of the user corresponding to the acquired line-of-sight information and time information, from the line-of-sight format storage unit 15, and updates the extracted line-of-sight format on the basis of the acquired line-of-sight information and time information.

As a specific example, the format updating unit 103, when acquiring the line-of-sight information and the time information from the content display apparatus 30a operated by the user Ua, extracts the line-of-sight format A corresponding to the user Ua from the line-of-sight format storage unit 15. At this time, the format updating unit 103 may identify the line-of-sight format A corresponding to the user Ua by referring to the unique number information included in each line-of-sight format.

Thereafter, the format updating unit 103 updates the line-of-sight format A for each piece of time information thus acquired, by recording the acquired line-of-sight information into the line-of-sight format A.

Note that when the corresponding line-of-sight format has not been successfully extracted, the format updating unit 103 may newly generate a line-of-sight format on the basis of the acquired line-of-sight information and time information. In this case, the format updating unit 103 may store the newly generated line-of-sight format in the line-of-sight format storage unit 15, in association with a user corresponding to the line-of-sight information and the time information.

At this time, the format updating unit 103 may apply predetermined setting values (typically called "default values") to information other than the unique number information (information indicating a user), line-of-sight information, and time information included in the line-of-sight format. Also, as another example, the format updating unit 103 may acquire the above other information on the basis of a user's input through a user terminal (not shown), such as a smartphone or the like, or the content display apparatus 30.

Also, the format updating unit 103 may update at least a portion of the information included in the line-of-sight format stored in the line-of-sight format storage unit 15 for each user, on the basis of the user's input through a user terminal (not shown), such as a smartphone or the like, or the content display apparatus 30. Examples of the information to be updated in the line-of-sight format include the sharing information, reference target information, and presentation information shown in FIG. 5.

Thus, the line-of-sight information collection unit 101 and the format updating unit 103 acquire the line-of-sight information and the time information from each content display apparatus 30, and generate or update the line-of-sight format stored in the line-of-sight format storage unit 15 on the basis of the acquired line-of-sight information and time information.

Note that the timing at which the line-of-sight information collection unit 101 acquires the line-of-sight information and the time information from the content display apparatus 30 is not particularly limited, and may be set as appropriate, depending on the operation.

As a specific example, the line-of-sight information collection unit 101 may play a main role in operation so that the line-of-sight information collection unit 101 sequentially collects the line-of-sight information and the time information from each content display apparatus 30 at each predetermined timing. Also, as another example, each content display apparatus 30 may play a main role in operation so that the content display apparatus 30 sequentially transmits the line-of-sight information and the time information to the line-of-sight information collection unit 101 at each predetermined timing.

Also, when the content display apparatus 30 plays a main role in operation, the content display apparatus 30 may transmit the line-of-sight information and the time information to the line-of-sight information collection unit 101 in association with a predetermined operation.

As a specific example, the content display apparatus 30 may sequentially detect the user's line-of-sight direction and thereby monitor the line-of-sight direction, and when the line-of-sight direction has changed by a predetermined amount or more, transmit the line-of-sight direction and the time information to the line-of-sight information collection unit 101.

Also, the timing at which the line-of-sight information collection unit 101 acquires the line-of-sight information and the time information from each content display apparatus 30, and the timing at which the format updating unit 103 updates the line-of-sight format on the basis of the line-of-sight information and the time information, may not be necessarily synchronous. Of course, when the content display control based on the line-of-sight information is fed back to a plurality of content display apparatuses 30 in real time, it is desirable that the acquisition of the line-of-sight information and the time information, and the updating of the line-of-sight format, should be synchronous.

Also, the frequency at which the line-of-sight information collection unit 101 acquires the line-of-sight information and the time information from each content display apparatus 30, and the frequency at which the format updating unit 103 generates or updates the line-of-sight format on the basis of the line-of-sight information and the time information, do not necessarily need to be equal to each other.

As a specific example, the format updating unit 103 may generate line-of-sight information indicating changes in the line-of-sight direction in 100-ms intervals on the basis of an average value or a statistical value based on the line-of-sight information and the time information for 10 samples acquired in 10-ms intervals. In this case, on the basis of the generated line-of-sight information indicating the line-of-sight direction in 100-ms intervals, and the time information corresponding to the line-of-sight information in 100-ms intervals, the format updating unit 103 may generate or update the corresponding line-of-sight format. Also, although an example has been described above in which the line-of-sight information and the time information are stored for an entire content viewed by a user, only the line-of-sight information and the time information corresponding to a predetermined most recent period of time may be stored in order to reduce the amount of stored information. In this case, for example, the old line-of-sight information and time information may be overwritten with the most recent line-of-sight information and time information so that only the most recent line-of-sight information and time information are held.

The format output unit 105 reads the line-of-sight format stored in the line-of-sight format storage unit 15 for each user, and transmits the read line-of-sight format to the content server 80.

Note that the timing at which the format output unit 105 reads the line-of-sight format from the line-of-sight format storage unit 15, and transmits the read line-of-sight format to the content server 80, is not particularly limited, and may be set as appropriate, depending on the operation.

As a specific example, the format output unit 105 may read each line-of-sight format from the line-of-sight format storage unit 15, and output the read line-of-sight format to the content server 80, at each predetermined timing.

Also, as another example, the format output unit 105 may read a line-of-sight format from the line-of-sight format storage unit 15, and output the read line-of-sight format to the content server 80, in association with a predetermined operation.

As a specific example, the format output unit 105, when at least a portion of the line-of-sight formats have been generated or updated, may read each line-of-sight format from the line-of-sight format storage unit 15, and output the read line-of-sight format to the content server 80.

Note that the timing at which the format updating unit 103 updates the line-of-sight format, and the timing at which the format output unit 105 reads and transmits the line-of-sight format to the content server 80, may not necessarily be synchronous. Of course, when the content display control based on the line-of-sight information is fed back to a plurality of content display apparatuses 30 in real time, it is desirable that the updating of the line-of-sight format, and the reading and outputting of the line-of-sight format, should be synchronous.

Also, the format output unit 105 does not necessarily need to recognize all line-of-sight formats as an object to be transmitted to the content server 80. As a specific example, the format output unit 105 may recognize only a line-of-sight format(s) newly generated or updated as an object to be transmitted to the content server 80. Also, at this time, on the basis of the reference target information included in the read line-of-sight format, the format output unit 105 may recognize another line-of-sight format referred to by the line-of-sight format as an additional object to be transmitted to the content server 80.

Also, as described above, the line-of-sight format processing apparatus 10 may manage line-of-sight formats by storing, in the line-of-sight format storage unit 15, each of a plurality of contents in association with the corresponding line-of-sight format for each user.

Specifically, the line-of-sight information collection unit 101 may acquire, in addition to the line-of-sight information and the time information, identification information for identifying a content which a user is viewing, from the content display apparatus 30. In this case, the format updating unit 103 may associate a line-of-sight format generated or updated on the basis of the line-of-sight information and the time information with the acquired content identification information, and thereby store the line-of-sight format in the line-of-sight format storage unit 15 for each content.

Also, the format output unit 105 may read a line-of-sight format from the line-of-sight format storage unit 15, for each content, on the basis of the identification information of the content, and transmit the read line-of-sight format to the content server 80 for each content.

Also, at this time, the format output unit 105 may transmit, to the content server 80, a line-of-sight format associated with the identification information of a content. As a result, the content server 80 is allowed to recognize a content corresponding to the acquired line-of-sight format on the basis of the identification information.

Note that the method of allowing the content server 80 to identify a content corresponding to an acquired line-of-sight format is, of course, not limited to the method based on the identification information of the content. For example, a configuration may be provided in which the content server 80 designates a content, and according to the designation of the content, the format output unit 105 outputs a line-of-sight format corresponding to the designated content to the content server 80.

Next, a functional configuration example of the content server 80 will be described. As shown in FIG. 7, the content server 80 includes a content control unit 801 and a distribution unit 803.

The content control unit 801 reads a content v0 which is to be distributed to each content display apparatus 30, from the content storage unit 85. Also, the content control unit 801 acquires, from the line-of-sight format processing apparatus 10, each user's line-of-sight format associated with a content to be distributed.

The content control unit 801 analyzes each user's line-of-sight format thus acquired, and based on the result of the analysis of the line-of-sight format, controls presentation of a content to be distributed to a content display apparatus 30 which is controlled by the user. An operation of the content control unit 801 will now be described in detail, indicating a case example in which the line-of-sight format A corresponding to the user Ua is to be processed.

Initially, the content control unit 801 refers to the presentation information included in the line-of-sight format A, and decides whether to present, to the user Ua, an image based on the user Ua's line of sight or an image based on another user's (Ub) line of sight. A "case where an image based on the user Ua's line of sight is presented" or a "case where an image based on another user's (Ub) line of sight is presented" will now be separately described.
(Case Where an Image Based on the User Ua's Line of Sight is Presented)

When an image based on the user Ua's line of sight is presented, the content control unit 801 extracts the line-of-sight information ($\varphi$, $\psi$, $\theta$) at each time in the content v0 indicated by the time information included in the line-of-sight format A.

Thereafter, the content control unit 801 identifies a position in the content v0 indicated by the extracted line-of-sight information ($\varphi$, $\psi$, $\theta$). Note that, as shown in FIG. 2 to FIG. 4, when an omnidirectional video is simulated, a position which is the starting point of a line of sight is previously determined with respect to the content v0. Therefore, the content control unit 801 can identify a position in the content v0 with which the user's line of sight intersects, on the basis of the components ($\varphi$, $\psi$, $\theta$) indicated by the line-of-sight information.

Thereafter, the content control unit 801 extracts, from the content v0, the partial image v11 which is indicated by the position in the content v0 indicated by the line-of-sight information, on the preset visual field angle.

Note that the visual field angle for extracting the partial image v11 may be invariable, or may be changed according to the user's operation or the like. When the visual field angle for extracting the partial image v11 can be changed according to the user's operation or the like, information indicating the visual field angle may be included in the line-of-sight format, for example. In this case, the line-of-sight format processing apparatus 10 may acquire the information indicating visual field angle set in the content display apparatus 30 from the content display apparatus 30, and set that information in the line-of-sight format.

Also, the content control unit 801 extracts another user's (Ub) line-of-sight format (B) referred to from the line-of-sight format A, on the basis of the reference target information included in the line-of-sight format A. Thereafter, the content control unit 801 recognizes the range of information included in the line-of-sight format B which is published for the user Ua, on the basis of the sharing information included in the extracted line-of-sight format B.

When the line-of-sight information and time information included in the line-of-sight format B are published for the user Ua, the content control unit 801 identifies the reference range of the user Ub (i.e., a region in the content v0 indicated by the user Ub's line of sight) on the basis of the published information. Thereafter, the content control unit 801 presents the identified reference range of the user Ub to the user Ua in a manner which allows the user Ua to identify the reference range of the user Ub.

Specifically, the content control unit 801 identifies a position in the content v0 indicated by the line-of-sight information included in the line-of-sight format B, at each time in the content v0 indicated by the time information included in the line-of-sight format B. Thereafter, the content control unit 801 identifies the reference range of the user Ub in the content v0 on the basis of the identified position and the user Ub's visual field angle. Note that the visual field angle is handled in a manner similar to that for the case of the user Ua.

When the identified reference range of the user Ub is included in the partial image v11 indicated by the user Ua's line-of-sight direction, the content control unit 801 presents the reference range in a corresponding region in the partial image v11 in a manner which allows the user Ua to identify the reference range.

Thereafter, the content control unit 801 outputs the partial image v11 in which the reference range of the user Ub is presented, as a partial content to be distributed to the content display apparatus 30a operated by the user Ua, to the distribution unit 803.

Note that, of course, when the line-of-sight information and time information included in the line-of-sight format B are not published for the user Ua, the content control unit 801 limits presentation of the reference range of the user Ub in the partial image v11 (e.g., no presentation). Also, at this time, the content control unit 801 may notify the user Ua of notification information indicating that the publication of the user Ub's information for the user Ua is limited, by presenting the notification information in the partial image v11.
(Case Where an Image Based on Another User's (Ub) Line of Sight is Presented)

Next, an operation of the content control unit 801 in a case where an image based on another user's (Ub) line of sight (i.e., the user Ub's viewpoint) is presented to the user Ua, will be described.

Initially, the content control unit 801 extracts another user's (Ub) line-of-sight format (B) which is referred to from the line-of-sight format A, on the basis of the reference target information included in the line-of-sight format A. Thereafter, the content control unit 801 recognizes the range of information included in the line-of-sight format B which is published for the user Ua, on the basis of the sharing information included in the extracted line-of-sight format B.

When the line-of-sight information and time information included in the line-of-sight format B are published for the user Ua, the content control unit 801 extracts the partial image v11b based on the user Ub's line of sight from the content v0, on the basis of the published information. Thereafter, the content control unit 801 presents the extracted partial image v11b to the user Ua.

Specifically, the content control unit 801 extracts the line-of-sight information ($\varphi$, $\psi$, $\theta$) included in the line-of-sight format B at each time in the content v0 indicated by the time information included in the line-of-sight format B, and identifies a position in the content v0 indicated by the line-of-sight information ($\varphi$, $\psi$, $\theta$).

Thereafter, the content control unit 801 extracts, from the content v0, the partial image v11b which is a portion indicated by the position in the content v0 indicated by the extracted line-of-sight information, on the basis of a preset visual field angle.

Note that the visual field angle for extracting the partial image v11b may be invariable, or may be changed according to the user's operation or the like, as in the "case where an image based on the user Ua's line of sight is presented."

The content control unit 801 outputs the extracted partial image v11b, i.e., an image based on the user Ub's line of sight, as a partial content to be distributed to the content display apparatus 30a operated by the user Ua, to the distribution unit 803.

Note that, of course, when the line-of-sight information and time information included in the line-of-sight format B are not published for the user Ua, the content control unit 801 limits presentation of the partial image v11b to the user Ua (e.g., no presentation). In this case, the content control unit 801 may output the partial image v11 based on the user Ua's line-of-sight direction, instead of the partial image v11b, as a partial content to be distributed to the content display apparatus 30a, to the distribution unit 803. Also, at this time, the content control unit 801 may notify the user Ua of notification information indicating that the publication of information of the user Ub to the user Ua, by presenting the notification in the partial image v11.

The distribution unit 803 acquires a partial content extracted on the basis of the result of analysis of each user's line-of-sight format, from the content control unit 801 for each user. Thereafter, the distribution unit 803 distributes the partial content acquired for each user to a content display apparatus 30 operated by the user.

Note that the method of allowing the distribution unit 803 to identify a content display apparatus 30 operated by each user, is not particularly limited. As a specific example, the distribution unit 803 may previously store management information in which identification information for identifying each user (e.g., the unique number information included in the line-of-sight format), and information for identifying a content display apparatus 30 operated by the user, are associated with each other. In this case, the distribution unit 803 may acquire, from the content control unit 801, a partial content to be distributed together with identification information of a user to which the partial content is to be distributed (i.e., the unique number information included in the line-of-sight format), and check the acquired identification information against the management information to identify a content display apparatus 30 to which the partial content is to be distributed.

Also, as another example, the distribution unit 803 may accept designation of a user from the content display apparatus 30, and distribute a partial content corresponding to the designated user to the content display apparatus 30. In this case, the distribution unit 803 may acquire identification information for identifying a user (i.e., information equivalent to the unique number information included in the line-of-sight format) from the content display apparatus 30, and distribute a partial content corresponding to the acquired identification information to the content display apparatus 30.

Note that, for each of a plurality of contents, the content server 80 may control presentation of the content to each content display apparatus 30 (i.e., distribution of a partial content).

In this case, the content control unit 801 and the distribution unit 803 may perform the above-described processes for each content. Specifically, for each content, the content control unit 801 acquires a line-of-sight format corresponding to the content, and extracts a partial content on the basis of the line-of-sight format.

Thereafter, for each content, the distribution unit 803 may distribute a partial content which is output from the content control unit 801 for each user, as appropriate, to a content display apparatus 30 operated by the user. Note that, at this time, a user for which distribution is to be made can, of course, be identified on the basis of a line-of-sight format associated with a content to be distributed.

In the foregoing, a functional configuration example of the information processing system according to this embodiment has been described with reference to FIG. 7, particularly paying much attention to functional configurations of the line-of-sight format processing apparatus 10 and the content server 80. Note that the content control unit 801 is equivalent to an example of a "control unit" of the content server 80.

Figure 8:
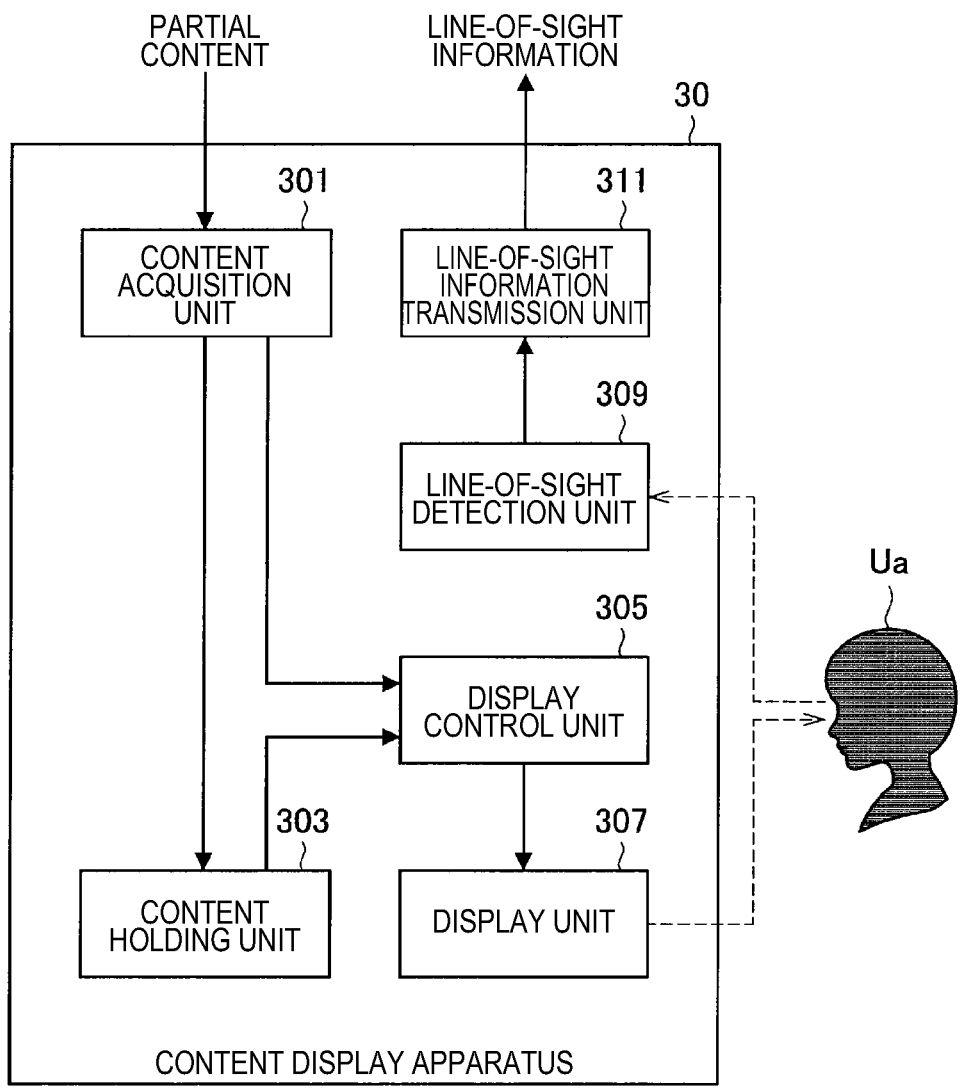
FIG. 8 is a block diagram showing a functional configuration example of a content display apparatus according to the embodiment.

Next, a functional configuration example the content display apparatus 30 according to this embodiment will be described with reference to FIG. 8. FIG. 8 is a block diagram showing the functional configuration example of the content display apparatus 30 according to this embodiment.

As shown in FIG. 8, the content display apparatus 30 includes a content acquisition unit 301, a content holding unit 303, a display control unit 305, a display unit 307, a line-of-sight detection unit 309, and a line-of-sight information transmission unit 311.

The content acquisition unit 301 is configured to be capable of communicating with the content server 80 through the network n1. The content acquisition unit 301 acquires a partial content of the content v0 distributed from the content server 80, from the content server 80 through the network n1.

The content acquisition unit 301 outputs the partial content acquired from the content server 80 to the display control unit 305. Also, the content acquisition unit 301 may cause the content holding unit 303 to hold the acquired partial content.

The content holding unit 303 is a recording medium for holding the partial content. The content holding unit 303 may be configured as a recording medium included in the content display apparatus 30. Also, the content holding unit 303 may be configured as an external recording medium which is removably inserted in the content display apparatus 30.

The display unit 307 is a device for presenting information to a user by displaying the information on, for example, the display panel of a display.

The display control unit 305 displays, on the display unit 307, a partial content which has been acquired by the content acquisition unit 301 from the content server 80, to present the partial content to the user Ua. Note that, at this time, the display control unit 305 may acquire the partial content directly from the content acquisition unit 301. Also, as another example, the display control unit 305 may read a partial content held in the content holding unit 303, from the content holding unit 303.

The line-of-sight detection unit 309 is configured to detect the user Ua's line-of-sight direction directly or indirectly.

The line-of-sight detection unit 309 is configured to include various sensors, such as, for example, an acceleration sensor, an angular velocity sensor (gyroscopic sensor), and the like, and may detect a motion of the user Ua's head using the sensors. In this case, for example, the line-of-sight detection unit 309 may recognize the detected motion of the user Ua's head as a change in the line-of-sight direction. Also, the line-of-sight detection unit 309 may calculate a direction in which the head faces, on the basis of the detected motion of the user Ua's head, and recognize the calculated direction as the user Ua's line-of-sight direction.

Also, as another example, the line-of-sight detection unit 309 may detect a motion of the user Ua' eyeball using a technique typically called eye tracking. In this case, for example, the line-of-sight detection unit 309 may calculate a direction in which the user Ua's eyeball faces, by detecting a position of the user Ua's pupil, and recognize the calculated direction as the user Ua's line-of-sight direction.

Of course, the line-of-sight detection unit 309 may recognize a user's line-of-sight direction by combining the result of detection of a motion of the user's head and the result of detection of a motion of the user's eye.

Thus, the line-of-sight detection unit 309 sequentially detects the user Ua's line-of-sight direction at each predetermined timing, and outputs line-of-sight information indicating the detected line-of-sight directions to the line-of-sight information transmission unit 311. Note that, at this time, the line-of-sight detection unit 309 may acquire, from the display control unit 305, time information indicating positions along a time sequence in the content v0 (i.e., times in the content v0) of a partial content which is being presented to the user Ua, and associate the acquired time information with the line-of-sight information. Similarly, the line-of-sight detection unit 309 may acquire identification information indicating the content v0 presented to a user from, for example, the display control unit 305, and associate the acquired identification information with the line-of-sight information.

The line-of-sight information transmission unit 311 is configured to be capable of communicating with the line-of-sight format processing apparatus 10 through the network n1. The line-of-sight information transmission unit 311 sequentially transmits line-of-sight information indicating the user Ua's line-of-sight direction output from the line-of-sight detection unit 309 to the line-of-sight format processing apparatus 10 through the network n1.

In the foregoing, a functional configuration example of the content display apparatus 30 according to this embodiment has been described with reference to FIG. 8.

As described above, the line-of-sight format processing apparatus 10 collects a user's line-of-sight information and time information from each content display apparatus 30, and on the basis of the collected line-of-sight information and time information, generates or updates the line-of-sight format. Thereafter, the line-of-sight format processing apparatus 10 transmits the generated or updated line-of-sight format to the content server 80.

Also, the content server 80 acquires each user's line-of-sight format associated with a content from the line-of-sight format processing apparatus 10, and on the basis of the acquired line-of-sight format, controls presentation of the content to the user.

At this time, the content server 80 may distribute the partial content v11 which indicates the reference range of the user Ub in a manner which allows the user Ua to identify the reference range of the user Ub, to, for example, the content display apparatus 30a operated by the user Ua, on the basis of the user Ub's line-of-sight format. As a result, the content server 80 can control presentation of a content to the user Ua so that the user Ua can recognize the reference range of the user Ub.

Also, as another example, the content server 80 may distribute the partial image v11b referred to by the user Ub to the content display apparatus 30a operated by the user Ua, on the basis of the user Ub's line-of-sight format. As a result, the content server 80 can control presentation of a content to the user Ua so that the user Ua can recognize what (image) is being referred to by the user Ub.

Note that the content server 80 controls presentation of a content to each user, and therefore, a user's reaction to the presentation of the content, i.e., a change in the line of sight, is detected by the content display apparatus 30. Thereafter, the content display apparatus 30 transmits line-of-sight information indicating the detected line-of-sight direction together with time information indicating a time in a content at which the line-of-sight direction was detected, to the line-of-sight format processing apparatus 10.

By repeatedly performing the above operation, for example, a change in the user Ua's line of sight in response to presentation of a content is sequentially fed back to a content (partial content) which is newly presented to the user Ua or another user (Ub).

Thus, the information processing system according to this embodiment allows a plurality of users to share their viewpoints or lines of sight.

Note that the line-of-sight format processing apparatus 10 and the content server 80 do not necessarily need to sequentially perform the above-described process based on the line-of-sight information included in the line-of-sight format, at all times in the content v0 to be distributed. For example, the line-of-sight format processing apparatus 10 and the content server 80 may process, on the basis of positions in a time sequence (i.e., times) in the content v0 of a partial content presented to a user, only line-of-sight information associated with time information corresponding to a predetermined time width including the times.

As a specific example, the content server 80 may sequentially distribute a partial content of the content v0 along a time sequence to each content display apparatus 30 (typically called "streaming distribution"). In this case, the content server 80 may process, depending on times of a partial content to be distributed in the content v0 (i.e., positions along a time sequence in the content v0), the line-of-sight information associated with the time information corresponding to a predetermined time width including those times.

Also, the content v0 which the content server 80 distributes to each content display apparatus 30 may be a video content which is distributed in real time. In this case, the line-of-sight format processing apparatus 10 may sequentially update each user's line-of-sight format on the basis of the line-of-sight information detected by the corresponding content display apparatus 30, and in synchronous with the updating, may sequentially transmit the updated line-of-sight format to the content server 80.

Thereafter, the content server 80 may sequentially update a partial content presented to each user on the basis of the line-of-sight format sequentially transmitted from the line-of-sight format processing apparatus 10, and thereby feed each user's line of sight or viewpoint back to the partial content in real time. Note that, as described above, when each user's line of sight or viewpoint is fed back to a partial content presented to the user in real time, the time information may not necessarily be included in the line-of-sight format.

Also, the content v0 which the content server 80 distributes to each content display apparatus 30 may be a still image. In this case, of course, the time information may not be included in the line-of-sight format.

Also, the location of each of the line-of-sight format processing apparatus 10, the content server 80, and the content display apparatus 30 (configurations) is not particularly limited, if each configuration can operate in the above-described manner. As a specific example, each of the line-of-sight format processing apparatus 10 and the content server 80 (configurations) may be provided in the same housing. Also, a function equivalent to the content control unit 801 may be provided in the content display apparatus 30. Note that an example in which a function equivalent to the content control unit 801 is provided in the content display apparatus 30 will be described as a second embodiment in detail below.

1.5. Variations

Next, as a variation of this embodiment, another example of the information processing system according to this embodiment will be described. In the above embodiment, an example has been described in which a position which is the starting point of a user's line of sight (i.e., typically, a position of the eye) is invariable, like a typically called omnidirectional video. Meanwhile, there are contents for which the position which is the starting point of a user's line of sight can be arbitrarily moved.

Figure 9:
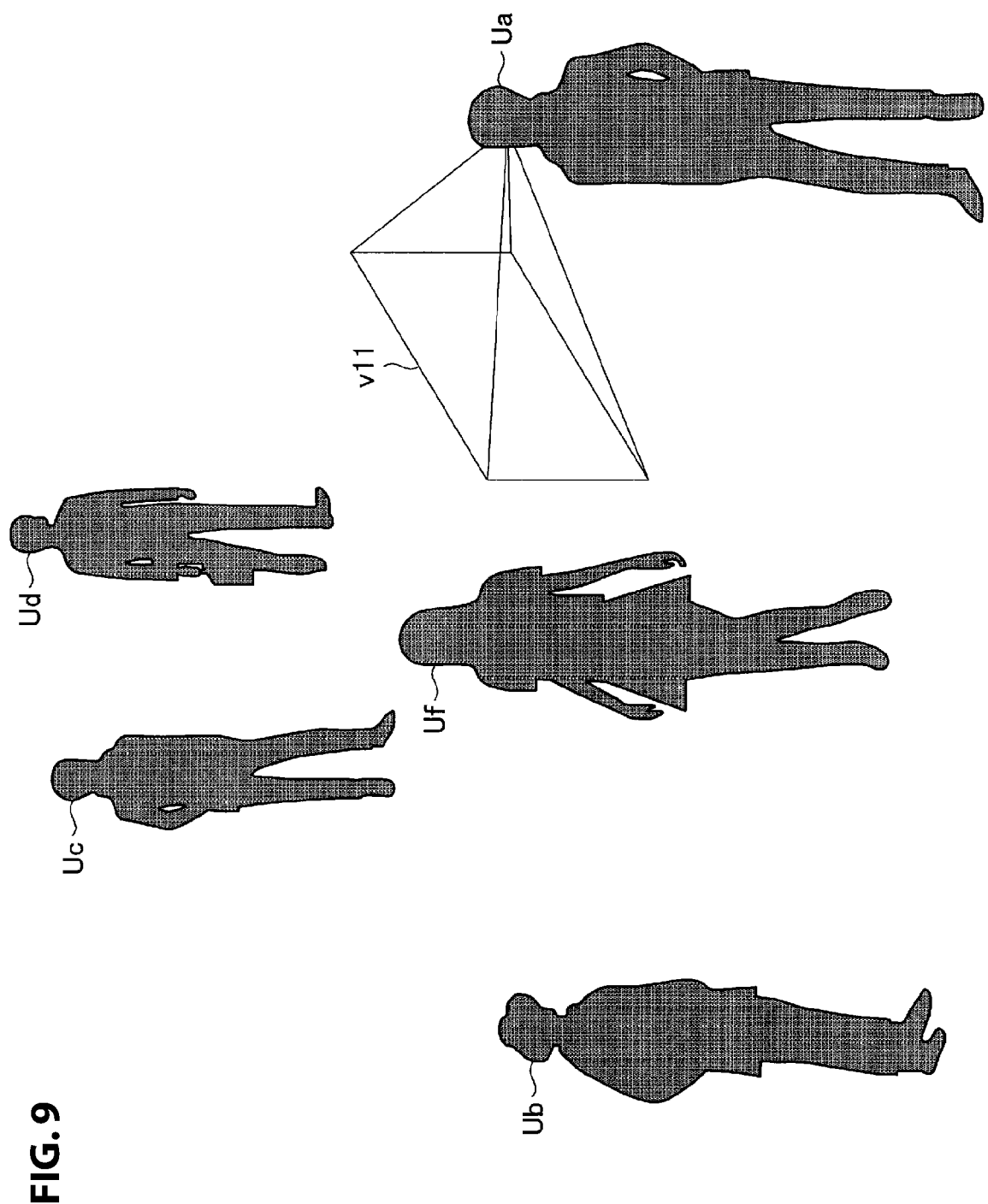
FIG. 9 is an illustrative diagram for describing an overview of an information processing system according to a variation of the embodiment.
Figure 10:
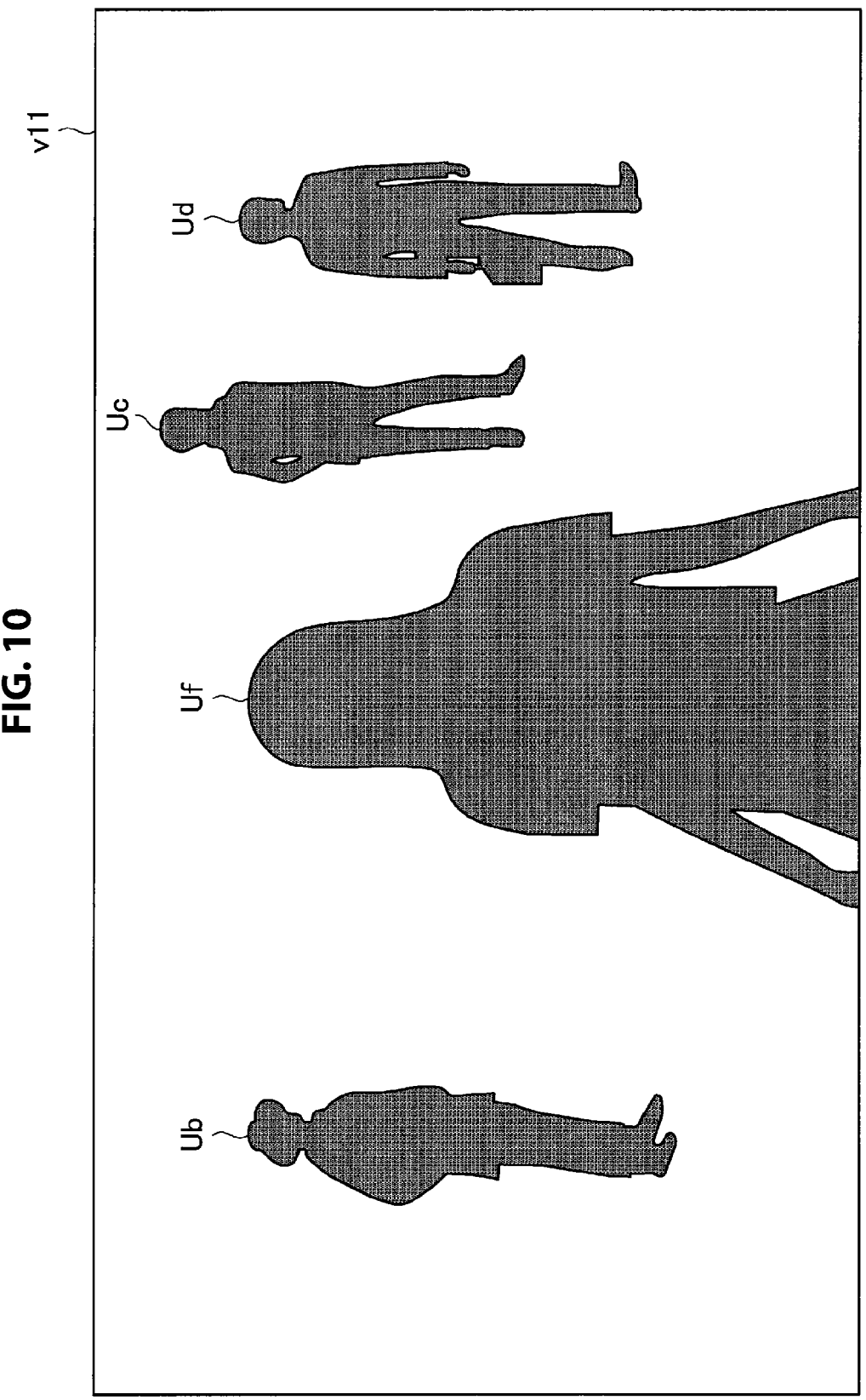
FIG. 10 is an illustrative diagram for describing an overview of an information processing system according to a variation of the embodiment.

For example, FIG. 9 and FIG. 10 are illustrative diagrams for describing an overview of an information processing system according to a variation of this embodiment, showing a content example for which the position which is the starting point of a user's line of sight can be arbitrarily moved. The example shown in FIG. 9 indicates a content example for which a plurality of users can each arbitrarily move a character corresponding to the user (hereinafter also referred to as an "avatar") in a typically called three-dimensional virtual reality world. In the example shown in FIG. 9, for example, to each user, a first-person-perspective image for a character corresponding to the user is presented through the content display apparatus 30.

For example, FIG. 10 shows an example of a first-person-perspective image (i.e., a partial image) based on the line of sight of an avatar corresponding to the user Ua, the image being indicated by a reference sign v11 in FIG. 9. In the case of such a configuration, unlike a typically called omnidirectional image shown in FIG. 2 to FIG. 4, each user can arbitrarily move the starting point of their line of sight by moving their own avatar in a content.

With the above in mind, in the description that follows, a mechanism for allowing a plurality of users to share their lines of sight or viewpoints when each user can arbitrarily move the starting point of their line of sight by moving their own avatar as shown in FIG. 9 and FIG. 10, will be described as a variation.

Figure 11:
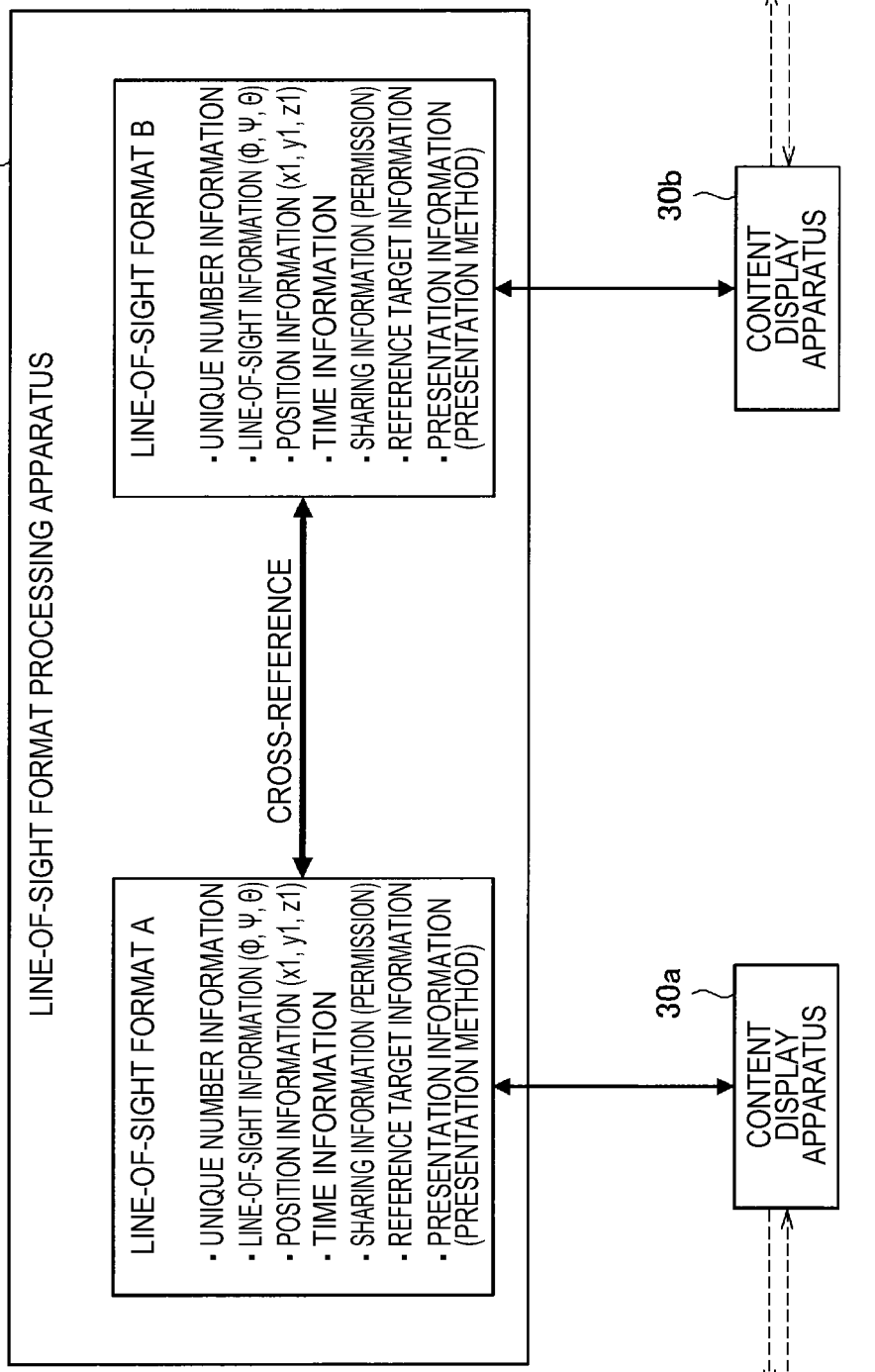
FIG. 11 is an illustrative diagram for describing a general configuration of an information processing system according to a variation of the embodiment.

Firstly, a general functional configuration of an information processing system according to a variation will be described with reference to FIG. 11. FIG. 11 is an illustrative diagram for describing the general functional configuration of the information processing system according to a variation.

As shown in FIG. 11, the information processing system according to a variation is different from the above information processing system according to an embodiment (see FIG. 5) in that the line-of-sight format includes position information indicating a position of an avatar in a content.

The position information is information for identifying a position of an avatar in a content. In other words, the position information indicates a position which is the starting point of a user's line of sight in a content.

The position information may be specified as, for example, coordinates (x1, y1, z1) indicating a position (an absolute position or a relative position) of an avatar in a content on the basis of a coordinate system in the content.

With such a configuration, in the information processing system according to a variation, for example, the content server 80 recognizes each user's line of sight on the basis of the line-of-sight information and position information included in the line-of-sight format. Specifically, the content server 80 recognizes that the position information specified in the line-of-sight format indicates the starting point of the line of sight, and the user's line of sight corresponding to the line-of-sight format extends from the starting point in a direction indicated by the line-of-sight information.

Next, an overview of an operation of the content server 80 in the information processing system according to a variation will be described, paying much attention to a portion different from the content server 80 according to the above embodiment.

In the content server 80 according to a variation, the content control unit 801 recognizes a position of the user Ua's avatar in a content, on the basis of position information (x1, y1, z1) specified in the line-of-sight format A of the user Ua. Also, the content control unit 801 recognizes the user Ua's line of sight as, for example, a vector, on the basis of the line-of-sight information ($\varphi$, $\psi$, $\theta$) specified in the line-of-sight format A, where the position (x1, y1, z1) of the user Ua's avatar is a starting point.

Note that the content control unit 801 may limit the distance which the line of sight reaches, i.e., the length of the vector, as appropriate. As a specific example, the content control unit 801 may use a preset value as the distance which the line of sight reaches, or may control the distance which the line of sight reaches, on the basis of a setting for each user (each line-of-sight format). Note that information about the setting of the distance which the line of sight reaches for each user may be specified in, for example, the line-of-sight format. Of course, the content control unit 801 may perform control so that the distance which the line of sight reaches is not limited (or is infinite). Also, the content control unit 801 may limit the distance which the line of sight reaches, on the basis of a setting for a content. As a specific example, when a setting which limits the field of view is made (e.g., when there is a fog in a content, or the like), the content control unit 801 may limit the distance which a user's line of sight reaches, on the basis of the setting.

Thereafter, the content control unit 801 generates (e.g., renders) the partial image v11 indicating the reference range of the user Ua in a content, on the basis of a vector indicating the user Ua's line of sight and the user Ua's visual field angle. Note that the visual field angle may be invariable, or may be changed according to a user's operation or the like, as in the above embodiment.

Figure 12:
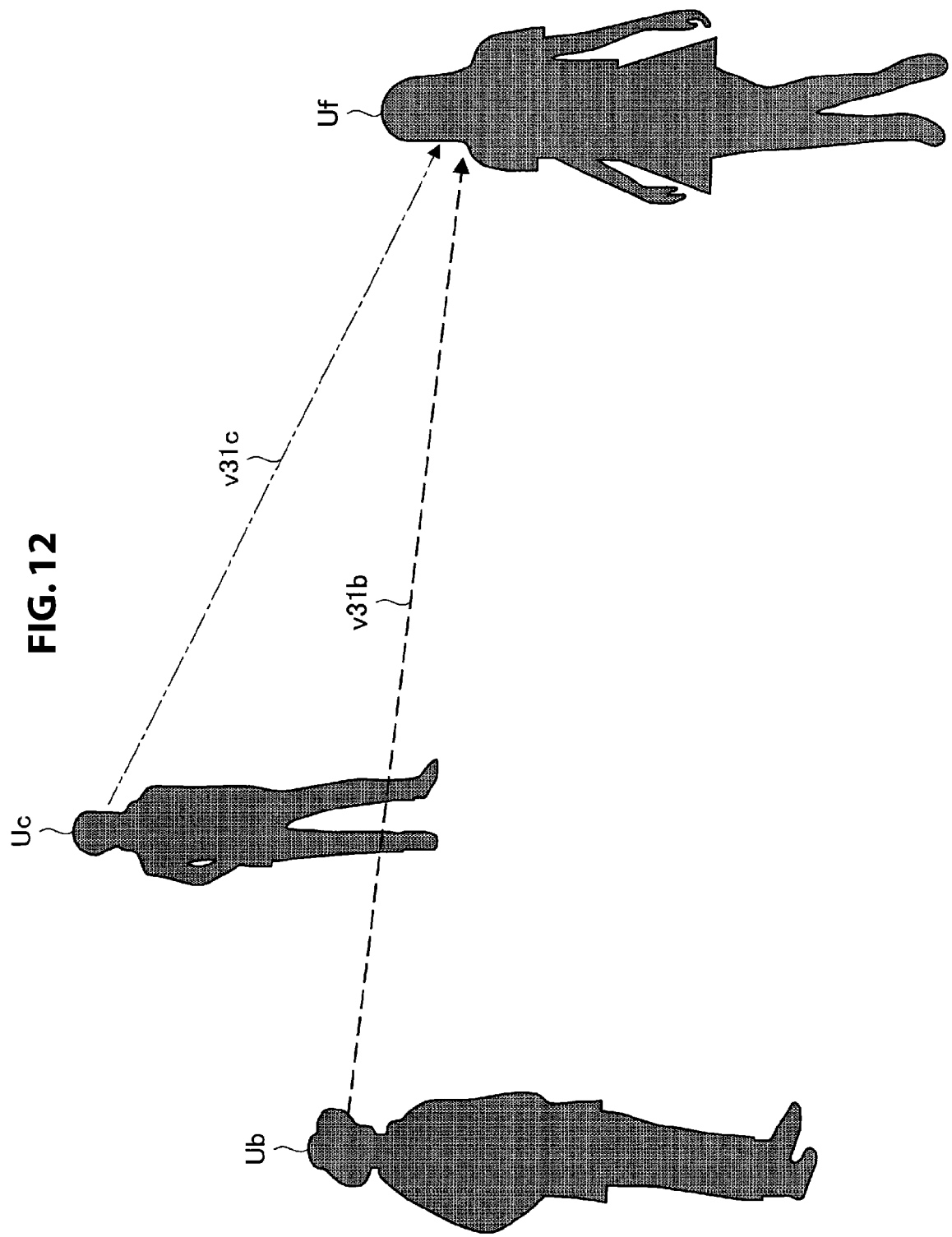
FIG. 12 is an illustrative diagram for describing an example of a line-of-sight presentation method in an information processing system according to a variation of the embodiment.

Also, at this time, the content control unit 801 may present another user's line of sight in the partial image v11 indicating the reference range of the user Ua in a manner which allows the user Ua to identify that other user's line of sight. For example, FIG. 12 is an illustrative diagram for describing an example of a method for presenting a line of sight in the information processing system according to a variation, where, in the example shown in FIG. 9 and FIG. 10, each user's line of sight is presented in a manner which allows the line of sight to be identified. The example shown in FIG. 12 indicates a case where the users Ub and Uc direct their lines of sight to a user Uf's avatar.

In this case, the content control unit 801 recognizes a position of the user Ub's avatar in a content, on the basis of the position information (x1, y1, z1) specified in the line-of-sight format B of the user Ub. Thereafter, the content server 80 recognizes the starting point and direction of the user Ub's line of sight v31b and the range which the line of sight v31b reaches, in a content, on the basis of the line-of-sight information ($\varphi$, $\psi$, $\theta$) specified in the line-of-sight format B, where the position (x1, y1, z1) of the user Ub's avatar is the starting point.

Similarly, the content control unit 801 recognizes a position of the user Uc's avatar in a content, on the basis of the position information (x1, y1, z1) specified in the line-of-sight format C of the user Uc. Thereafter, the content server 80 recognizes the starting point and direction of the user Uc's line of sight v31c and the range which the line of sight v31c reaches, in a content, on the basis of the line-of-sight information ($\varphi$, $\psi$, $\theta$) specified in the line-of-sight format C, where the position (x1, y1, z1) of the user Uc's avatar is the starting point.

Thereafter, the content control unit 801 may present the lines of sight v31b and v31c of the users Ub and Uc in the partial image v11 indicating the reference range of the user Ua, in a manner which allows the lines of sight v31b and v31c to be identified, on the basis of the recognized starting points and directions of the lines of sight v31b and v31c and the recognized ranges which the lines of sight v31b and v31c reach. For example, in the example shown in FIG. 12, the content control unit 801 presents the lines of sight v31b and v31c to the user Ua by superimposing the lines of sight v31b and v31c of the users Ub and Uc as arrows on the partial image v11.

Also, the method of presenting another user's line of sight in a manner which allows the line of sight to be identified is not limited to the example shown in FIG. 12. For example, FIG. 13 is an illustrative diagram for describing an example of a method for presenting a line of sight according to a variation, showing a case example in which each user's line of sight is presented in a manner which allows the line of sight to be identified, in the example shown in FIG. 9 and FIG. 10.

Figure 13:
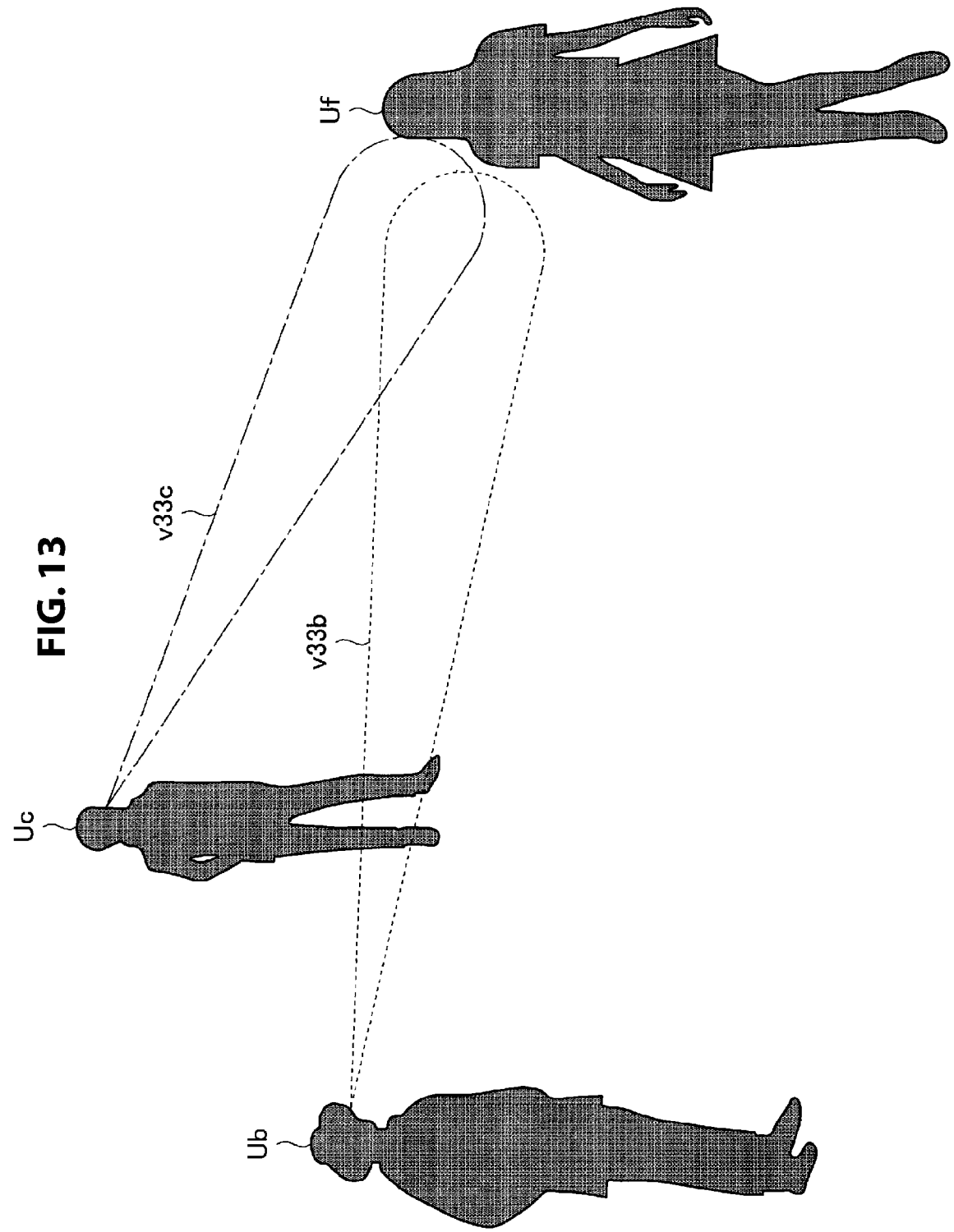
FIG. 13 is an illustrative diagram for describing an example of a line-of-sight presentation method in an information processing system according to a variation of the embodiment.

In the example shown in FIG. 13, the content control unit 801 presents the visual fields of the users Ub and Uc in a manner which allows the visual fields to be identified, as indicated by reference signs v33b and v33c. Note that, in the description that follows, when the visual fields v33b and v33c of the user Ub and Uc are not particularly distinguished from each other, the visual fields v33b and v33c may each be simply referred to as the "visual field v33."

In this case, the content control unit 801 recognizes a position and range of a region showing the user Ub's visual field v33b in a content, on the basis of the position information and line-of-sight information specified in the line-of-sight format B of the user Ub, and the user Ub's visual field angle.

Similarly, the content control unit 801 recognizes a position and range of a region showing the user Uc's visual field v33c in a content, on the basis of the position information and line-of-sight information specified in the line-of-sight format C of the user Uc, and the user Uc's visual field angle.

Thereafter, the content control unit 801 may present the visual fields v33b and v33c of the users Ub and Uc in the partial image v11 indicating the reference range of the user Ua as shown in FIG. 13, on the basis of the recognized positions and ranges of the visual fields v33b and v33c. Note that, at this time, the content control unit 801 may limit a range within which each user's visual field v33 is presented, on the basis of the range which each user's line of sight reaches.

Also, the content control unit 801 may present another user's (Ub) reference range (i.e., an image based on the user Ub's line of sight) to the user Ua. In this case, the content control unit 801 may generate the partial image v11b indicating the user Ub's reference range, on the basis of the line-of-sight format B of the user Ub in a manner similar to when the partial image v11 indicating the user Ua's reference range is generated.

Thus, the content control unit 801 generates a partial content which is to be distributed to a content display apparatus 30 operated by each user, on the basis of the user's line-of-sight format. Thereafter, the content control unit 801 outputs the partial content generated for each user to the distribution unit 803. When receiving this output, the distribution unit 803 distributes the partial content generated for each user to a content display apparatus 30 operated by the user.

Next, an overview of operations of the content display apparatus 30 and the line-of-sight format processing apparatus 10 will be described, paying much attention to differences from those of the content display apparatus 30 and the line-of-sight format processing apparatus 10 of the above embodiment.

In an information processing system according to a variation, the content display apparatus 30 transmits, in addition to the line-of-sight information indicating a user's line-of-sight direction, position information indicating a position of an avatar corresponding to the user in a content, to the line-of-sight format processing apparatus 10.

Note that the method of allowing the content display apparatus 30 to recognize position information indicating a position in a content is not particularly limited. As a specific example, the content display apparatus 30 may acquire position information indicating an absolute position of an avatar in a content, from a main entity which distributes the content to the content display apparatus 30, i.e., the content server 80.

Also, at this time, the content display apparatus 30 may update the position information on the basis of a user's operation with respect to an avatar in a content through an input device (not shown), such as, for example, a controller or the like.

As described above, the content display apparatus 30 recognizes position information indicating a position of an avatar in a content, and transmits the position information together with the detected line-of-sight information to the line-of-sight format processing apparatus 10.

Also, the line-of-sight format processing apparatus 10, when receiving the line-of-sight information and the position information from the content display apparatus 30, updates the corresponding line-of-sight format on the basis of the received line-of-sight information and position information. Thereafter, the line-of-sight format processing apparatus 10 transmits the updated line-of-sight format to the content server 80.

Thus, the content server 80, the content display apparatus 30, and the line-of-sight format processing apparatus 10 sequentially repeatedly perform the above operations in association with each other. With such a configuration, for example, a change in the user Ua's line of sight in response to presentation of a content, is fed back to a content (partial content) which is newly presented to the user Ua or another user (Ub).

Note that the line-of-sight information and position information included in the line-of-sight format may be managed in association with time information indicating times in a content (i.e., positions along a time sequence in a content), as in the information processing system according to the above embodiment.

As described above, in the information processing system according to a variation of this embodiment, the line-of-sight format is generated or updated on the basis of the line-of-sight information and the position information for each user, and the users' line-of-sight formats are managed in a manner which allows the line-of-sight formats of the plurality of users to be cross-referenced between the users (i.e., between the respective content display apparatuses 30 of the plurality of users).

With such a configuration, as shown in FIG. 9 and FIG. 10, a plurality of users are allowed to share their viewpoints or lines of sight even in contents in which a user can arbitrarily move a position which is the starting point of their line of sight.

1.6. Conclusion

As described above, in the information processing system according to this embodiment, the line-of-sight format processing apparatus 10 collects the line-of-sight information detected by the content display apparatuses 30. Thereafter, the line-of-sight format processing apparatus 10 generates or updates the line-of-sight format for each user on the basis of the collected line-of-sight information, and manages the line-of-sight formats in association with contents. Also, the line-of-sight format processing apparatus 10 manages the respective line-of-sight formats generated or updated for the users so that the line-of-sight formats can cross-referenced between the users (i.e., between the respective content display apparatuses 30 of the users). With such a configuration, for example, the content server 80 is allowed to present, to one user, another user's viewpoint or line of sight. In other words, in the information processing system according to this embodiment, a plurality of users can share their viewpoints or lines of sight.

2. Second Embodiment

An information processing system according to a second embodiment will be described. In the above first embodiment, the content server 80 controls presentation of a content to each user by distributing a partial content extracted or generated on the basis of the line-of-sight format to each content display apparatus 30. Meanwhile, instead of the content server 80, the content display apparatus 30 may extract or generate a partial content on the basis of the line-of-sight format, and thereby play a main role in controlling presentation of a content to a user. With this in mind, in this embodiment, an example will be described in which the content display apparatus 30 controls presentation of a content to a user on the base of the line-of-sight format.

Figure 14:
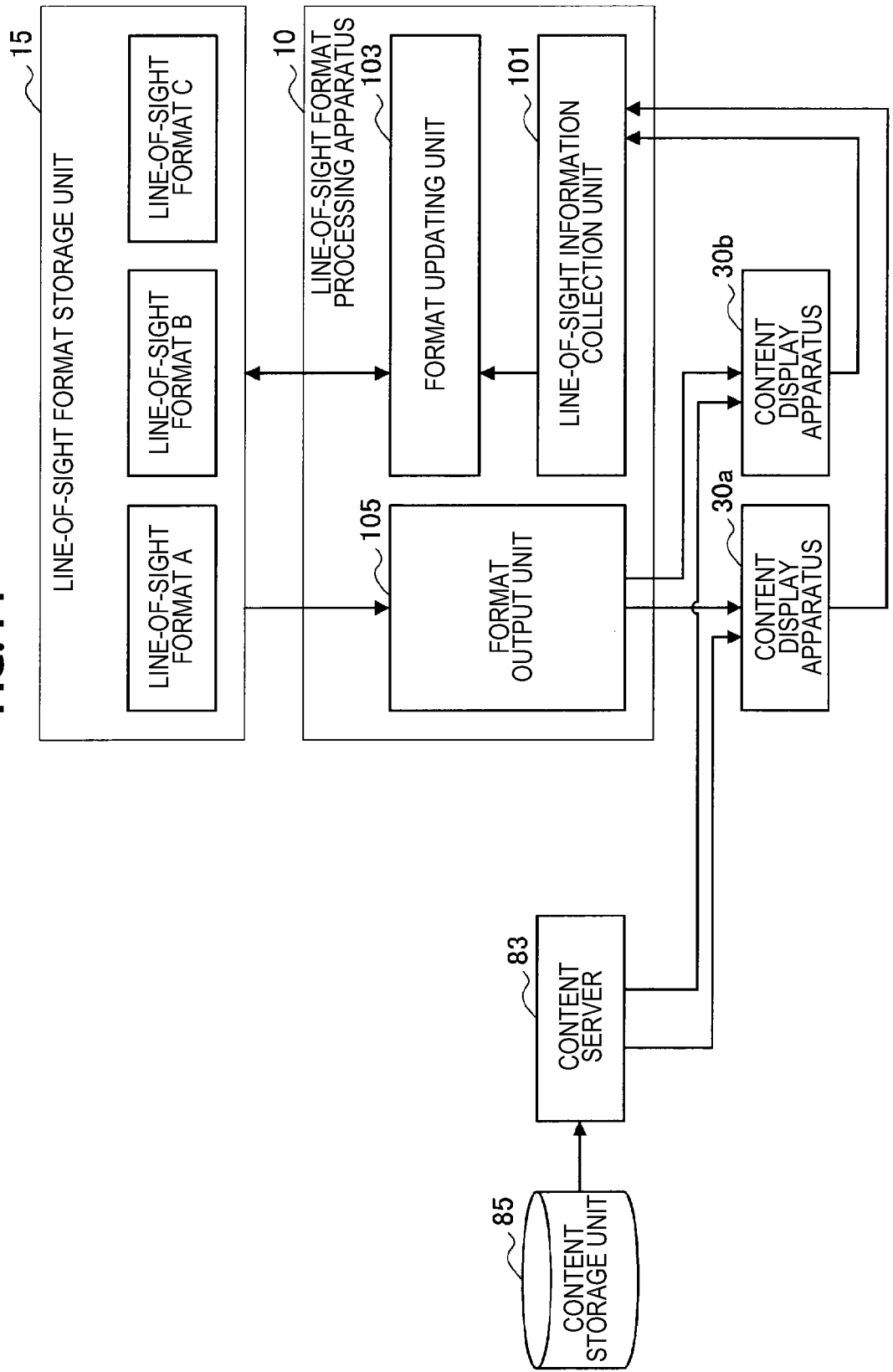
FIG. 14 is a block diagram showing a functional configuration example of an information processing system according to a second embodiment of the present disclosure.

Firstly, a functional configuration example of the information processing system according to this embodiment will be described with reference to FIG. 14. Note that, in this description, in particular, much attention is paid to differences from the above information processing system according to the first embodiment (see FIG. 7), and the other configurations will not be described. FIG. 14 is a block diagram showing the functional configuration example of the information processing system according to this embodiment. Note that, in the example shown in FIG. 14, an example is shown in which a content display apparatus 30a operated by a user Ua and a content display apparatus 30b operated by a user Ub are provided as the content display apparatuses 30. Note that, in the example shown in FIG. 14, a content server according to this embodiment is referred to as the "content server 83" in order to distinguish it from the content server 80 according to the first embodiment.

In the above information processing system according to the first embodiment, all data of a content to be distributed is managed by the content server 80, and a partial content which is a portion of the content is distributed to each content display apparatus 30. In contrast to this, in the information processing system according to this embodiment, each content display apparatus 30 holds all data of a content, and extracts or generates a partial content from the held content.

Therefore, in the information processing system according to this embodiment, the content server 83 distributes the content v0 itself stored in the content storage unit 85, instead of the partial content v11, to the content display apparatus 30.

Also, the line-of-sight format processing apparatus 10 according to this embodiment is different from the above line-of-sight format processing apparatus 10 according to the first embodiment in the operation of the format output unit 105.

Specifically, the format output unit 105 according to this embodiment reads the respective line-of-sight formats stored in the line-of-sight format storage unit 15 for the users, and transmits the read line-of-sight formats to the respective content display apparatuses 30.

Note that the format output unit 105 does not necessarily need to transmit all of the line-of-sight formats stored in the line-of-sight format storage unit 15 to each content display apparatus 30. Specifically, the format output unit 105 may transmit at least line-of-sight format(s) required to generate a partial content which is to be presented to a user, of the line-of-sight formats stored in the line-of-sight format storage unit 15, to the content display apparatus 30 of the user.

As a specific example, the format output unit 105 may transmit, to the content display apparatus 30 operated by the user Ua, at least the line-of-sight format A corresponding to the user Ua and another line-of-sight format(s) referred to by the line-of-sight format A. Note that another line-of-sight format(s) referred to by the line-of-sight format A corresponds to another line-of-sight format designated in the reference target information included in the line-of-sight format A.

Note that the operations of the line-of-sight information collection unit 101 and the format updating unit 103 are similar to those of the above line-of-sight format processing apparatus 10 according to the first embodiment, and therefore, will not be described in detail.

Figure 15:
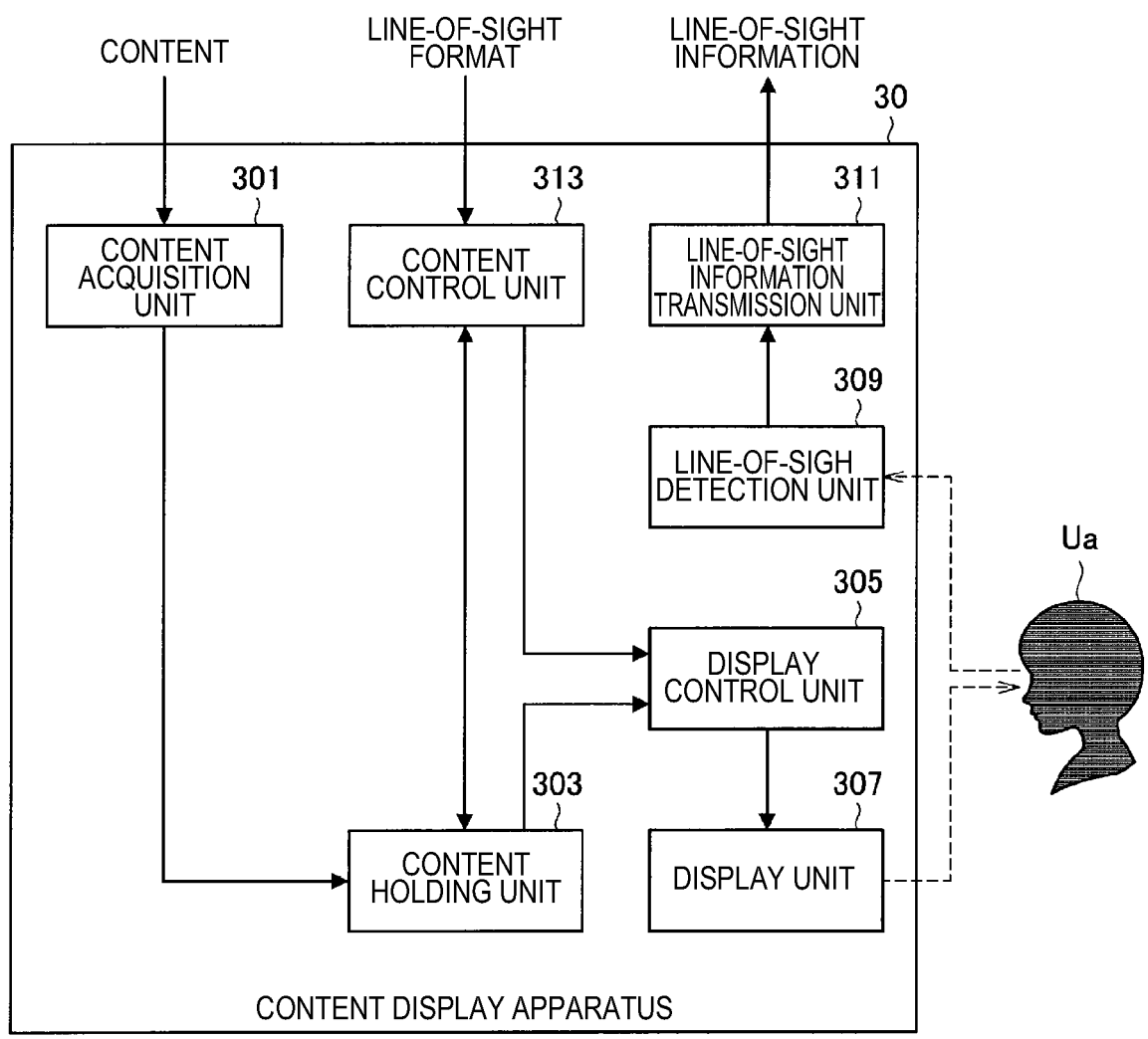
FIG. 15 is a block diagram showing a functional configuration example of a content display apparatus according to the embodiment.

Next, a functional configuration example of the content display apparatus 30 according to this embodiment will be described with reference to FIG. 15, showing the content display apparatus 30 operated by the user Ua as an example. FIG. 15 is a block diagram showing the functional configuration example of the content display apparatus 30 according to this embodiment.

As shown in FIG. 15, the content display apparatus 30 according to this embodiment includes a content acquisition unit 301, a content holding unit 303, a display control unit 305, a display unit 307, a line-of-sight detection unit 309, a line-of-sight information transmission unit 311, and a content control unit 313.

The content acquisition unit 301 is configured to be capable of communicating with the content server 80 through, for example, the network n1. In this case, the content acquisition unit 301 previously acquires the content v0 from the content server 80 through the network n1, and causes the content holding unit 303 to hold the acquired content v0. Note that, of course, a source from which the content v0 is acquired is not necessarily limited to the content server 80. As a specific example, the content acquisition unit 301 may refer to a portable medium attached to the content display apparatus 30, and read the content v0 recorded in the portable medium.

The content control unit 313 is equivalent to the content control unit 801 in the above content server 80 according to the first embodiment. An operation of the content control unit 313 will now be specifically described.

Initially, the content control unit 313 reads the content v0 which is to be presented to a user from the content holding unit 303.

Also, the content control unit 313, which is configured to be capable of communicating with the line-of-sight format processing apparatus 10 through the network n1, acquires the line-of-sight format associated with the content from the line-of-sight format processing apparatus 10 through the network n1. At this time, the content control unit 313 may acquire at least the line-of-sight format A corresponding to the user Ua, and another line-of-sight format referred to by the line-of-sight format A, from the line-of-sight format processing apparatus 10.

The content control unit 313 analyzes the acquired line-of-sight format A, and another line-of-sight format referred to by the line-of-sight format A, and on the result of the analysis of the line-of-sight formats, controls presentation of the content v0 to the user Ua.

Note that the control is similar to that of the above content control unit 801 according to the first embodiment. Specifically, the content control unit 313 refers to the presentation information included in the line-of-sight format A, to decide whether to present an image based on the user Ua's line of sight or an image based on another user (Ub)'s line of sight, to the user Ua.

Thereafter, the content control unit 313 may extract or generate the partial content v11 from the content v0 according to what is defined in the presentation information, and output the partial content v11 to the display control unit 305.

Also, the content control unit 313 may cause the content holding unit 303 to hold the extracted or generated partial content v11.

The display control unit 305 causes the display unit 307 to display the partial content v11 extracted or generated by the content control unit 313, and thereby presents the partial content v11 to the user Ua. Note that, at this time, the display control unit 305 may acquire the partial content v11 directly from the content control unit 313. Also, as another example, the display control unit 305 may read the partial content v11 held by the content holding unit 303 from the content holding unit 303.

Note that the operations of the line-of-sight detection unit 309 and the line-of-sight information transmission unit 311 are similar to those of the above content display apparatus 30 according to the first embodiment (see FIG. 8), and therefore, will not be described. Also, the above content control unit 313 is equivalent to an example of a "control unit" in the content display apparatus 30.

Specifically, the line-of-sight detection unit 309 detects a change in the user Ua's line-of-sight direction in response to presentation of the partial content v11 to the user Ua, and the line-of-sight information transmission unit 311 transmits the line-of-sight information indicating the line-of-sight direction to the line-of-sight format processing apparatus 10. Thereafter, the line-of-sight format processing apparatus 10 updates the line-of-sight format A corresponding to the user Ua stored in the line-of-sight format storage unit 15, on the basis of the line-of-sight information, and transmits the updated line-of-sight format A to each content display apparatus 30.

By repeatedly performing the above operation, for example, changes in the user Ua's line of sight in response to a content are sequentially fed back to a content (partial content) which is newly presented to the user Ua or another user (Ub).

Such a configuration allows each content display apparatus 30 to play a main role in controlling presentation of a content to a corresponding user on the basis of the line-of-sight format. Note that, at this time, each content display apparatus 30 does not necessarily need to process all line-of-sight formats. Therefore, in the information processing system according to this embodiment can distribute the processing load of the extraction or generation of a partial content to be presented to each user (i.e., the processing load of the content server 80 according to the first embodiment) to the content display apparatuses 30, compared to the above information processing system according to the first embodiment.

3. Third Embodiment 3.1. Overview

Next, an information processing system according to a third embodiment will be described. In the information processing system according to each of the above embodiments, when the user Ua and another user share their lines of sight or viewpoints, that other user is directly designated as reference target information. Meanwhile, when many and unspecified users share a content, the user Ua may not necessarily recognize all users.

With the above in mind, in this embodiment, an example of a mechanism which indirectly designates other users whose lines of sight or viewpoints are shared, and thereby allows the user Ua and another user who is not recognized by the user Ua to share their lines of sight or viewpoints, will be described. Note that, in this description, an example will be described in which each user can arbitrarily move the starting point of their line of sight by moving their own avatar, like the above variation described with reference to FIG. 9 to FIG. 13. Of course, as shown in FIG. 2 to FIG. 4, when a typically called omnidirectional video is simulated, processing may be performed, assuming that the starting point of the line of sight is invariable (the line-of-sight format may not include the position information).

Figure 16:
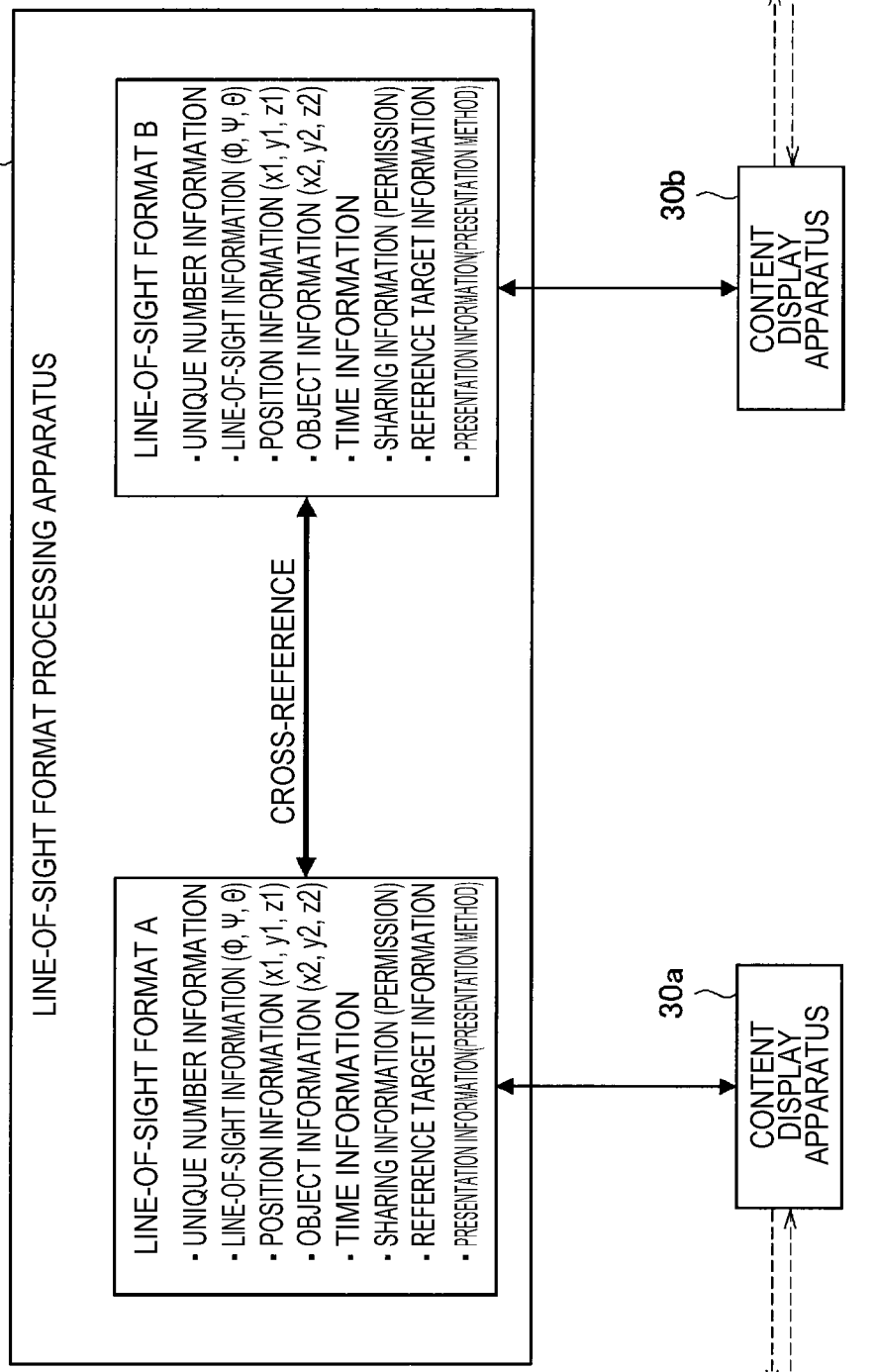
FIG. 16 is an illustrative diagram for describing a general configuration of an information processing system according to a third embodiment.
Figure 17:
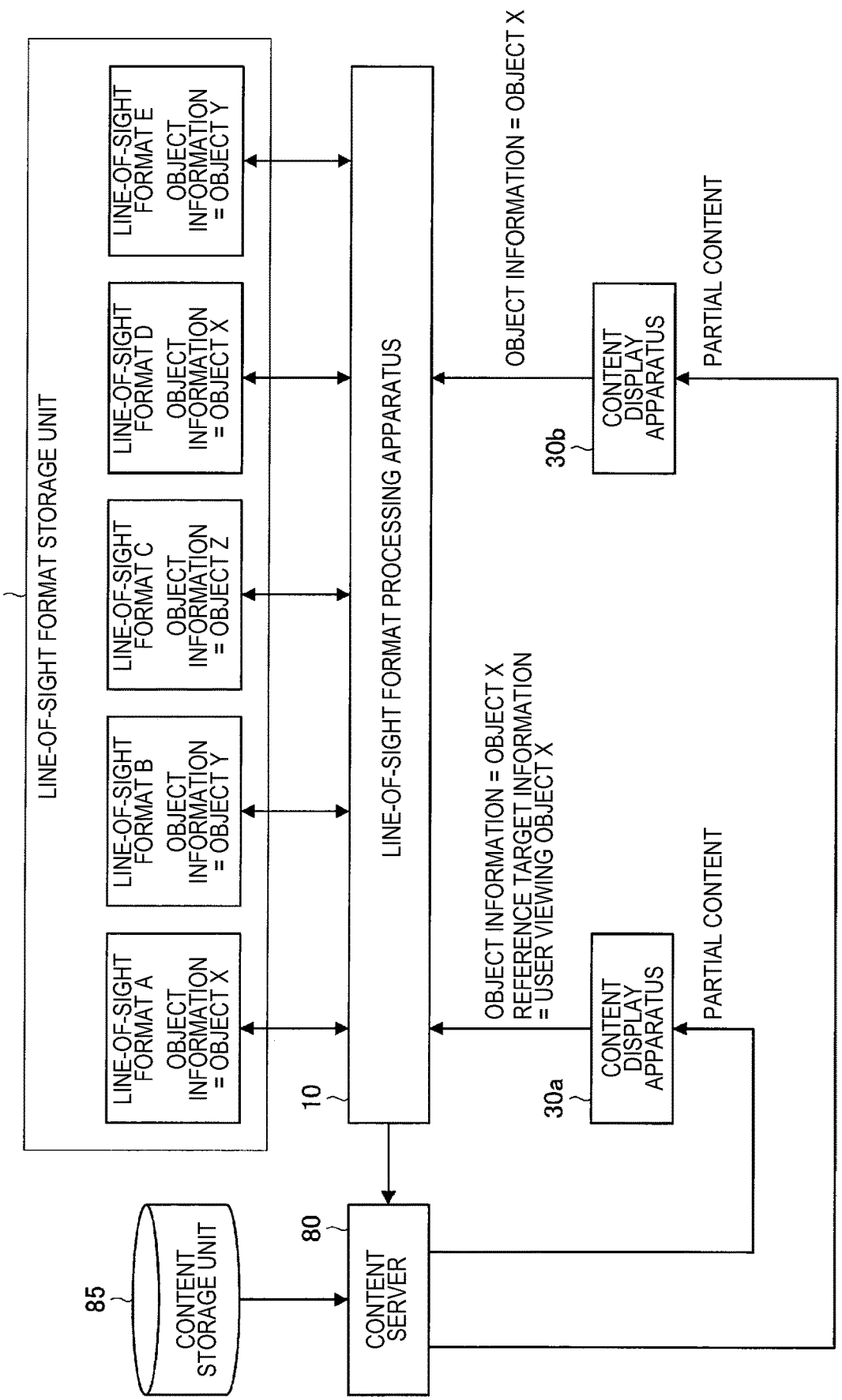
FIG. 17 is an illustrative diagram for describing a general operation of an information processing system according to the embodiment.

Firstly, an overview of the information processing system according to this embodiment will be described with reference to FIG. 16 and FIG. 17. FIG. 16 is an illustrative diagram for describing a general functional configuration of the information processing system according to this embodiment. Also, FIG. 17 is an illustrative diagram for describing the general operation of the information processing system according to this embodiment.

As shown in FIG. 16, the information processing system according to this embodiment is different from the above information processing systems according to the first embodiment (see FIG. 5) and the variation (see FIG. 11) in that the line-of-sight format includes "object information."

The object information indicates an object in a content which is indicated by a user's line of sight corresponding to the line-of-sight format. In the example shown in FIG. 16, the object information may be specified as, for example, coordinates (x2, y2, z2) indicating a position (an absolute position or a relative position) of an object in a content on the basis of a coordinate system in the content.

Note that a position of an object indicated by a user's line of sight can be identified on the basis of, for example, information indicating the user's line of sight, i.e., the line-of-sight information and position information included in the line-of-sight format. Specifically, by identifying the starting point and direction of a user's line of sight and a range which the line of sight reaches, in a content, on the basis of the position information and the line-of-sight information, and identifying an object in the content which intersects with the line of sight, the object information can be identified. Also, at this time, the object information may be identified by specifying the visual field on the basis of the line of sight and the visual field angle and identifying an object in the content at least a portion of which is included in the visual field.

Also, the information processing system according to this embodiment is configured so that a condition for identifying another user (in other words, a condition for searching for a user) can be set with respect to the reference target information included in the line-of-sight format.

Thus, the object information is specified in the line-of-sight format, and a condition for identifying another user can be designated in the reference target information, and therefore, in the information processing system according to this embodiment, the reference target information can be indirectly designated on the basis of the object information. A specific example of this operation will be described with reference to FIG. 17.

In the example shown in FIG. 17, line-of-sight formats A to E corresponding to users Ua to Ue are stored in the line-of-sight format storage unit 15. Also, in the object information included in the line-of-sight formats A and D, information indicating an object X in the content v0 to be distributed (e.g., the position information of the object X) is set. Specifically, the line-of-sight formats A and D indicate that the users Ua and Ud direct their lines of sight to the object X in the content v0.

Similarly, information indicating an object Y is set in the object information included in the line-of-sight formats B and E, and information indicating an object Z is set in the object information included in the line-of-sight format C.

Also, in the example shown in FIG. 17, the content display apparatus 30a designates a condition indicating a "user who is viewing the object X" with respect to the reference target information.

In response to this designation, the line-of-sight format processing apparatus 10 refers to the object information included in each of the line-of-sight formats A to E stored in the line-of-sight format storage unit 15, and finds out the line-of-sight formats A and D in which the "object X" is set in the object information.

At this time, the line-of-sight format processing apparatus 10 may newly set information indicating a line-of-sight format(s) (e.g., the identification information or address of the line-of-sight format) other than the line-of-sight format A corresponding to the user Ua, of the found line-of-sight formats, in the reference target information included in the line-of-sight format A. Specifically, in the example shown in FIG. 17, the line-of-sight format processing apparatus 10 sets information about the line-of-sight format D in the reference target information included in the line-of-sight format A.

With such a configuration, for example, even when each of the users Ua and Ud does not recognize the presence of the other, the users Ua and Ud can share their lines of sight or viewpoints.

3.2. Functional Configuration

Figure 18:
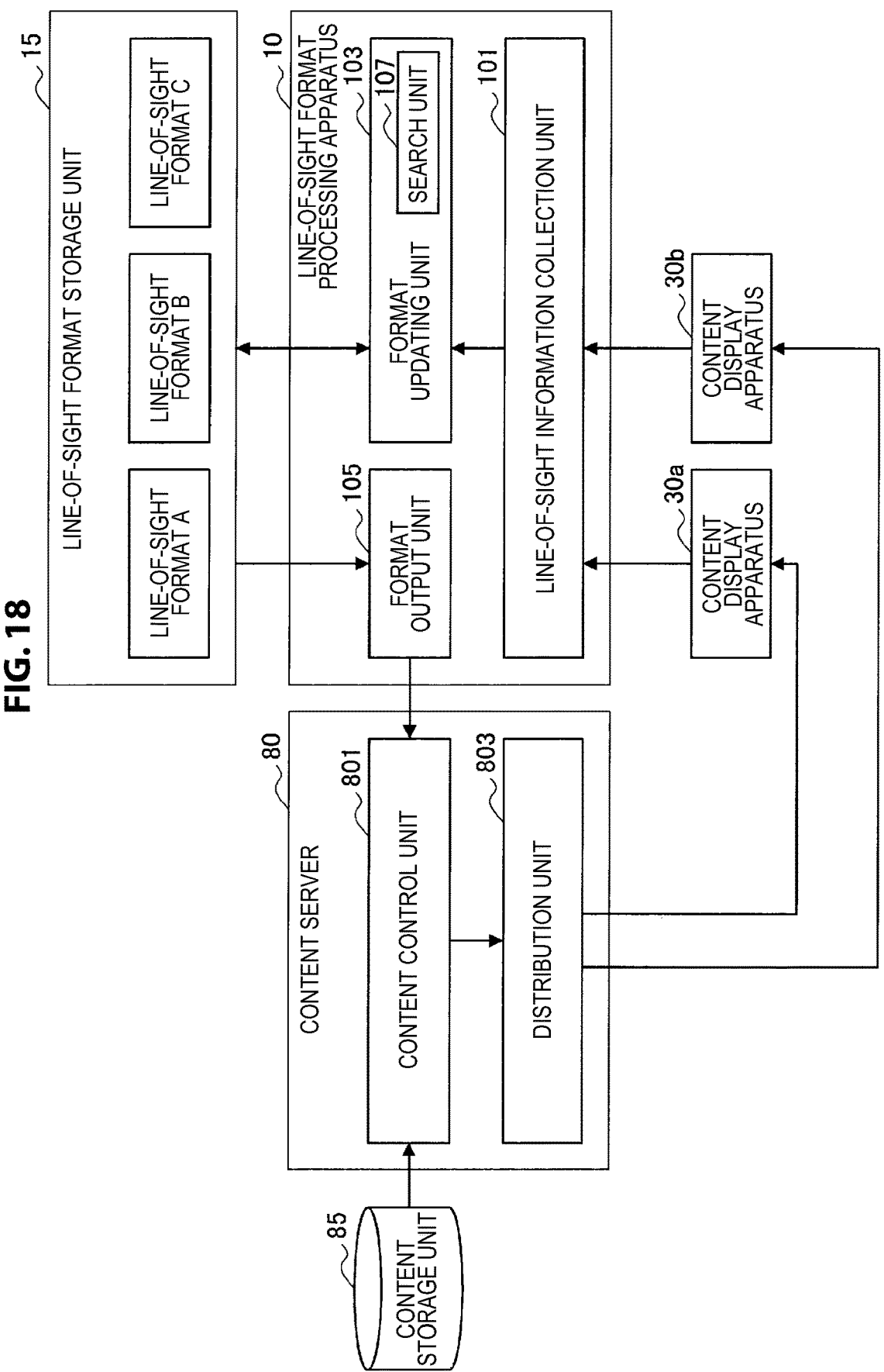
FIG. 18 is a block diagram showing a functional configuration example according to an information processing system according to the embodiment.

Next, a functional configuration example of the information processing system according to this embodiment will be described in detail with reference to FIG. 18. FIG. 18 is a block diagram showing the functional configuration example of the information processing system according to this embodiment. Note that the information processing system according to this embodiment is different from the information processing system according to each of the above embodiments in the method of setting the reference target information included in the line-of-sight format. The other operations of the information processing system according to this embodiment are similar to those of the information processing system according to each of the above embodiments. Therefore, in this description, much attention is paid to the process of setting the reference target information in the line-of-sight format, and the other processes will not be described in detail.

As described above, the content display apparatus 30 according to this embodiment may transmit the object information about an object indicated by a user's line of sight, and the reference target information indicating a condition for identifying another user on the basis of the object information, to the line-of-sight format processing apparatus 10.

Note that the method of causing the content display apparatus 30 to recognize information about an object indicated by a user's line of sight, is not particularly limited. As a specific example, the content server 80 may identify the starting point and direction of the user Ua's line of sight and a range which the line of sight reaches, in the content v0, on the basis of the line-of-sight format A, and notify the content display apparatus 30 of information about the object X intersecting with the line of sight (e.g., information about a position in the content v0).

Also, as another example, the content display apparatus 30 may analyze the partial content v11 distributed by the content server 80 to identify information about the object X presented in the partial content v11 (e.g., information about a position in the content v0).

In this case, for example, the content display apparatus 30 performs image analysis on the distributed partial content v11 to calculate a relative position of the object X with respect to the starting point of the user's line of sight. Thereafter, the content display apparatus 30 may calculate the position information of the object X in the content v0 on the basis of the calculated relative position of the object X and the position information of the user in the content v0.

Also, as shown in FIG. 18, the line-of-sight format processing apparatus 10 according to this embodiment includes a line-of-sight information collection unit 101, a format updating unit 103, and a format output unit 105. Also, the format updating unit 103 according to this embodiment includes a search unit 107.

The line-of-sight information collection unit 101 may receive, from the content display apparatus 30, the object information, and the reference target information indicating a condition for identifying another user on the basis of the object information. In this case, the line-of-sight information collection unit 101 outputs the received object information and reference target information to the format updating unit 103.

The format updating unit 103, when receiving the object information and the reference target information, changes processes according to the value of the reference target information.

Specifically, when information indicating another user's line-of-sight format (e.g., the identification information or address of the line-of-sight format) is directly designated with respect to the reference target information, the format updating unit 103 updates a user's line-of-sight format corresponding to a transmission source, on the basis of the received object information and reference target information.

Meanwhile, when a condition for identifying another user is designated with respect to the reference information, the format updating unit 103 outputs the received object information and reference target information to the search unit 107, and causes the search unit 107 to identify a user who meets the condition.

Specifically, the search unit 107 analyzes the value of the reference target information acquired from the format updating unit 103, to recognize a condition for identifying another user. For example, in the example shown in FIG. 17, the search unit 107 recognizes a "user who is viewing the object X" as the condition on the basis of the reference target information received from the content display apparatus 30a. Thereafter, the search unit 107 generates a search formula (query) on the basis the object information acquired together, and extracts a line-of-sight format matching the search formula from the line-of-sight format storage unit 15 on the basis of the generated search formula.

For example, in the example shown in FIG. 17, the search unit 107 refers to the object information included in each line-of-sight format stored in the line-of-sight format storage unit 15, and extracts the line-of-sight formats A and D in which the "object X" is set in the object information.

Thereafter, the search unit 107 notifies the format updating unit 103 of information indicating each extracted line-of-sight format (e.g., the identification information or address of the line-of-sight format) as information about a user who meets the condition. Note that if the line-of-sight format of a user who meets the condition can be identified, the type of the information of which the updating unit 103 is notified is not particularly limited. As a specific example, the search unit 107 may notify the updating unit 103 of information (e.g., individual number information) included in the line-of-sight format.

The format updating unit 103 identifies information indicating a line-of-sight format other than those of a user corresponding to a transmission source for the object information and the reference target information, of the information indicating the line-of-sight format sent from the search unit 107, as information indicating another user's line-of-sight format. Thereafter, the format updating unit 103 updates the value of the received reference target information with information indicating another user's line-of-sight format thus identified, and updates the line-of-sight format of a user corresponding to a transmission source, on the basis of the updated reference target information and the received object information.

Note that the following operation is similar to that of the information processing system according to each of the above embodiments. Specifically, when the reference target information is updated, the respective line-of-sight formats generated or updated for the users are managed so that the line-of-sight formats can be cross-referenced between the plurality of users, through the updated reference target information.

3.3. Conclusion

As described above, the information processing system according to this embodiment is configured so that a condition for identifying another user whose line of sight or viewpoint is shared can be designated with respect to the reference target information included in the line-of-sight format. Therefore, for example, the user Ua is allowed to indirectly designate a user who the user Ua does not recognize, as another user with whom the user Ua share their lines of sight or viewpoints.

Note that the timing at which the content display apparatus 30 outputs the reference target information and the object information to the line-of-sight format processing apparatus 10 is not particularly limited. As a specific example, the content display apparatus 30 may transmit the reference target information and the object information to the line-of-sight format processing apparatus 10 on the basis of a user's input through an input device (not shown).

Also, as another example, the content display apparatus 30 may monitor changes in a user's line-of-sight direction or changes in a position of an avatar in a content, and on the basis of the result of the monitoring, sequentially update and transmit the reference target information and the object information to the line-of-sight format processing apparatus 10. In this case, for example, the line-of-sight format processing apparatus 10 may identify another user of interest on the basis of the reference target information and object information sequentially transmitted from the content display apparatus 30, and on the basis of information about the identified user, sequentially update the line-of-sight format of interest.

With such a configuration, for example, in response to a change in a user's line of sight, another user with whom that user shares their lines of sight or viewpoints can be dynamically changed.

Also, in the above example, an example has been described in which, on the basis of information about an object indicated by a user's line of sight, another user with whom that user shares their lines of sight or viewpoints is indirectly designated. However, the method of identifying another user whose line of sight or viewpoint is shared is not limited to the method based on information about an object indicated by a user's line of sight.

As a specific example, a user having an overlapping range indicating the visual field (i.e., the reference range) may be indirectly designated as another user whose line of sight or viewpoint is shared.

In this case, on the basis of the line-of-sight information set in each user's line-of-sight format the user's visual field angle, the line-of-sight format processing apparatus 10 identifies the range indicating the user's visual field (i.e., the reference range). Thereafter, the line-of-sight format processing apparatus 10 may check the reference ranges corresponding to users against each other, to set information about another user whose reference range overlaps or coincides with that of the user Ua, in the reference target information included in the line-of-sight format A of the user Ua, for example.

Also, as another example, on the basis of information about a position in a content of an avatar operated by each user, designation may be indirectly made as another user whose line of sight or viewpoint is shared.

In this case, the line-of-sight format processing apparatus 10 acquires, from, for example, the user Ua, information indicating a position or range in a content as a condition for identifying another user with whom the user Ua share their lines of sight or viewpoints. Also, on the basis of the position information set in each user's line-of-sight format, the line-of-sight format processing apparatus 10 identifies a position of an avatar corresponding to the user in a content.

Also, the line-of-sight format processing apparatus 10 identifies an avatar present in a designated position or range by checking information indicating a position or range designated as a condition against the identified positions of the avatars corresponding to the users. Thereafter, the line-of-sight format processing apparatus 10 may set information about another user corresponding to the identified avatar in the reference target information included in the line-of-sight format A of the user Ua.

With such a configuration, for example, the user Ua is allowed to designate "the stadium J and the arena seat K" as a condition, as a position in a content, whereby the user Ua and a user present at the position in the content indicated by the condition can share their lines of sight or viewpoints.

4. Fourth Embodiment 4.1. Overview

Next, an information processing system according to a fourth embodiment will be described. For the information processing system according to this embodiment, an example will be described in which the mechanism which allows a plurality of users to share their lines of sight or viewpoints as described in each of the above embodiments, is utilized to control communication between the users.

Figure 19:
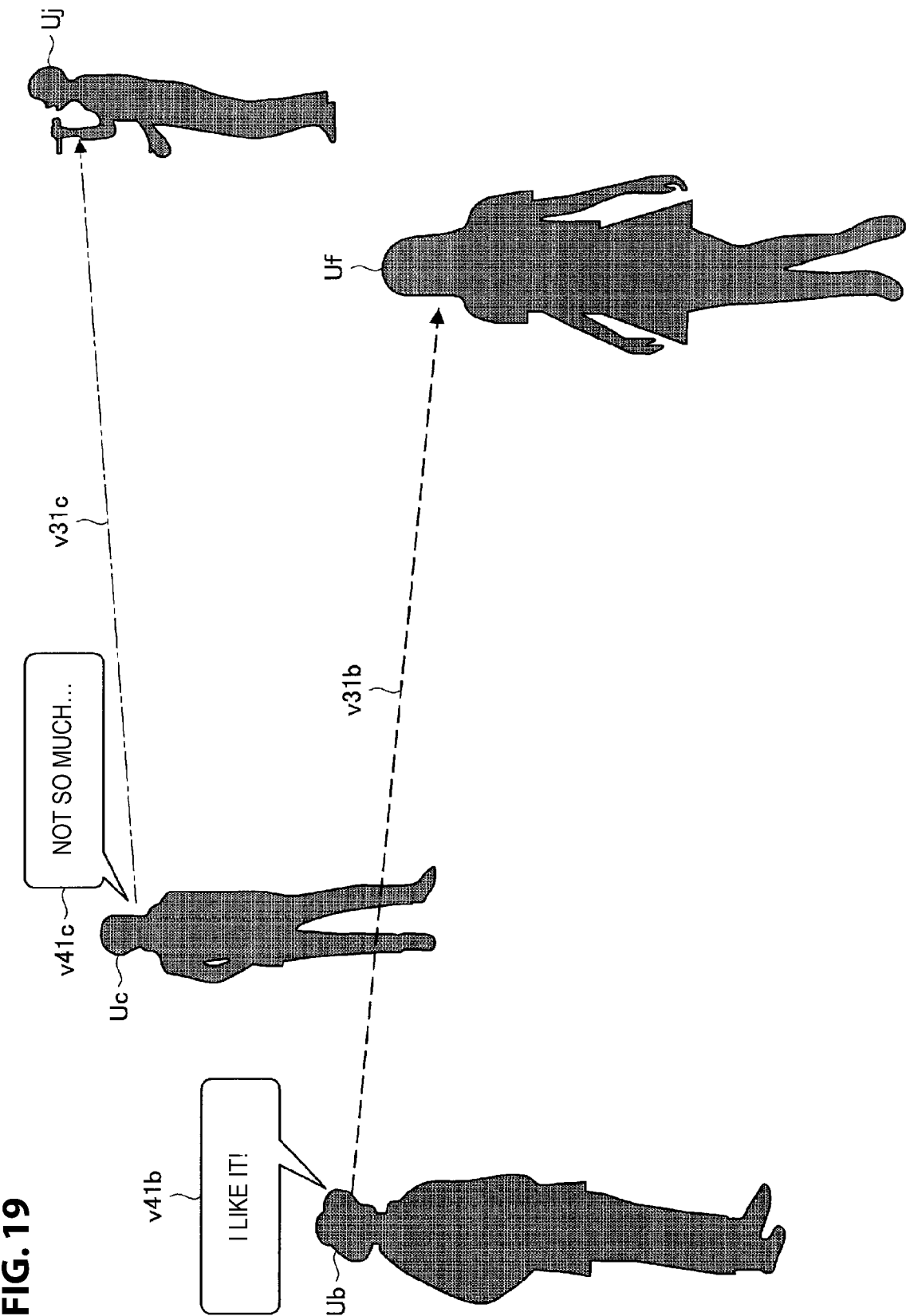
FIG. 19 is an illustrative diagram for describing an overview of an information processing system according to a fourth embodiment of the present disclosure.
Figure 20:
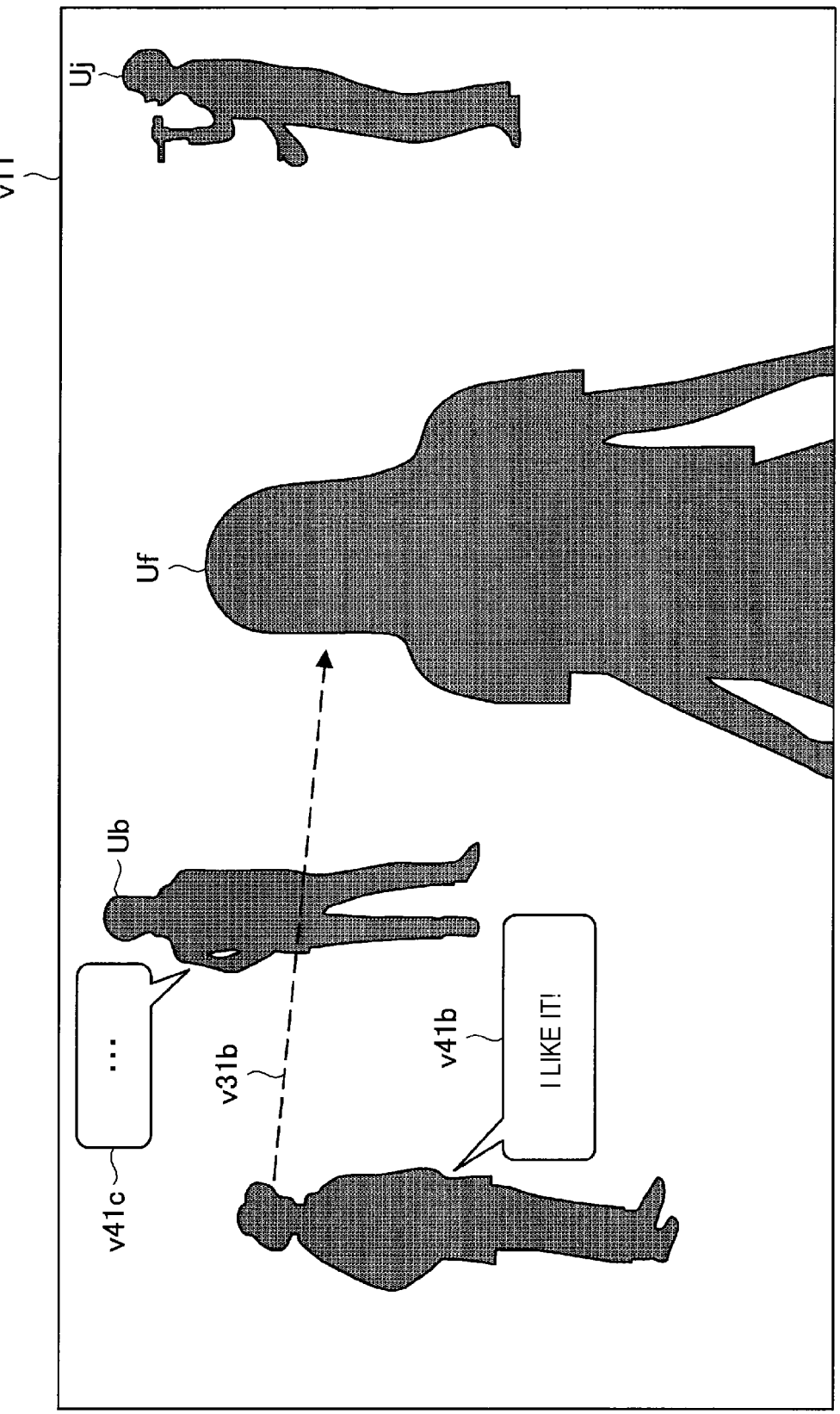
FIG. 20 is an illustrative diagram for describing an overview of an information processing system according to the embodiment.

Firstly, an overview of the information processing system according to this embodiment will be described with reference to FIG. 19 and FIG. 20. FIG. 19 and FIG. 20 are illustrative diagrams for describing the overview of the information processing system according to this embodiment, indicating an example in which a plurality of users sharing a content communicate with each other by exchanging audio information with each other.

In an information processing system in which users can share a content, one user Ua is allowed to share a content not only with a single other user, but also with a plurality of other users as shown in, for example, FIG. 19. Also, among the information processing systems which allow a plurality of users to share a content is, for example, one which is configured to allow each of users sharing a content to arbitrarily utter speech so that not only one-to-one communication but also one-to-many or many-to-many communication can be made.

Meanwhile, in an information processing system which allows one-to-many or many-to-many communication, one user Ua may be presented not only information based on a speech uttered by another user who is communicating with the user Ua, but also information based on a speech uttered by still another user. In such a case, the information based on a speech uttered by still another user is not always a speech directed to the user Ua, and information desired by the user Ua is not always presented. Therefore, when the user Ua communicates with another user, information based on a speech uttered by still another user may disturb the user Ua's communication.

With the above in mind, in the information processing system according to this embodiment, a mechanism is provided which limits the range of a plurality of users who share a content and exchange audio information with each other, to users who share their lines of sight or viewpoints.

As a specific example, the information processing system according to this embodiment limits the range of a plurality of users who share a content and exchange audio information with each other, to users who direct their lines of sight to the same object.

For example, in the example shown in FIG. 19, the user Ub utters "I like it!" as indicated by a reference sign v41b while directing their line of sight v31b to a user Uf's avatar. Also, the user Uc utters "Not so much . . . " as indicated by a reference sign v41c while directing their line of sight v31c to a user Uj's avatar. Also, it is assumed that the user Ua is directing their line of sight to the user Uf's avatar, as with the user Ub. FIG. 20 shows an example of the partial image v11 which is presented to the user Ua on the basis of the user Ua's line of sight.

At this time, of the audio information v41b and v41c indicating the contents of speeches uttered by the users Ub and Uc, respectively, the information processing system according to this embodiment presents, to the user Ua, only the audio information v41b of the user Ub who is directing their line of sight to the same object (i.e., the user Uf's avatar). Specifically, in the example shown in FIG. 19 and FIG. 20, the user Ua recognizes only the content of the user Ub's speech "I like it!," but not the content of the user Uc's speech "Not so much . . . "

Figure 21:
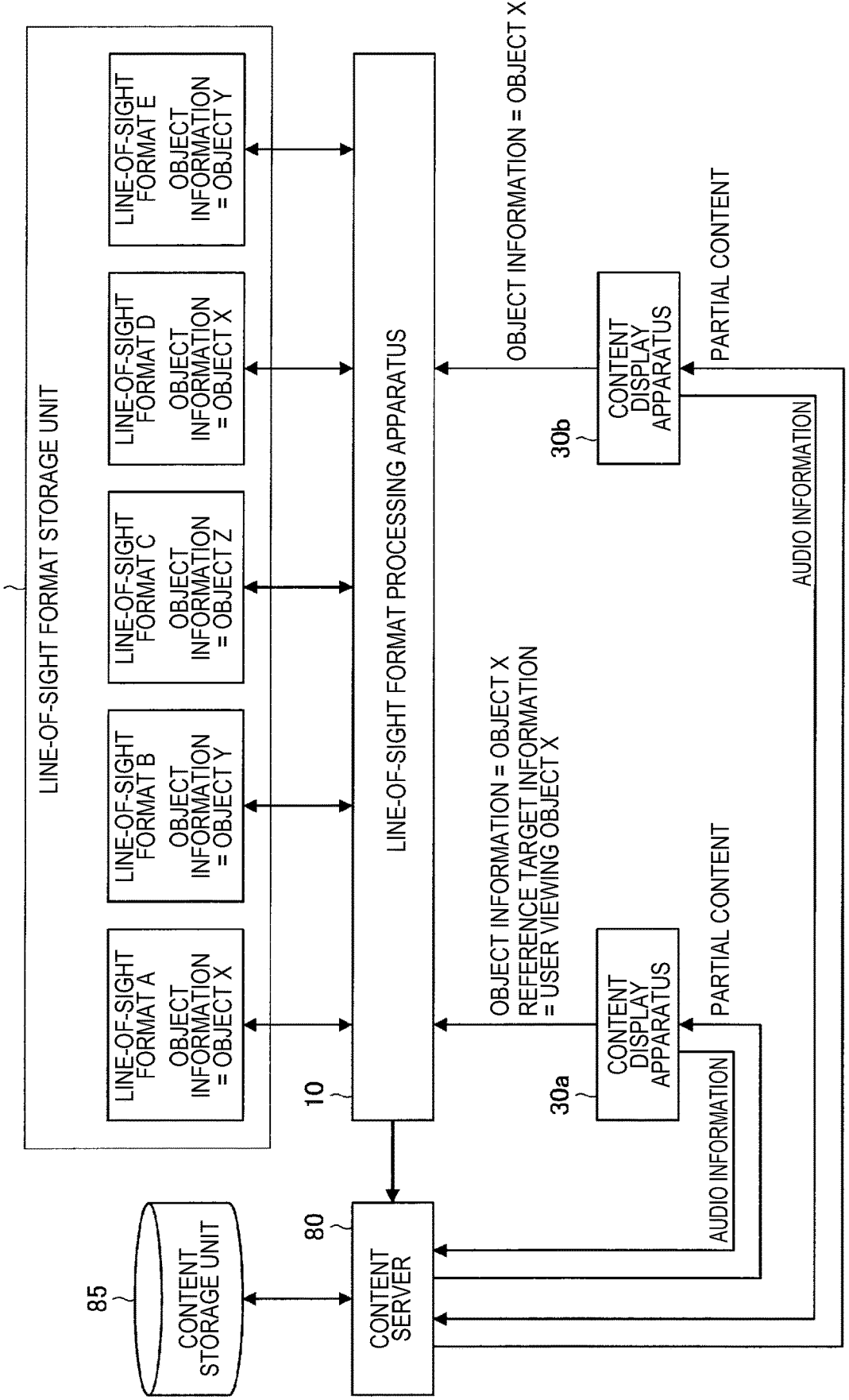
FIG. 21 is an illustrative diagram for describing a general operation of an information processing system according to the embodiment.

Here, a general operation of the information processing system according to this embodiment will be described with reference to FIG. 21. FIG. 21 shows the general operation of the information processing system according to this embodiment.

Note that the method of identifying each of users who are directing their lines of sight to the same object is similar to that used in the information processing system according to the third embodiment (see FIG. 17). Specifically, in the example shown in FIG. 21, the content display apparatus 30a designates a condition indicating a "user who is viewing the object X, with respect to the reference target information".

In response to this designation, the line-of-sight format processing apparatus 10 refers to the object information included in each of the line-of-sight format A to E stored in the line-of-sight format storage unit 15, to find out the line-of-sight format A and D in which the "object X" is set in the object information.

At this time, the line-of-sight format processing apparatus 10 may newly set information (e.g., the identification information or address of the line-of-sight format) indicating a line-of-sight format(s) other than the line-of-sight format A corresponding to the user Ua, of the found line-of-sight formats, in the reference target information included in the line-of-sight format A. Specifically, in the example shown in FIG. 17, the line-of-sight format processing apparatus 10 sets information about the line-of-sight format D in the reference target information included in the line-of-sight format A.

With such a configuration, for example, even when each of the users Ua and Ud does not recognize the presence of the other, the users Ua and Ud can share their lines of sight or viewpoints.

Also, in the information processing system according to this embodiment, each content display apparatus 30 acquires information indicating each user's reaction (e.g., the content of a speech) through an input device (not shown), and transmits the acquired information to the content server 80. Note that, in this description, it is assumed that the content display apparatus 30 transmits audio information indicating each user's speech, as information indicating each user's reaction, to the content server 80.

The content server 80 receives the audio information indicating each user's reaction from the corresponding content display apparatus 30, and manages the audio information in association with the user corresponding to the content display apparatus 30 which is a transmission source of the received audio information. Note that, at this time, the content server 80 may cause the content storage unit 85 to store the acquired audio information for each user.

Thereafter, the content server 80, when presenting a partial image based on the line-of-sight format to each user, presents the partial image, and audio information of another user with whom that user shares their lines of sight, as the partial content v11.

Specifically, in the example shown in FIG. 21, the content server 80 distributes, to the content display apparatus 30a, a partial image based on the line-of-sight format A, and audio information of the user Ud who is directing their line of sight to the same object X to which the user Ua is directing their line of sight, as the partial content v11.

Also, the content server 80 distributes, to the content display apparatus 30d, a partial image based on the line-of-sight format D, and audio information of the user Ua who is directing their line of sight to the same object X to which the user Ud is directing their line of sight, as the partial content v11.

With such a configuration, the information processing system according to this embodiment can limit a range in which information indicating each user's reaction (e.g., audio information indicating the content of a speech) is exchanged, to a range of users who share their lines of sight or viewpoints. With such a configuration, a situation where communication between users who share their lines of sight or viewpoints is disturbed by information indicating another user's reaction, can be prevented.

Note that the content server 80 may manage audio information indicating each user's reaction in association with time information indicating times in a content (i.e., positions along a time sequence in the content).

In this case, each content display apparatus 30, when acquiring audio information indicating each user's reaction, transmits time information corresponding to the partial content v11 which the user was viewing (i.e., times in the content v0) to the content server 80 in association with the audio information.

Also, the content server 80 manages each user's audio information acquired from the corresponding content display apparatus 30, for each time in the content v0 to be distributed (i.e., each time information) on the basis of the time information associated with each audio information.

Thereafter, the content server 80, when presenting a partial image based on the line-of-sight format to each user at each time in the content v0 indicated by the time information included in the line-of-sight format, extracts the audio information associated with the time information. Thereafter, the content server 80 may present the generated or extracted partial image, and the audio information extracted on the basis of the time information, as the partial content v11, to a user.

With such a configuration, for example, when a plurality of users each asynchronously refer to the same content (i.e., the content is not shared in real time), the audio information indicating each user's reaction can be shared along a time sequence in the content in a pseudo-manner.

4.2. Functional Configuration

Figure 22:
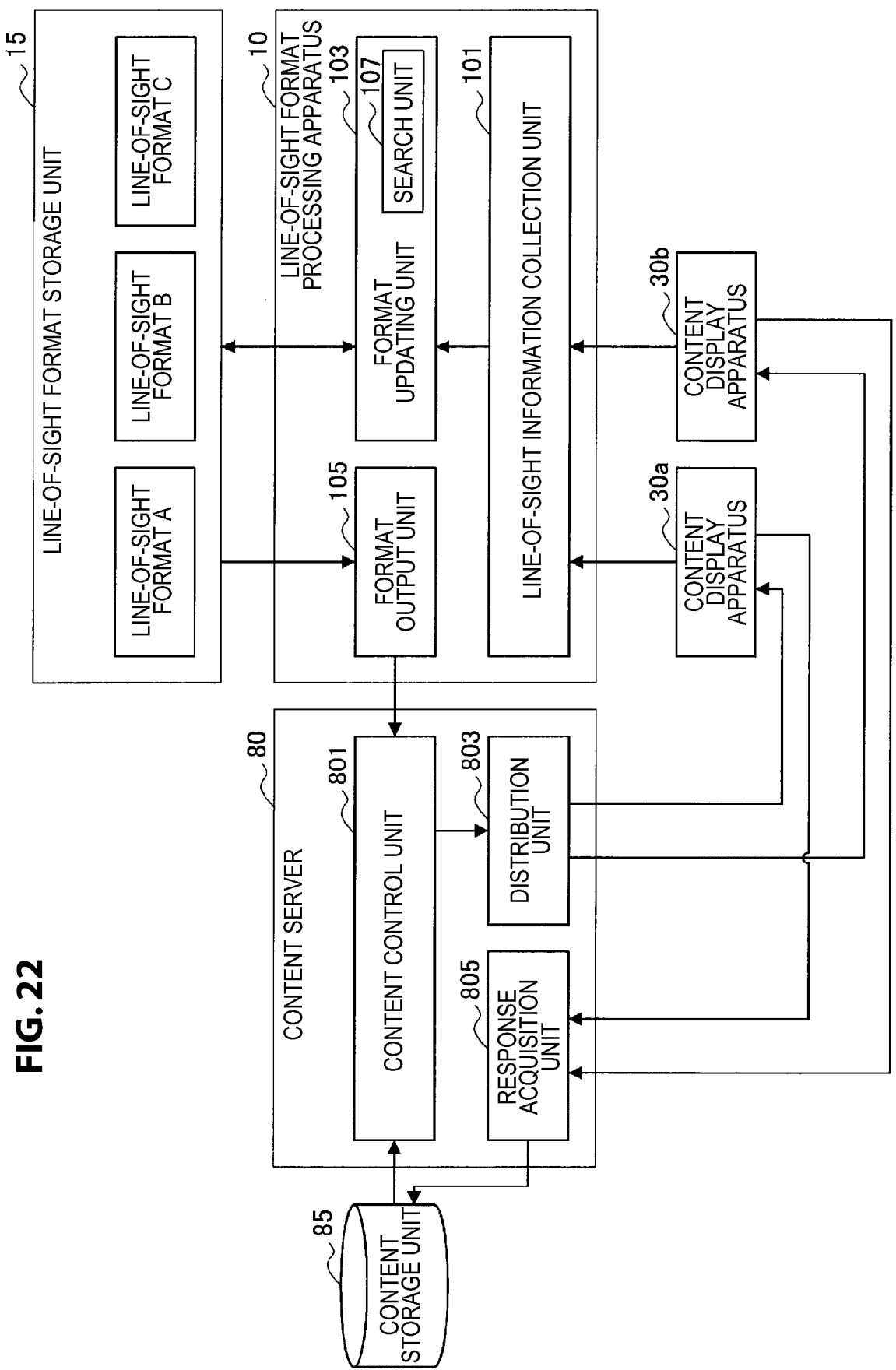
FIG. 22 is a block diagram showing a functional configuration example of an information processing system according to the embodiment.

Next, a functional configuration example of the information processing system according to this embodiment will be described in detail with reference to FIG. 22. FIG. 22 is a block diagram showing the functional configuration example of the information processing system according to this embodiment. Note that the information processing system according to this embodiment is similar to the above information processing system according to the third embodiment (see FIG. 18) in operations based on the detection of each user's line of sight, the updating of the line-of-sight format, and the generation and distribution of a partial image based on the line-of-sight format. Therefore, in this description, much attention is paid to configurations and operations different from those of the information processing system according to the third embodiment, and the other configurations and operations will not be described in detail.

As shown in FIG. 22, the content server 80 according to this embodiment includes a content control unit 801, a distribution unit 803, and a response acquisition unit 805.

As described above with reference to FIG. 21, the content display apparatus 30 according to this embodiment acquires audio information indicating each user's reaction through an input device (not shown), and transmits the acquired audio information to the content server 80.

The response acquisition unit 805 receives audio information indicating each user's reaction from the corresponding content display apparatus 30, and manages the received audio information in association with a user corresponding to the content display apparatus 30 which is the transmission source. At this time, for example, the response acquisition unit 805 causes the content storage unit 85 to store the acquired audio information in association with identification information indicating the user.

The content control unit 801 reads the content v0 to be distributed to each content display apparatus 30 from the content storage unit 85. Also, the content control unit 801 acquires, from the line-of-sight format processing apparatus 10, each user's line-of-sight format associated with a content to be distributed.

The content control unit 801 analyzes each user's line-of-sight format thus acquired, and on the basis of the result of the analysis of the line-of-sight format, extracts or generates a partial image to be presented to the user (i.e., a partial image to be distributed to a content display apparatus 30 operated by the user). Note that a method which is used by the content control unit 801 to extract or generate the partial image is similar to that of the content control unit 801 according to each of the above embodiments, and therefore, will not be described in detail.

Also, on the basis of the reference target information and sharing information included in each user's line-of-sight format, the content control unit 801 identifies another user with whom that user shares their lines of sight or viewpoints. Thereafter, the content control unit 801 extracts audio information of another user thus identified, from the content storage unit 85, and associates the extracted audio information with a partial image to be presented to the user corresponding to the line-of-sight format.

As a specific example, in the example shown in FIG. 21, the content control unit 801 identifies the user Ud as another user with whom the user Ua shares their lines of sight or viewpoints, on the basis of the line-of-sight format A. In this case, the content control unit 801 extracts audio information associated with the identified user Ud from the content storage unit 85, and associates the extracted audio information with a partial image to be presented to the user Ua.

Thereafter, the content control unit 801 outputs a partial image extracted or generated for each user, and audio information corresponding to another user which is associated with the partial image, as the partial content v11, to the distribution unit 803.

The distribution unit 803 acquires a partial content extracted or generated on the basis of the result of analysis of each user's line-of-sight format, from the content control unit 801 for the user. Thereafter, the distribution unit 803 distributes the partial content acquired for each user to a content display apparatus 30 operated by the user.

With such a configuration, for example, a partial image based on the line-of-sight format A, and audio information based on the content of a speech uttered by the user Ud whose line of sight or viewpoint is shared, are presented to the user Ua. Note that, at this time, the information processing system according to this embodiment limits presentation to the user Ua of audio information of another user with whom the user Ua does not share their lines of sight or viewpoints. Therefore, the user Ua can smoothly perform communication with the user Ud with whom the user Ua share their lines of sight or viewpoints without being disturbed by other users' audio information.

4.3. Conclusion

As described above, when presenting, to each user, a partial image based on the line-of-sight format, the content server 80 according to this embodiment presents the partial image, and information indicating a reaction of another user with whom that user shares their lines of sight (e.g., audio information indicating the content of a speech), as the partial content v11. With such a configuration, the information processing system according to this embodiment can limit a range in which information indicating each user's reaction is exchanged, to a range of users who share their lines of sight or viewpoints. With such a configuration, a situation where communication between users who share their lines of sight or viewpoints is disturbed by information indicating another user's reaction, can be prevented.

Note that the information indicating each user's reaction is not limited to audio information indicating the content of the user's speech, if the information is based on the user's user input. As a specific example, character information based on a user input may be the information indicating the user's reaction. In this case, for example, of the character information indicating each user's reaction, the content server 80 may present, to the user Ua, only character information of a user(s) with whom the user Ua shares their lines of sight, in a partial image presented to the user Ua, in a manner which allows the user Ua to identify the character information.

Also, as in the third embodiment, the method of identifying another user whose line of sight or viewpoint is shared, is not particularly limited.

Figure 23:
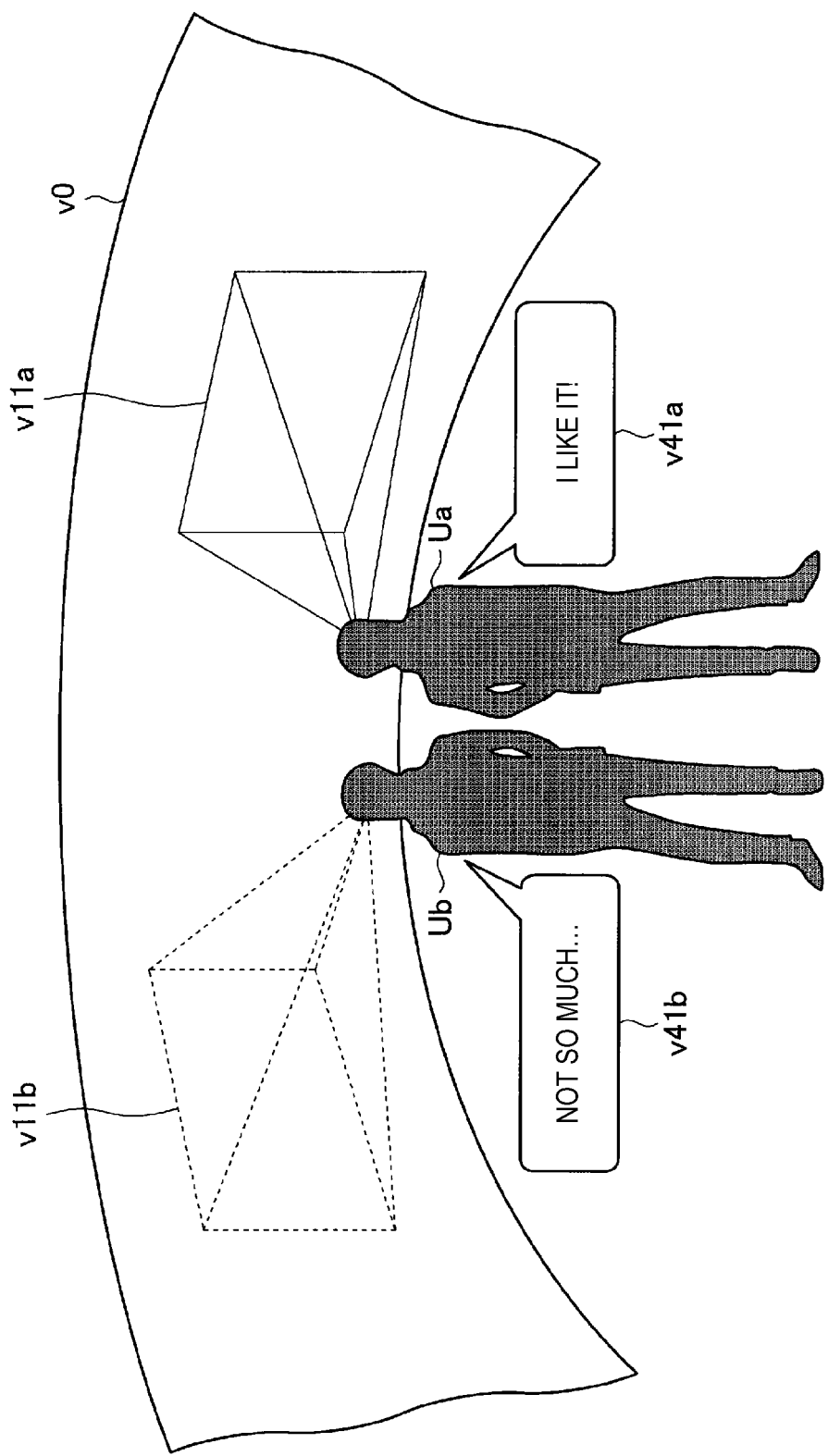
FIG. 23 is an illustrative diagram for describing another example of an information presentation method in an information processing system according to the embodiment.
Figure 24:
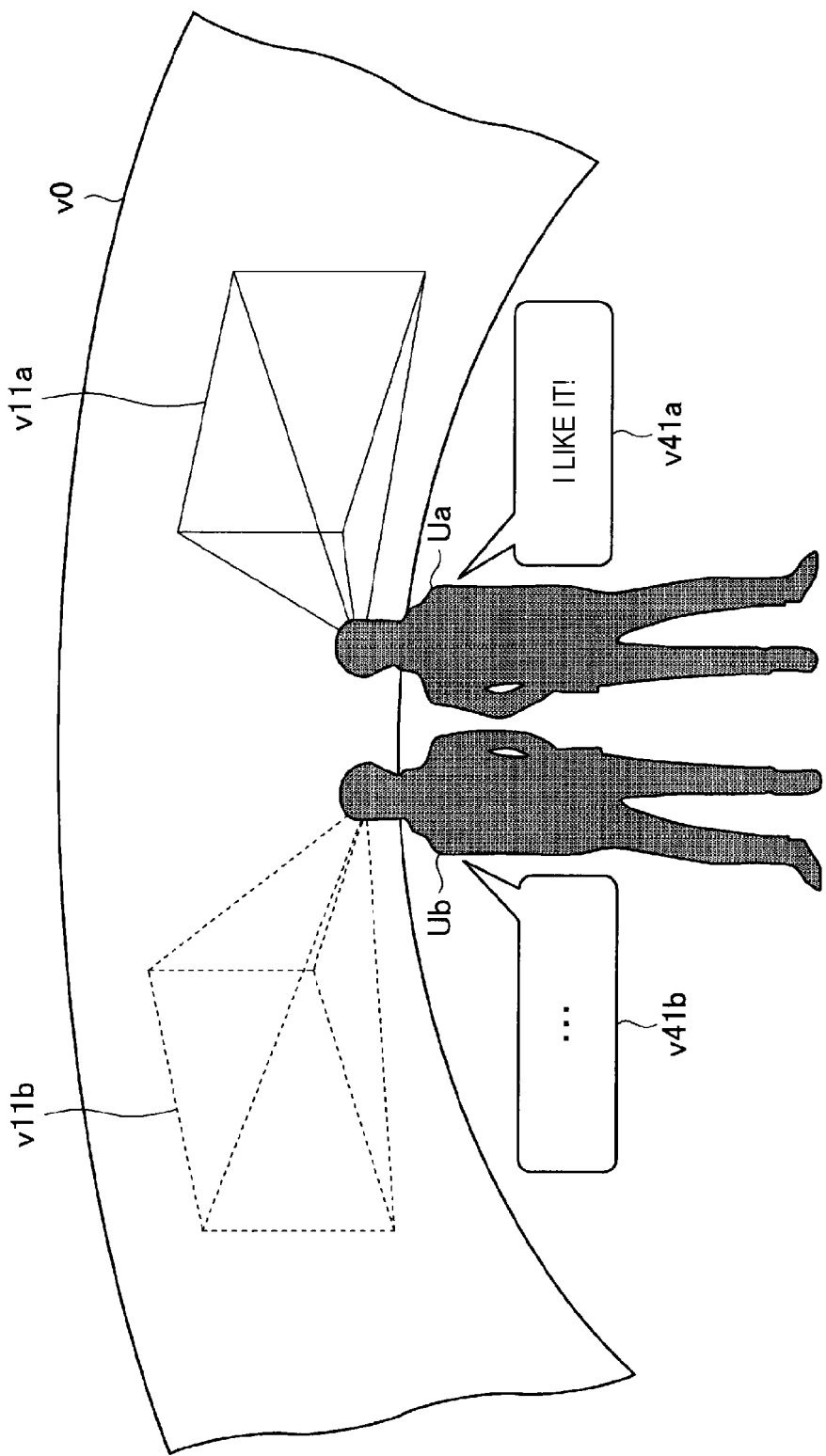
FIG. 24 is an illustrative diagram for describing another example of an information presentation method in an information processing system according to the embodiment.
Figure 25:
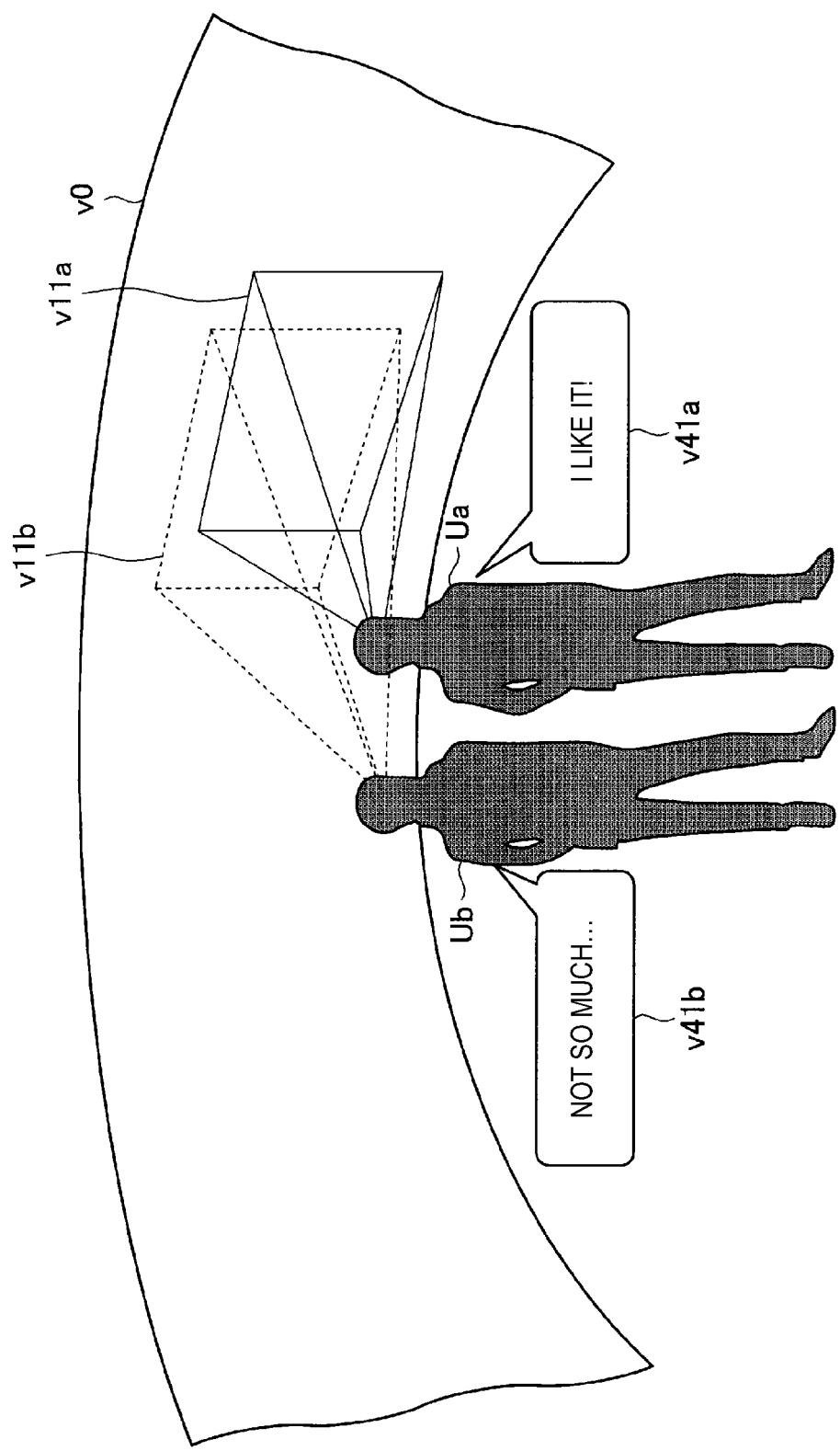
FIG. 25 is an illustrative diagram for describing another example of an information presentation method in an information processing system according to the embodiment.

For example, FIG. 23 to FIG. 25 are illustrative diagrams for describing another example of the information presentation method in the information processing system according to this embodiment, showing an example in which, when an omnidirectional video is simulated, presentation of information to each user is controlled on the basis of a range indicating the user's visual field (i.e., a reference range). Note that, in FIG. 23 to FIG. 25, a reference sign v11a indicates a partial image of a content v0 presented to the user Ua on the basis of the user Ua's line-of-sight direction. Similarly, a reference sign v11b indicates a partial image of the content v0 presented to the user Ub on the basis of the user Ub's line-of-sight direction.

Note that, in this description, for example, it is assumed that the user Ua utters "I like it!" as indicated by the reference sign v11a of FIG. 23, and the user Ub utters "Not so much . . . " as indicated by a reference sign v41b.

For example, in the example shown in FIG. 24, a case is shown where ranges in the content v0 indicated by the partial images v11a and v11b, respectively, do not overlap or coincide with each other, i.e., the respective reference ranges of the user Ua and the user Ub do not overlap or coincide with each other. In this case, the content server 80 does not distribute the audio information v41b indicating the content of the user Ub's speech to the content display apparatus 30a operated by the user Ua. Therefore, in the example shown in FIG. 24, the audio information v41b is not recognized by the user Ua.

In contrast to this, in the example shown in FIG. 25, a case is shown in which ranges in the content v0 indicated by the partial images v11a and v11b, respectively, overlap or coincide with each other, i.e., the respective reference ranges of the user Ua and the user Ub overlap or coincide with each other. In this case, the content server 80 distributes, to the content display apparatus 30a operated by the user Ua, the audio information v41b indicating the content of the user Ub's speech. Therefore, in the example shown in FIG. 25, the audio information v41b is recognized by the user Ua.

Also, as another example, on the basis of information about a position in a content of an avatar operated by each user, designation may be indirectly made as another user whose line of sight or viewpoint is shared.

Also, the information processing system according to this embodiment may be configured so that the content display apparatus 30 extracts or generates a partial content on the basis of the line-of-sight format, as with the above information processing system according to the second embodiment.

In this case, for example, audio information indicating each user's reaction may be managed by the content server 83, and the content control unit 313 in the content display apparatus 30 may access the content server 83 to acquire audio information of interest from the content server 83.

Also, as another example, the content display apparatuses 30 may exchange audio information with each other, and may each hold audio information acquired from another content display apparatus 30 in the content holding unit 303. In this case, the content control unit 313 may extract audio information of interest from the content holding unit 303.

5. Hardware Configuration

Figure 26:
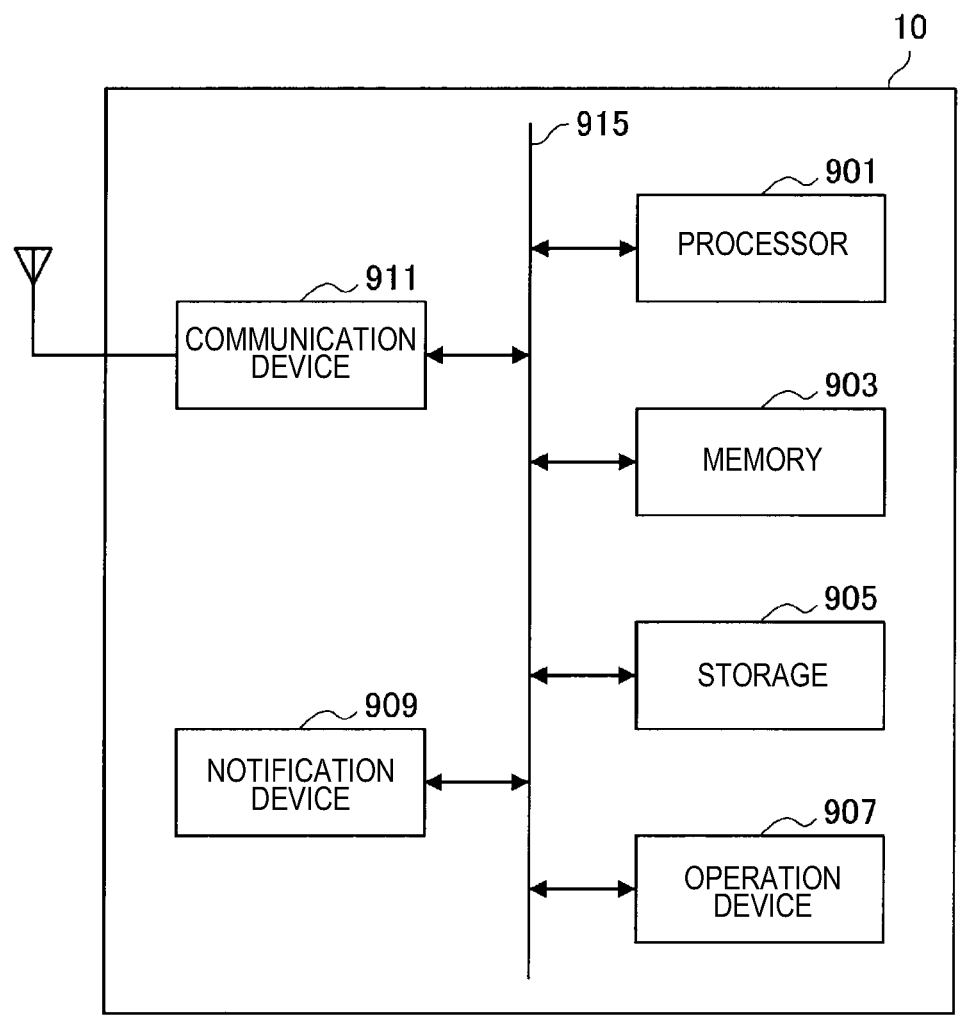
FIG. 26 shows a hardware configuration example of an information processing apparatus according to each embodiment of the present disclosure.

Next, a hardware configuration example of an information processing apparatus such as the line-of-sight format processing apparatus 10 or the content server 80 according to each embodiment of the present disclosure, will be described with reference to FIG. 26. FIG. 26 is a diagram showing the hardware configuration example of the information processing apparatus such as the line-of-sight format processing apparatus 10 or the content server 80 according to each embodiment of the present disclosure.

As shown in FIG. 26, the information processing apparatus such as the line-of-sight format processing apparatus 10 or the content server 80 according to each embodiment of the present disclosure includes a processor 901, a memory 903, a storage 905, a communication device 911, and a bus 915. Also, the line-of-sight format processing apparatus 10 may include an operation device 907 and a notification device 909.

The processor 901 may, for example, be a central processing unit (CPU), graphics processing unit (GPU), digital signal processor (DSP) or system on chip (SoC), and perform various processes of the information processing apparatus such as the line-of-sight format processing apparatus 10 or the content server 80. The processor 901 can be configured by, for example, an electronic circuit for performing various calculation processes. Note that the format updating unit 103 or the content control unit 801 described above may be implemented by the processor 901.

The memory 903 includes a random access memory (RAM) and a read only memory (ROM), and stores a program which is executed by the processor 901 and data. The storage 905 may include a storage medium, such as a semiconductor memory, hard disk, or the like. For example, the line-of-sight format storage unit 15 or the content storage unit 85 described above may be configured by at least the memory 903 or the storage 905 or a combination of both.

The operation device 907 has the function of generating an input signal for allowing the user to perform a desired operation. The operation device 907 may be configured by an input unit for allowing the user to input information, such as, for example, a button, switch, or the like, an input control circuit for generating an input signal on the basis of the user's input, and supplying the input signal to the processor 901, and the like.

The notification device 909 is an example of an output device, such as, for example, a liquid crystal display (LCD) apparatus, organic light emitting diode (OLED) display, or the like. In this case, the notification device 909 can display a screen to notify the user of predetermined information.

Also, as another example, the notification device 909 may be a device which notifies the user of predetermined information using a lighting or flickering pattern, such as a light emitting diode (LED). Also, the notification device 909 may be a device which notifies the user of predetermined information by outputting a predetermined acoustic signal, such as a loudspeaker or the like.

The communication device 911 is a communication means which is included in the information processing apparatus such as the line-of-sight format processing apparatus 10 or the content server 80, and communicates with an external apparatus through a network. The communication device 911 is a wired or wireless communication interface. When the communication device 911 is configured as a wireless communication interface, the communication device 911 may include a communication antenna, a radio frequency (RF) circuit, a base-band processor, and the like.

The communication device 911 has the function of performing various signal processes on a signal received from an external apparatus, and can supply a digital signal generated from a received analog signal to the processor 901. Note that the function of allowing the line-of-sight information collection unit 101, the format output unit 105, and the distribution unit 803 described above to communicate with another apparatus through the network n1 may be implemented by the communication device 911.

The bus 915 connects the processor 901, the memory 903, the storage 905, the operation device 907, the notification device 909, and the communication device 911 together. The bus 915 may include a plurality of different buses.

Also, a program for causing hardware such as a processor, memory, storage and the like included in a computer to perform functions equivalent to those of a configuration possessed by the information processing apparatus such as the line-of-sight format processing apparatus 10 or the content server 80 described above, can be produced. Also, a computer readable storage medium recording the program may also be provided.

6. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above description, an example has been described in which the content server 80 distributes contents previously stored in the content storage unit 85 to the content display apparatuses 30. Meanwhile, the form of contents distributed to the content display apparatuses 30 may not necessarily be limited to the examples described above. As a specific example, a video of a concert, event, or the like which occurs in real time may be distributed as a content to the content display apparatuses 30. As a more specific example, an imaging apparatus which can capture an omnidirectional video may be provided in a concert hall, and a video captured by the imaging apparatus may be distributed to the content display apparatuses 30 through a network, such as the Internet or the like. With such a configuration, even when being present at a remote place, each user can experience the video in real time with a high sense of presence as if the user were present at the concert hall.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:
an acquisition unit configured to acquire line-of-sight information indicating a first user's line of sight detected in response to presentation of a content; and
a management unit configured to associate the acquired line-of-sight information with the content as control information for controlling the presentation of the content to a second user different from the first user.

(2)

The information processing apparatus according to (1),
wherein the control information includes position information indicating a position of the first user in a virtual space based on the content.

(3)

The information processing apparatus according to (1) or (2),
wherein the control information includes time information indicating a time in the content.

(4)

The information processing apparatus according to any one of (1) to (3),
wherein the control information includes information indicating an object in the content indicated by the first user's line of sight.

(5)

The information processing apparatus according to (4),
wherein the management unit identifies the second user directing a line of sight to the object indicated by the first user's line of sight, by checking information indicating the object included in the control information corresponding to the first user against information indicating the object included in the control information corresponding to the second user.

(6)

The information processing apparatus according to any one of (1) to (5),
wherein the control information includes management information for limiting use of at least a portion of information included in the control information for the control.

(7)

The information processing apparatus according to (6),
wherein the management information includes information for limiting a user to be controlled based on the control information.

(8)

The information processing apparatus according to any one of (1) to (7), including:
a control unit configured to control presentation of the content to the second user, on the basis of the control information associated with the content.

(9)

An information processing apparatus including:
an acquisition unit configured to acquire line-of-sight information indicating a first user's line of sight associated with a content; and
a control unit configured to control presentation of the content to a second user different from the first user, on the basis of the line-of-sight information.

(10)

The information processing apparatus according to (9),
wherein the control unit presents, to the second user, display information based on the content presented to the first user, on the basis of the line-of-sight information.

(11)

The information processing apparatus according to (9),
wherein the control unit superimposes, on first display information based on the content presented to the second user, second display information which identifiably presents the first user's line of sight on the basis of the line-of-sight information.

(12)

The information processing apparatus according to (9),
wherein the control unit acquires user input performed by the first user in response to the presentation of the content, and presents information based on the user input only to a user who directs a line of sight to an object in the content indicated by the first user's line of sight based on the line-of-sight information, among other users different from the first user.

(13)

The information processing apparatus according to (9),
wherein the control unit acquires user input performed by the first user in response to the presentation of the content, and presents information based on the user input only to a user who have a visual field overlapping the first user's visual field based on the line-of-sight information, among other users different from the first user.

(14)

The information processing apparatus according to (12) or (13),
wherein the user input is audio information based on a speech uttered by the first user.

(15)

The information processing apparatus according to (9), including:
a display unit configured to display display information based on the content,
wherein the control unit controls the display of the display information on the display unit, on the basis of the line-of-sight information.

(16)

An information processing method including:
acquiring line-of-sight information indicating a first user's line of sight detected in response to presentation of a content; and
causing a processor to associate the acquired line-of-sight information with the content as control information for controlling the presentation of the content to a second user different from the first user.

(17)

An information processing method including:
acquiring a content associated with line-of-sight information indicating a first user's line of sight; and
causing a processor to control presentation of the content to a second user different from the first user, on the basis of the line-of-sight information associated with the content.

(18)

A program for causing a computer to execute:
acquiring line-of-sight information indicating a first user's line of sight detected in response to presentation of a content; and associating the acquired line-of-sight information with the content as control information for controlling the presentation of the content to a second user different from the first user.

(19) A program for causing a computer to execute:
acquiring a content associated with line-of-sight information indicating a first user's line of sight; and
controlling presentation of the content to a second user different from the first user, on the basis of the line-of-sight information associated with the content.

REFERENCE SIGNS LIST 10 line-of-sight format processing apparatus
101 line-of-sight information collection unit
103 format updating unit
105 format output unit
107 search unit
15 line-of-sight format storage unit
30 content display apparatus
301 content acquisition unit
303 content holding unit
305 display control unit
307 display unit
309 line-of-sight detection unit
311 line-of-sight information transmission unit
313 content control unit
80 content server
801 content control unit
803 distribution unit
805 response acquisition unit
85 content storage unit

The invention claimed is:

1. An information processing apparatus, comprising:
at least one processor configured to:
acquire line-of-sight information indicating a first user's line of sight detected in response to presentation of content, wherein the first user's line of sight is associated with a first user;
acquire first identification information associated with the first user's line of sight;
associate the line-of-sight information and the first identification information with the content as control information;
control the presentation of the content to a second user based on the control information, wherein
the second user is different from the first user,
a second user's line of sight of the second user is associated with second identification information,
the first identification information visually indicates a range of the content within the first user's line of sight,
the control information includes first information that indicates a permission to share the line-of-sight information with the second user and second information that indicates that sharing of the line-of-sight information with a third user is prohibited, and
the third user is different from the second user;
extract a partial image from the content based on the line-of-sight information;
control a display screen to display the partial image to the first user; and
control the display screen to display the second identification information in the partial image,
wherein the second identification information visually indicates a range of the content within the second user's line of sight.

2. The information processing apparatus according to claim 1, wherein
the control information further includes position information, and
the position information indicates a position of the first user in a virtual space based on the content.

3. The information processing apparatus according to claim 1, wherein the control information further includes time information indicating a time in the content.

4. The information processing apparatus according to claim 1, wherein
the control information further includes information indicating an object in the content, and
the object is indicated by the first user's line of sight.

5. The information processing apparatus according to claim 4, wherein
the at least one processor is further configured to identify the second user that directs a line of sight to the object indicated by the first user's line of sight, and
the second user is identified based on the information indicating the object.

6. The information processing apparatus according to claim 1, wherein the control information further includes management information to limit use of the control information.

7. An information processing apparatus, comprising:
a display screen; and
at least one processor configured to:
acquire line-of-sight information indicating a first user's line of sight associated with content, wherein
the first user's line of sight is associated with a first user, and
the line-of-sight information associated with the content is acquired as control information;
acquire first identification information associated with the first user's line of sight;
control presentation of the content to a second user, different from the first user, based on the control information, wherein
a second user's line of sight of the second user is associated with second identification information,
the first identification information visually indicates a range of the content within the first user's line of sight,
the control information includes first information that indicates a permission to share the line-of-sight information with the second user and second information that indicates that sharing of the line-of-sight information with a third user is prohibited, and
the third user is different from the second user;
extract a partial image from the content based on the line-of-sight information;
control a display screen to display the partial image to the first user; and
control the display screen to display the second identification information in the partial image,
wherein the second identification information visually indicates a range of the content within the second user's line of sight.

8. The information processing apparatus according to claim 7, wherein the at least one processor is further configured to control presentation of display information to the second user based on the content presented to the first user, and the display information is presented to the second user based on the line-of-sight information.

9. The information processing apparatus according to claim 7, wherein the at least one processor is further configured to superimpose first display information on second display information based on the line-of-sight information, the second display information is based on the content presented to the second user, and the first display information identifiably presents the first user's line of sight.

10. The information processing apparatus according to claim 7, wherein the at least one processor is further configured to:

acquire a user input by the first user, wherein the user input is acquired based on the presentation of the content; and control presentation of third information based on the user input to a fourth user that directs a line of sight to an object in the content, wherein the object is indicated by the first user's line of sight.

11. The information processing apparatus according to claim 10, wherein the user input is audio information based on an utterance of speech by the first user.

12. The information processing apparatus according to claim 7, wherein the at least one processor is further configured to:

acquire a user input of the first user based on the presentation of the content; and control presentation of third information based on the user input to a fourth user, wherein a fourth user's visual field overlaps with a first user's visual field.

13. The information processing apparatus according to claim 7, wherein the at least one processor is further configured to control, based on the content and the line-of-sight information, the display screen.

14. The information processing apparatus according to claim 7, wherein the at least one processor is further configured to:

control exchange of speech content of the first user based on the control information such that the speech content is shared with the second user along with the first user's line of sight.

15. An information processing method, comprising:

acquiring line-of-sight information indicating a first user's line of sight detected in response to presentation of content, wherein the first user's line of sight is associated with a first user;

acquiring first identification information associated with the first user's line of sight;

associating the line-of-sight information and the first identification information with the content as control information;

controlling the presentation of the content to a second user based on the control information, wherein the second user is different from the first user, a second user's line of sight of the second user is associated with second identification information, the first identification information visually indicates a range of the content within the first user's line of sight, the control information includes first information that indicates a permission to share the line-of-sight information with the second user and second information that indicates that sharing of the line-of-sight information with a third user is prohibited, and the third user is different from the second user;

extracting a partial image from the content based on the line-of-sight information;

controlling a display screen to display the partial image to the first user; and controlling the display screen to display the second identification information in the partial image, wherein the second identification information visually indicates a range of the content within the second user's line of sight.

16. An information processing method, comprising:

acquiring content associated with line-of-sight information indicating a first user's line of sight, wherein the first user's line of sight is associated with a first user, and the content associated with the line-of-sight information is acquired as control information;

acquiring first identification information associated with the first user's line of sight;

controlling presentation of the content to a second user, different from the first user, based on the control information, wherein a second user's line of sight of the second user is associated with second identification information, the first identification information visually indicates a range of the content within the first user's line of sight, the control information includes first information that indicates a permission to share the line-of-sight information with the second user and second information that indicates that sharing of the line-of-sight information with a third user is prohibited, and the third user is different from the second user;

extracting a partial image from the content based on the line-of-sight information;

controlling a display screen to display the partial image to the first user; and controlling the display screen to display the second identification information in the partial image, wherein the second identification information visually indicates a range of the content within the second user's line of sight.

17. A non-transitory computer readable storage medium having stored thereon computer-executable instructions, which when executed by a computer, cause the computer to execute operations, the operations comprising:

acquiring line-of-sight information indicating a first user's line of sight detected in response to presentation of content, wherein the first user's line of sight is associated with a first user;

acquiring first identification information associated with the first user's line of sight;

associating the line-of-sight information and the first identification information with the content as control information;

controlling the presentation of the content to a second user based on the control information, wherein the second user is different from the first user, a second user's line of sight of the second user is associated with second identification information, the first identification information visually indicates a range of the content within the first user's line of sight, the control information includes first information that indicates a permission to share the line-of-sight information with the second user and second information that indicates that sharing of the line-of-sight information with a third user is prohibited, and
the third user is different from the second user;
extracting a partial image from the content based on the line-of-sight information;
controlling a display screen to display the partial image to the first user; and
controlling the display screen to display the second identification information in the partial image,
wherein the second identification information visually indicates a range of the content within the second user's line of sight.

18. A non-transitory computer readable storage medium having stored thereon computer-executable instructions, which when executed by a computer, cause the computer to execute operations, the operations comprising:
acquiring content associated with line-of-sight information indicating a first user's line of sight, wherein
the first user's line of sight is associated with a first user, and
the content associated with the line-of-sight information is acquired as control information;
acquiring first identification information associated with the first user's line of sight;
controlling presentation of the content to a second user, different from the first user, based on the control information, wherein
a second user's line of sight of the second user is associated with second identification information,
the first identification information visually indicates a range of the content within the first user's line of sight,
the control information includes first information that indicates a permission to share the line-of-sight information with the second user and second information that indicates that sharing of the line-of-sight information with a third user is prohibited, and
the third user is different from the second user;
extracting a partial image from the content based on the line-of-sight information;
controlling a display screen to display the partial image to the first user; and
controlling the display screen to display the second identification information in the partial image,
wherein the second identification information visually indicates a range of the content within the second user's line of sight.

* * * * *